US008334771B2

(12) United States Patent
Matsuyama et al.

(10) Patent No.: US 8,334,771 B2
(45) Date of Patent: Dec. 18, 2012

(54) HOME NETWORK, AREA NETWORK USING THE SAME, PROGRAM FOR COMPUTER TO EXECUTE OPERATION IN HOME NETWORK, AND COMPUTER-READABLE RECORDING MEDIUM STORING THE PROGRAM

(75) Inventors: Takashi Matsuyama, Tokyo (JP); Tatsuya Yamazaki, Tokyo (JP); Yasuo Tan, Tokyo (JP); Yutaka Kidawara, Tokyo (JP); Rui Teng, Tokyo (JP); Youngjae Kim, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 428 days.

(21) Appl. No.: 12/663,976

(22) PCT Filed: Jun. 10, 2008

(86) PCT No.: PCT/JP2008/001473
§ 371 (c)(1),
(2), (4) Date: Dec. 10, 2009

(87) PCT Pub. No.: WO2008/152798
PCT Pub. Date: Dec. 18, 2008

(65) Prior Publication Data
US 2010/0141442 A1 Jun. 10, 2010

(30) Foreign Application Priority Data
Jun. 13, 2007 (JP) .................................. 2007-155986

(51) Int. Cl.
*G08B 13/00* (2006.01)

(52) U.S. Cl. .................... 340/541; 340/539.13; 340/540; 340/552; 340/554; 340/556; 340/5.2; 340/5.8
(58) Field of Classification Search .................. 340/541, 340/539, 540, 552, 554, 556, 5.2, 5.8
See application file for complete search history.

(56) References Cited

U.S. PATENT DOCUMENTS

| 5,483,224 A * | 1/1996 | Rankin et al. ............ 340/539.17 |
| 2005/0232425 A1 | 10/2005 | Hughes et al. |
| 2007/0220907 A1* | 9/2007 | Ehlers ............................ 62/126 |

FOREIGN PATENT DOCUMENTS

JP 2003-259569 A 9/2003
(Continued)

OTHER PUBLICATIONS

J. Jung et al, "A Home Sensor Network That Controls Power Consumption", IEEE Pervasive Computing, Jun. 2008, p. 60.

(Continued)

*Primary Examiner* — Tai T Nguyen
(74) *Attorney, Agent, or Firm* — Westerman, Hattori, Daniels & Adrian, LLP

(57) ABSTRACT

Slaves are respectively provided corresponding to electric devices, measure, in real time, power usage states and disposed positions of the electric devices to transmit to a master. The master detects operational states of electric devices on operation based on power usage states received from the slaves, and detects a positional relation between electric devices on operation based on disposed positions of the electric devices. Then, the master estimates the number of residents in the house by determining achievability of operational states of electric devices based on the detected operational states and positional relation of electric devices.

17 Claims, 37 Drawing Sheets

FOREIGN PATENT DOCUMENTS

| | | |
|---|---|---|
| JP | 2005-122528 A | 5/2005 |
| JP | 2007-133468 A | 5/2007 |
| WO | 02/41585 A2 | 5/2002 |

OTHER PUBLICATIONS

J. Jung et al, "A Power Measuring and Controlling Sensor Network for Home Services", The Institute of Electronics, Information and Communication Engineers, IEICE Technical Report USN2007-68(2008-1), Jan. 25, 2008, pp. 77-82.

Y. Kim et al, "Toward Eco-friendly Environment: A Context-awareness Detection Using Real-time Power Measurement Devices", The 5th international Conference on Smart homes and health Telematics (ICOST2007), Jun. 21, 2007, pp. 135-136.

T. Yamazaki et al, "Energy Management in Home Environment Using a Power Sensor Network", The Institute of Electronics, Information and Communication Engineers, IEICE Technical Report, EE2007-56(2008-1), Jan. 22, 2008, pp. 71-76.

T. Yamazaki et al, "Integrated Management of Household Information and Power", Next Generation Home Network Seminar 2008, Mar. 6, 2008.

International Search Report of PCT/JP2008/001473, mailing date of Sep. 16, 2008.

Notification of Transmittal of Translation of the International Preliminary Report on Patentability (Form PCT/IB/338) of International Application No. PCT/JP2008/001473 mailed Dec. 30, 2009 with forms PCT/IB/373 and PCT/ISA/237.

Supplementary European Search Report dated Nov. 4, 2010, issued in corresponding European Patent Application No. 08764070.2.

* cited by examiner

FIG. 7

| ELECTRIC DEVICE | POWER USAGE STATE | DISPOSED POSITION |
|---|---|---|
| A | PWcht1_A | $[210; x_{211}, y_{211}, z_{211}; T1\_A]$<br>$[210; x_{211}, y_{211}, z_{211}; T2\_A]$<br>$\vdots$ |
| B | PWcht1_B | $[210; x_{212}, y_{212}, z_{212}; T1\_B]$<br>$[210; x_{212}, y_{212}, z_{212}; T2\_B]$<br>$\vdots$ |
| $\vdots$ | $\vdots$ | $\vdots$ |
| J | PWcht1_J | $[240; x_{241}, y_{241}, z_{241}; T1\_J]$<br>$[240; x_{241}, y_{241}, z_{241}; T2\_J]$<br>$\vdots$ |

TBL

FIG. 18

| TYPE | CHARACTERISTIC QUANTITY |
|---|---|
| REFRIGERATOR | CH1 |
| ELECTRIC OVEN | CH2 |
| COFFEE MAKER | CH3 |
| TV | CH4 |
| CEILING LIGHT | CH5 |
| IRON | CH6 |
| DESK LIGHT | CH7 |
| ELECTRONIC PIANO | CH8 |
| WASHING MACHINE | CH9 |
| HAIR DRYER | CH10 |
| VACUUM CLEANER | CH11 |

TYCH

FIG. 21

| ELECTRIC DEVICE | POWER USAGE STATES | DISPOSED POSITION |
|---|---|---|
| REFRIGERATOR | PWcht1_A | $[210; x_{211}, y_{211}, z_{211}; T1\_A]$<br>$[210; x_{211}, y_{211}, z_{211}; T2\_A]$<br>$\vdots$ |
| ELECTRIC OVEN | PWcht1_B | $[210; x_{212}, y_{212}, z_{212}; T1\_B]$<br>$[210; x_{212}, y_{212}, z_{212}; T2\_B]$<br>$\vdots$ |
| $\vdots$ | $\vdots$ | $\vdots$ |
| CEILING LIGHT | PWcht1_J | $[240; x_{241}, y_{241}, z_{241}; T1\_J]$<br>$[240; x_{241}, y_{241}, z_{241}; T2\_J]$<br>$\vdots$ |

TBL-1

FIG. 36

| OUTLET | ELECTRIC DEVICE | PRIORITY | CONTROL METHOD |
|---|---|---|---|
| 531 | HAIR DRYER | 4 | 100% |
| 532 | LAMP | 1 | 100% |
| 533 | HEATER | 2 | 100% |
| 534 | TV | 3 | 100% |

FIG. 37

| OUTLET | ELECTRIC DEVICE | PRIORITY | CONTROL METHOD |
|---|---|---|---|
| 531 | HAIR DRYER | 4 | 80% |
| 532 | LAMP | 1 | 100% |
| 533 | HEATER | 2 | 100% |
| 534 | TV | 3 | 90% |

HOME NETWORK, AREA NETWORK USING THE SAME, PROGRAM FOR COMPUTER TO EXECUTE OPERATION IN HOME NETWORK, AND COMPUTER-READABLE RECORDING MEDIUM STORING THE PROGRAM

TECHNICAL FIELD

The invention relates to a home network, an area network using the same, a program for a computer to execute an operation in a home network, and a computer-readable recording medium storing the program.

BACKGROUND ART

Conventionally, there is a known method of remote detection for detecting types and operating states of electric devices deployed in the home by using the characteristic quantity of the electric devices (Japanese Unexamined Patent Application Publication No. 2003-259569).

In this method of remote detection, users will learn the characteristic quantity of the respective electric devices and will have registered the characteristic quantity with the database preliminarily, and upon receiving the characteristic quantity of the respective electric devices from the outlet units to which the respective electric devices are connected, the home server compares the received characteristic quantity with those registered with the database to detect types and operating states of the respective electric devices.

The users accesses the home server over the Internet and obtains the types and operating states of the respective electric devices detected by the home server. In this manner, the users can remotely obtain types and operating states of electric devices in the home. In addition, if the positions of outlets are known preliminarily, connecting positions of the electric devices are also detected.

DISCLOSURE OF INVENTION

It is, however, difficult to estimate the number of people in the house using the method of remote detection disclosed in Japanese Unexamined Patent Application Publication No. 2003-259569 since the correspondence relation between the respective electric devices and their characteristic quantity needs to be registered with the database preliminarily to detect types and operating states of the electric devices by comparing the characteristic quantity of the actually used electric devices with those registered with the database.

Accordingly, the invention is aimed at solving the aforementioned problem, and one of its objects is to provide a home network where the number of residents in the house could be estimated while protecting their privacy.

Another object of the invention is to provide a home network where actions of the residents in the house could be estimated while protecting their privacy.

Further, another object of the invention is to provide a home network where the residents in the house can live safe without anxiety.

Further, another object of the invention is to provide an area network where the residents in the area can live a safe and eco-friendly life without anxiety.

Further, another object of the invention is to provide a program for a computer to execute an operation in a home network.

Further, another object of the invention is to provide a computer-readable recording medium storing a program for a computer to execute an operation in a home network.

According to the invention, a home network comprises n (n is 2 or a larger integer) electric devices, n modules, detection means, and estimation means. The n electric devices are disposed in a house. The n modules are provided corresponding to the n electric devices, each supplies power to the corresponding electric device from an outlet, and detects power usage states and disposed positions of the corresponding electric devices. The detection means detects operational states of actually operating m (m is an integer that satisfies $2 \leq m \leq n$) electric devices based on n power usage states transmitted from the n modules and detects a positional relation between m electric devices based on n disposed positions transmitted from the n modules. The estimation means estimates the number of residents in the house by determining achievability of operational states of the m electric devices based on the detected positional relation and operational states of the m electric devices.

Preferably, the home network further comprises sensing means and warning means. The sensing means senses an intruder in the house by determining achievability of operational states of the m electric devices with respect to the estimated number of people based on the estimated number of people and the detected positional relation and operational states of the m electric devices. The warning means warns the residents of sensing of an intruder if the sensing means senses the intruder.

Preferably, the home network further comprises sensing means and control means. The sensing means senses unusualness of the resident if it is detected that at least one operating time of the m electric devices is different from a reference operating time, based on the operational states of the m electric devices detected by the detection means. The control means outputs, upon sensing of unusualness of the resident, a control signal for blinking among the n electric devices at least some electric devices composed of a light to at least some of modules provided corresponding to the electric devices composed of the light. At least some of the modules provided corresponding to the electric devices composed of the light blink at least some of the electric devices composed of the light in response to the control signal.

Preferably, the home network further comprises transmission means. The transmission means transmits, upon sensing of unusualness of the resident, an unusualness message indicating that unusualness of the resident was detected to a terminal of a family member of the resident.

Preferably, the estimation means estimates types of the respective m electric devices based on a classification table of the n electric devices with respect to characteristics of the n electric devices and m operational states of the m electric devices, estimates functions of the respective m electric devices based on the estimated m types, estimates a positional relation between the residents and the m electric devices based on the estimated m functions, and estimates the number of residents in the house and their action by adding the estimated positional relation to a positional relation and operational states of the m electric devices.

Preferably, the home network further comprises control means. The control means calculates the total power usage in the house based on n power usage states transmitted from the n modules, and upon the calculated total power usage becomes to be equal to or larger than a threshold, producing a control signal for controlling power used by among the m electric devices j (j is a positive integer that satisfies $j \leq m$) electric devices whose operating state changes in steps or continuously so that the total power usage is smaller than the threshold to output to j modules provided corresponding to the j electric devices. In response to receiving of the control signal, each of the j modules limits, in steps or continuously, power supplied to a corresponding electric device.

Preferably, the home network further comprises an electricity generating device, an electricity storage device, and a power control device. The electricity generating device is disposed in the house. The electricity storage device stores power. The power control device controls the power balance in the house. When the sum of power generated by the electricity generating device and power from a power company exceeds the total power usage of the n electric devices, the power control device stores the surplus power into the electricity storage device.

Preferably, in case of power outage, the power control device controls k modules (k is a positive integer that satisfies $k \leq n$) provided corresponding to k electric devices necessary to sustain the lives of the residents so that power stored in the electricity storage device is supplied to the k electric devices. In response to a control by the power control device, each of the k modules supplies power to a corresponding electric device from the outlet.

Preferably, the power control device supplies power stored in the electricity storage device to a vehicle that runs on electric energy.

Preferably, the home network further comprises an electricity storage device and a power control device. The electricity storage device stores power. The power control device preliminarily holds power outage information and controls the power balance in the house. Upon sensing the beginning time of a power outage based on the power outage information, the power control device supplies among the m electric devices an electric device with a usage priority higher than a reference value with power to maintain operation thereof from the electricity storage device, determines necessity of power supply to an electric device with a usage priority equal to or lower than the reference value from the electricity storage device based on power stored in the electricity storage device and the power usage states, and in response to the determination result, limits or maintains power supply to the electric device with a usage priority equal to or lower than the reference value from the electricity storage device.

Preferably, if the number of the m electric devices increases or decreases during the power outage, the power control device re-calculates power stored in the electricity storage device and the power consumption of electric devices connected to the electricity storage device, and using the re-calculated power and power consumption, controls power supply from the electricity storage device to an electric device with the usage priority higher than a reference value and an electric device with the usage priority equal to or lower than the reference value.

According to the invention, an area network comprises a plurality of home networks and a power control device. The plurality of home networks are disposed in a plurality of houses. The power control device carries out power exchange between the plurality of home networks. Each of the plurality of home networks includes n (n is 2 or a larger integer) electric devices, n modules, detection means, estimation means, an electricity generating device, an electricity storage device, and a power control device. The n electric devices are disposed in a house. The n modules are provided corresponding to the n electric devices, each supplies power to a corresponding electric device from an outlet, and detect power usage states and disposed positions of the corresponding electric devices. The detection means detects operational states of actually operating m (m is an integer that satisfies $2 \leq m \leq n$) electric devices based on n power usage states transmitted from the n modules and detects a positional relation between the m electric devices based on n disposed positions transmitted from the n modules. The estimation means estimates the number of residents in the house by determining achievability of operational states of the m electric devices based on the detected positional relation and operational states of the m electric devices. The electricity generating device is disposed in the house. The electricity storage device stores power. The power control device controls the power balance in the house. If the sum of power generated by the electricity generating device and power from a power company exceeds the total power usage of the n electric devices, the power control device stores the surplus power into the electricity storage device. The power control device supplies power stored in the electricity storage device of a house having surplus power to the electricity storage device of another house suffering from a power shortage.

Further, according to the invention, a program is for a computer to execute a first step of reception means receiving n (n is 2 or a larger integer) power usage states and n disposed positions of n electric devices disposed in a house; a second step of detection means detecting operational states of actually operating m (m is an integer that satisfies $2 \leq m \leq n$) electric devices based on the received n power usage states and detects a positional relation between the m electric devices based on the received n disposed positions; and a third step of estimation means estimating the number of residents in the house by determining achievability of operational states of the m electric devices based on the detected positional relation and operational states of the m electric devices.

Preferably, the program is for the computer to further execute a fourth step of sensing means sensing an intruder in the house by determining achievability of operational states of the m electric devices with respect to the estimated number of people based on the estimated number of people and the detected positional relation and operational states of the m electric devices; and a fifth step of if an intruder is sensed by the sensing means, warning means warning the resident of sensing of the intruder.

Preferably, the third step includes: a first sub-step of the estimation means estimating types of the respective m electric devices based on a classification table of the n electric devices with respect to characteristics of the n electric devices and m power usage states of the m electric devices; a second sub-step of the estimation means estimating functions of the respective m electric devices based on the estimated m types; a third sub-step of the estimation means estimating a positional relation between the residents and the m electric devices based on the estimated m functions; and a fourth sub-step of the estimation means estimating the number of residents of the house and their action by adding the estimated positional relation to a positional relation and operational states of the m electric devices.

Preferably, the program is for the computer to further execute a sixth step of operation means calculating the total power usage in the house based on n power usage states transmitted from n modules provided corresponding to the n electric devices; and a seventh step of if the calculated total power usage is equal to or larger than a threshold, control means controlling power used by among the m electric devices j (j is a positive integer that satisfies $j \leq m$) electric devices whose operating state changes in steps or continuously so that the total power usage is smaller than the threshold.

Preferably, the program is for the computer to further execute a sixth step of if the sum of power generated by an electricity generating device disposed in the house and power from a power company exceeds the total power usage of the n electric devices, a power control device storing the surplus power into an electricity storage device.

Preferably, the program is to for the computer further execute a seventh step of in case of power outage, the power control device controlling power stored in the electricity storage device so as to be supplied to k (k is a positive integer that satisfies k≦n) electric devices necessary to sustain the lives of the residents.

Preferably, the program is for the computer to further execute a seventh step of the power control device supplying power stored in the electricity storage device to a vehicle that runs on electric energy.

Further, according to the invention, a computer-readable recording medium stores the program.

The invention measures power usage states of electric devices disposed in a house, and based on the measured power usage states, estimates the number of residents in the house by determining achievability of operational states of the respective electric devices.

Therefore, the invention allows for estimation of the number of residents in the house while protecting their privacy.

Further, the invention measures power usage states of electric device disposed in a house, and based on the measured power usage states, detects operational states of the respective electric devices, and based on the detected operational states, estimates types and functions of the electric devices and a positional relation between the electric devices and the residents. Then, the invention estimates the number of residents in the house and their action based on operational states and types of electric devices and a positional relation between the electric devices and the resident.

Therefore, the invention allows for estimation of the number of residents in the house and their action while protecting their privacy.

Further, in the present invention, an intruder in the house is detected based on operational states of electric devices.

Therefore, the invention allows the residents to live life without anxiety.

Further, according to the invention, if there is any extra power generated in the respective houses, the power is stored, and the respective electric devices are operated using the stored power in case of emergency.

Therefore, the invention allows the residents to live an eco-friendly life.

Further, according to the invention, power is exchanged between the respective houses in an area, and surplus power in a house is supplied to another house having a power shortage.

Therefore, the invention allows for the residents in an area to live an eco-friendly life.

BRIEF DESCRIPTION OF DRAWINGS

FIG. 7 is a conceptual diagram of a correspondence table representing a correspondence relation between electric devices, power usage states and disposed positions.

FIG. 18 is a conceptual diagram of a correspondence table between the characteristic quantities and types of electric devices.

FIG. 21 is a conceptual diagram of another correspondence table representing a correspondence relation between electric devices, their power usage states and disposed positions.

FIG. 36 illustrates information displayed by the user terminal if there is no power outage.

FIG. 37 illustrates information displayed by the user terminal in case of power outage.

BEST MODE FOR CARRYING OUT THE INVENTION

Figure 1:
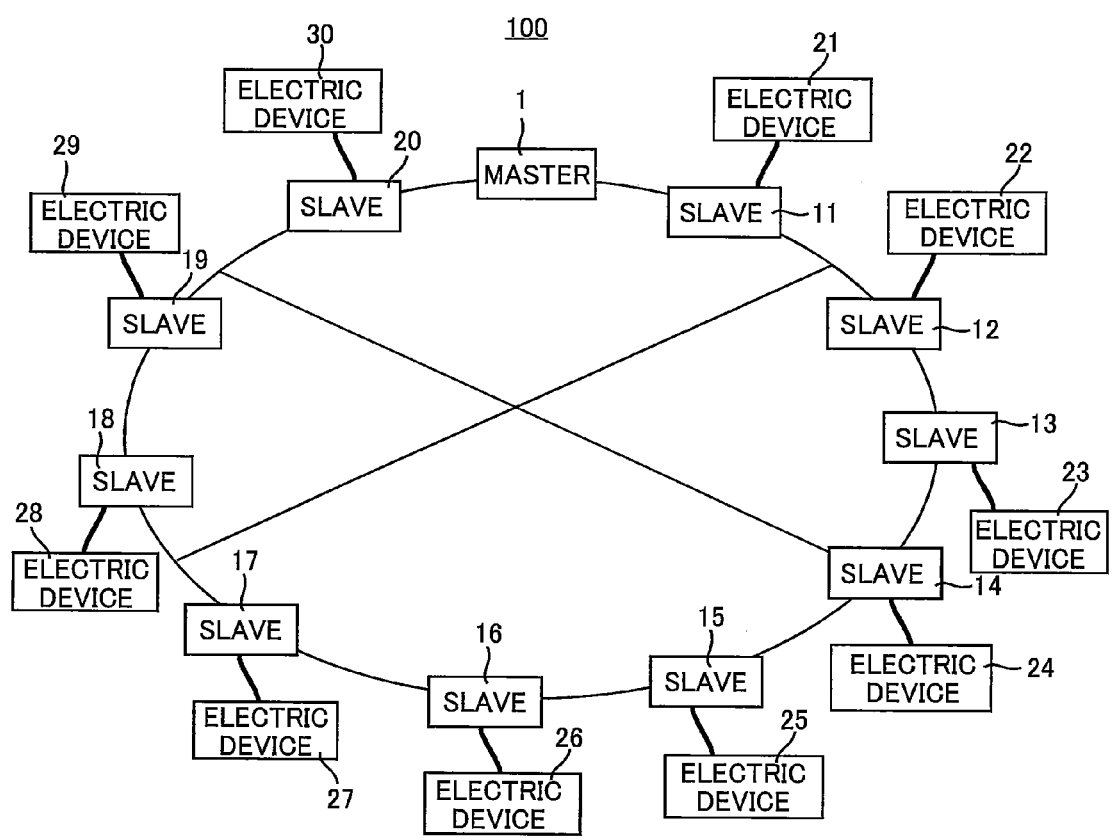
FIG. 1 is a schematic view illustrating the configuration of a home network according to Embodiment 1 of the present invention.

The invention will now be described in embodiments with reference to the drawings more specifically. In the figures, identical or like components are identically denoted by the same reference characters and explanations thereof are not repeated.

Embodiment 1

FIG. 1 is a schematic view illustrating the configuration of a home network according to Embodiment 1 of the present invention. With reference to FIG. 1, a home network 100 according to Embodiment 1 of the present invention comprises a master 1, slaves 11 to 20, electric devices 21 to 30. The home network 100 is disposed in a house.

The master 1 and the slaves 11 to 20 can communicate with each other by wire or wirelessly. The electric devices 21 to 30 are respectively connected to the slaves 11 to 20 with electric wiring.

The slaves 11 to 20 are connected to outlets in the house. When the respective electric devices 21 to 30 are turned on, the slaves 11 to 20 supply power respectively to the electric devices 21 to 30 from outlets to which the respective slaves 11 to 20 themselves are connected.

The slaves 11 to 20 also synchronize each other, respectively detect power usage states and disposed positions of the electric devices 21 to 30 in real time, and transmits the detected power usage states and disposed positions to the master 1 by wire or wirelessly.

The electric devices 21 to 30 are disposed in each room such as a kitchen, a living room, a bed room and a Japanese-style room in the house. The electric devices 21 to 30 include a ceiling light, a desk light, a coffee maker, a refrigerator, an electric oven, an iron, a TV, a washing machine, an electric heater, a hair dryer, and an electronic piano.

The master 1 receives the power usage states and disposed positions transmitted by the slaves 11 to 20, and based on the received power usage states and disposed positions, estimates the number of residents in the house by using the methods described below.

The master 1 also calculates the total power usage PW_total in the house based on the power usage states transmitted by the slaves 11 to 20, and if the calculated total power usage PW_total is equal to or larger than a threshold PW_th, the master 1 controls the slaves 11 to 20 so that the total power usage PW_total becomes smaller than the threshold PW_th.

Figure 2:
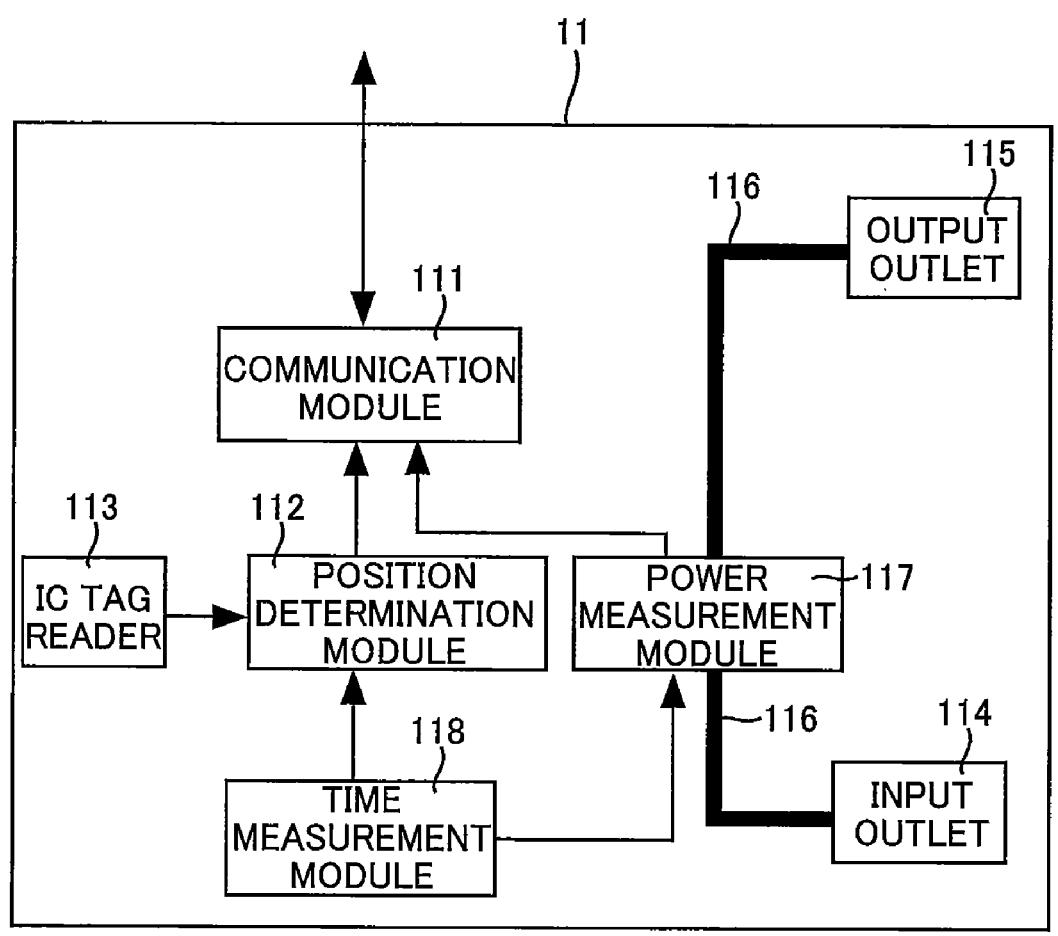
FIG. 2 is a schematic block diagram illustrating the configuration of the slave shown in FIG. 1.

FIG. 2 is a schematic block diagram illustrating the configuration of the slave 11 shown in FIG. 1. With reference to FIG. 2, the slave 11 includes a communication module 111, a position determination module 112, an IC tag reader 113, an input outlet 114, an output outlet 115, a wiring 116, a power measurement module 117, and a time measurement module 118.

The communication module 111 communicates with the master 1. More specifically, the communication module 111 transmits, to the master 1, the disposed position received from the position determination module 112 and the power usage state received from the power measurement module 117.

The position determination module 112 receives position information from the IC tag reader 113, and time information from the time measurement module 118. Then, the position determination module 112 determines, in real time, the disposed position of the electric device 21 connected to the slave 11 based on the received position information and time information and outputs the determined disposed position to the communication module 111.

The IC tag reader 113 reads out position information from an IC tag attached to the outlets in the respective rooms and outputs the read-out position information to the position determination module 112.

The input outlet 114 is attached/detached to/from the outlets in the respective rooms. The output outlet 115 is attached/detached to/from an outlet of the electric device 21. The wiring 116 is disposed between the input outlet 114 and the output outlet 115.

The power measurement module 117 is disposed in the wiring 116. The power measurement module 117 measures, in real time, the usage state of power that is supplied to the wiring 116 via the input outlet 114 based on the time information received from the time measurement module 118 and outputs the measured power usage state to the communication module 111.

The time measurement module 118 synchronizes with the time measurement module 118 in other slaves and measures time by using SNTP (Simple Network Time Protocol) or NTP (Network Time Protocol) and outputs time information on the measured time to the position determination module 112 and the power measurement module 117.

Note that each of the slaves 12 to 20 shown in FIG. 1 has the same configuration as that of the slave 11 shown in FIG. 2.

Figure 3:
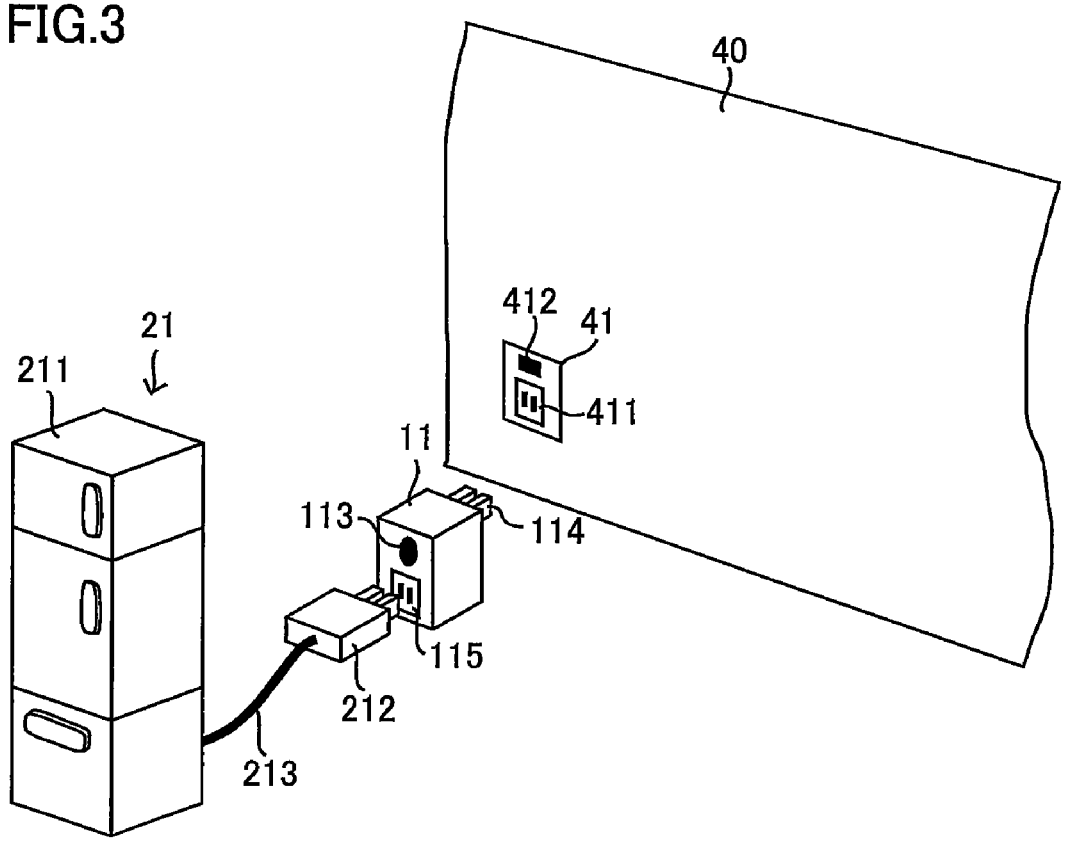
FIG. 3 illustrates a connection relation between an outlet, a slave and an electric device.

FIG. 3 illustrates a connection relation between an outlet, a slave and an electric device. With reference to FIG. 3, the electric device 21 includes a refrigerator 211, an outlet 212, and a wiring 213. One end of the wiring 213 is connected to the refrigerator 211, and the other end is connected to the outlet 212. The outlet 212 is attached/detached to/from the output outlet 115 of the slave 11.

The outlet 41 is disposed in a wall 40. The outlet 41 includes an inlet 411 and an IC tag 412. The inlet 411 is supplied with utility power via a power system in the house. The IC tag 412 stores position information on the outlet 41. This position information is composed of xyz coordinates.

The input outlet 114 of the slave 11 is attached/detached to/from the inlet 411 of the outlet 41.

When the input outlet 114 of the slave 11 is inserted into the inlet 411 of the outlet 41 and the outlet 212 into the output outlet 115 of the slave 11, the slave 11 receives power via the input outlet 114 and outputs the received power from the output outlet 115 via the wiring 116.

The refrigerator 211 receives power via the outlet 212 and the wiring 213 and operates by using the received power.

Then, the power measurement module 117 of the slave 11 measures, in real time, the power usage state of the refrigerator 211 by measuring power flowing across the wiring 116 from the input outlet 114 to the output outlet 115.

The IC tag reader 113 of the slave 11 reads out position information stored in the IC tag 412 of the outlet 41 and outputs the read-out position information to the position determination module 112. Then, the position determination module 112 of the slave 11 determines, in real time, the disposed position of the refrigerator 211 in the house based on the position information received from the IC tag reader 113 by using the methods described below.

Then, the communication module 111 of the slave 11 transmits the power usage state and disposed position of the refrigerator 211 to the master 1 by wire or wirelessly.

As described above, the slave 11 supplies power from the outlet 41 to the refrigerator 211, measures the power usage state and disposed position of the refrigerator 211 to transmit to the master 1.

Figure 4:
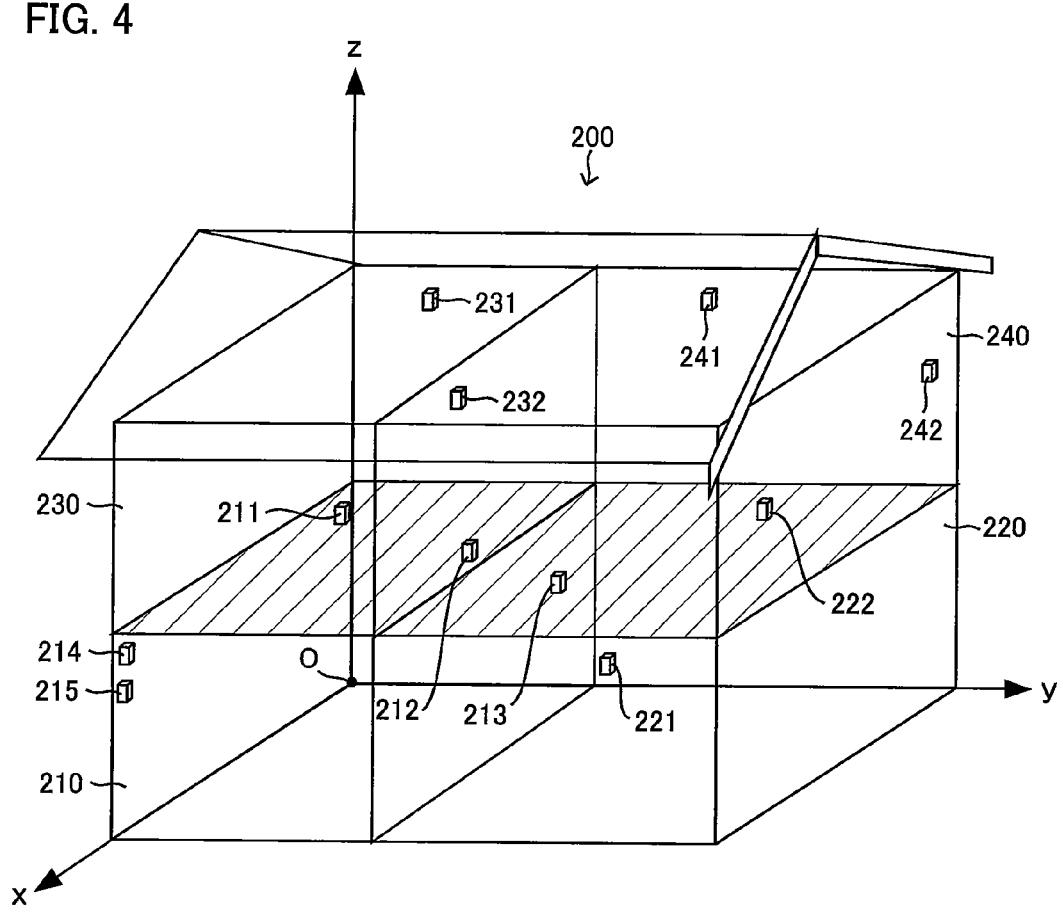
FIG. 4 illustrates how to determine the disposed position of the respective electric devices.

FIG. 4 illustrates how to determine the disposed position of the respective electric devices. With reference to FIG. 4, a house 200 is disposed in the xyz-space in a manner where one corner of the house 200 is at the origin O of the xyz coordinates. The house 200 includes a living room 210, a Japanese-style room 220, and western-style rooms 230 and 240, for example. The living room 210 and the Japanese-style room 220 are disposed on the first floor, and the Western-style rooms 230 and 240 are disposed on the second floor.

The outlets 211 to 215 are mounted in a wall of the living room 210, and the outlets 221 and 222 are mounted in a wall in the Japanese-style room. The outlets 231 and 232 are mounted in a wall of the Western-style room 230, and the outlets 241 and 242 are mounted in a wall of the Western-style room 240.

Each of the outlets 211 to 215, 221, 222, 231, 232, 241, and 242 includes an outlet 41 shown in FIG. 3.

A point in the living room 210 is specified by the xyz coordinates which are within [0, 0, 0] to [x1, y1, z1] and a point in the Japanese-style room 220 is specified by the xyz coordinates which are within [x2, y2, z2] to [x3, y3, z3]. A point in the Western-style room 230 is specified by the xyz coordinates which are within [x4, y4, z4] to [x5, y5, z5], and a point in the Western-style room 240 is specified by the xyz coordinates which are within [x6, y6, z6] to [x7, y7, z7]. In this case, the coordinates satisfy x2>x1, y2>y1, z4>z1, z4>z3, x6>x1, x6>x5, y6>y1, and y6>y5.

The IC tag 412 of the outlets 211 to 215 disposed in the living room 210 stores position information respectively having $[x_{211}, y_{211}, z_{211}]$, $[x_{212}, y_{212}, z_{212}]$, $[x_{213}, y_{213}, z_{213}]$, $[x_{214}, y_{214}, z_{214}]$, and $[x_{215}, y_{215}, z_{215}]$.

The IC tag 412 of the outlets 221 and 222 disposed in the Japanese-style room 220 stores position information respectively having $[x_{221}, y_{221}, z_{221}]$ and $[x_{222}, y_{222}, z_{222}]$.

Further, the IC tag 412 of the outlets 231 and 232 disposed in the Western-style room 230 stores position information respectively having $[x_{231}, y_{231}, z_{231}]$ and $[x_{232}, y_{232}, z_{232}]$.

Further, the IC tag 412 of the outlets 241 and 242 disposed in the Western-style room 240 stores position information respectively having $[x_{241}, y_{241}, z_{241}]$ and $[x_{242}, y_{242}, z_{242}]$.

For example, when the input outlet 114 of the slave 11 is inserted in the outlet 211 and the outlet 212 of the electric device 21 is inserted in the output outlet 115 of the slave 11, the IC tag reader 113 of the slave 11 reads out the xyz coordinates $[x_{211}, y_{211}, z_{211}]$ stored in the IC tag 412 of the outlet 211 and outputs the read-out xyz coordinates $[x_{211}, y_{211}, z_{211}]$ to the position determination module 112.

The position determination module 112 of the slave 11 maintains the ranges [0, 0, 0] to [x1, y1, z1], [x2, y2, z2] to [x3, y3, z3], [x4, y4, z4] to [x5, y5, z5], [x6, y6, z6] to [x7, y7, z7] of the xyz coordinates that a point in the living room 210, the Japanese-style room 220 and the Western-style rooms 230 and 240 may take.

Then, the position determination module 112 of the slave 11 compares, at time [YYYY/MMMM/DDDD/HHHH/MMMM/SSSS], the xyz coordinates $[x_{211}, y_{211}, z_{211}]$ received from the IC tag reader 113 with the coordinates' range [0, 0, 0] to [x1, y1, z1], [x2, y2, z2] to [x3, y3, z3], [x4, y4, z4] to [x5, y5, z5], [x6, y6, z6] to [x7, y7, z7] and detects that the xyz coordinates $[x_{211}, y_{211}, z_{211}]$ are within the coordinates' range [0, 0, 0] to [x1, y1, z1] of the xyz coordinates.

Then, the position determination module 112 of the slave 11 determines that the disposed position of the electric device 21 connected to the outlet 211 is at the xyz coordinates $[x_{211}, y_{211}, z_{211}]$ in the living room 210 and outputs the disposed position including [living room; $x_{211}, y_{211}, z_{211}$, YYYY/MMMM/DDDD/HHHH/MMMM/SSSS] to the communication module 111.

When the slave 11 is inserted into the other outlets 212 to 215, 221, 222, 231, 232, 241, and 242, the position determination module 112 also determines, in the same manner, the disposed position of electric devices connected to the slave 11 to output to the communication module 111.

The position determination module 112 of the slaves 12 to 20 also determines, in the same manner as that of the position determination module 112 of the slave 11, the disposed position of electric devices connected to the slaves 12 to 20 to output to the communication module 111.

As described above, each of the slaves 11 to 20 reads out position information of an outlet to which oneself is connected and determines the position specified by the read-out position information as the disposed position of the electric device connected to oneself.

Note that the slaves 11 to 20 determines the disposed position of electric devices every one second, for example, and transmits it to the master 1.

Figure 5:
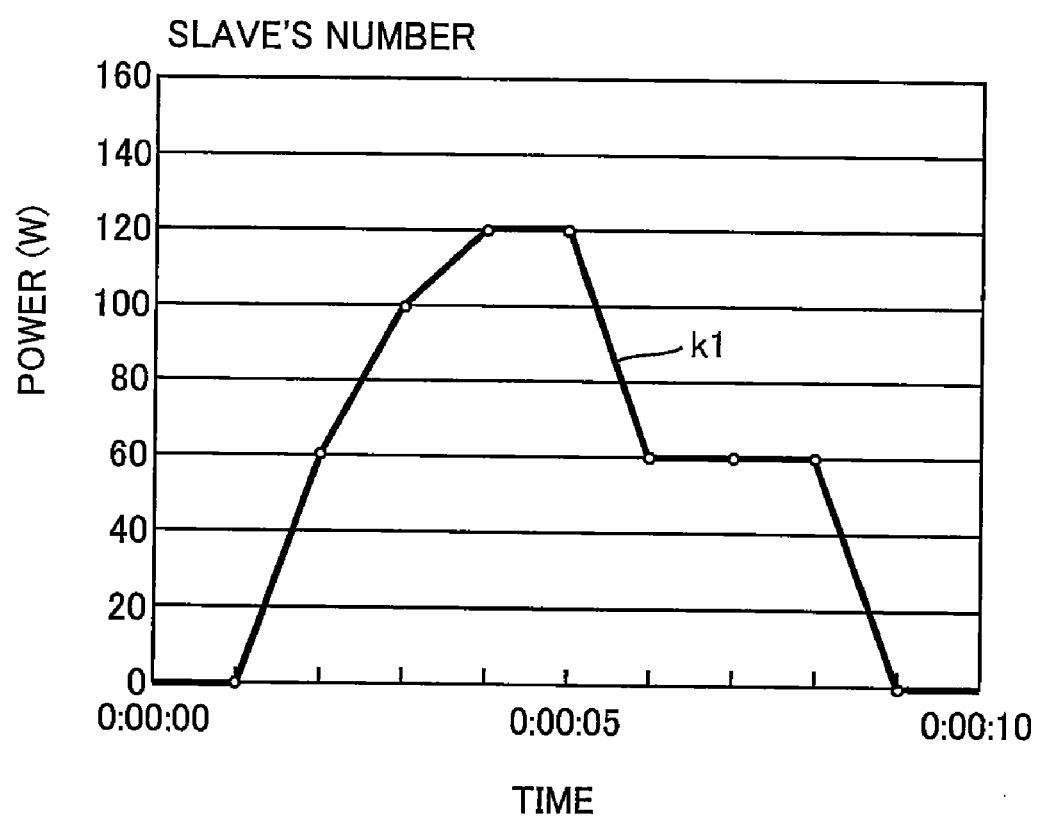
FIG. 5 is a conceptual diagram of power usage state.

FIG. 5 is a conceptual diagram of power usage state. In FIG. 5, the vertical axis represents power, and the abscissa axis represents time. Curve k1 illustrates the power usage state of an electric device. Curve k1 illustrates that an electric device does not use power between time 0:00:00 and time 0:00:01, starts using power at time 0:00:01, uses power between time 0:00:01 and time 0:00:09 in a pattern, and stops using power at time 0:00:09.

The power measurement module 117 of the slaves 11 to 20 measures, in real time, power usage states (refer to curve k1) of electric devices connected to the slaves 11 to 20 every ten seconds, for example, and outputs the measured power usage states to the communication module 111.

In the respective slaves 11 to 20, upon receiving a disposed position [room type; x, y, z; YYYY/MMMM/DDDD/HHHH/MMMM/SSSS] from the position determination module 112, the communication module 111 produces another disposed position [slave's number; room type; x, y, z; YYYY/MMMM/DDDD/HHHH/MMMM/SSSS] by adding the number of each of the slaves 11 to 20 to the received disposed position and outputs it to the master 1.

In the respective slaves 11 to 20, upon receiving power usage states from the power measurement module 117, the communication module 111 adds the number of each of the slaves 11 to 20 to the received power usage states and transmits it to the master 1 (refer to FIG. 5).

Figure 6:
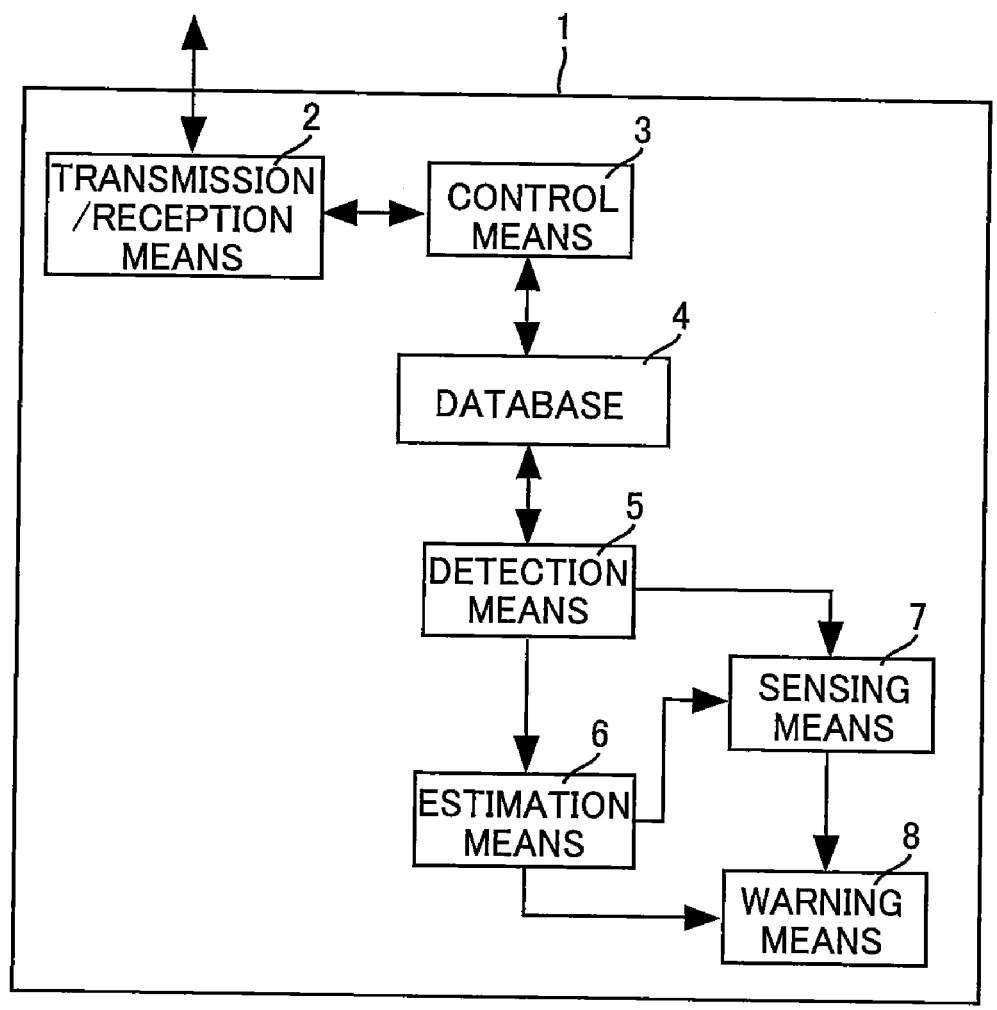
FIG. 6 is a schematic block diagram illustrating the configuration of the master shown in FIG. 1.

FIG. 6 is a schematic block diagram illustrating the configuration of the master 1 shown in FIG. 1. With reference to FIG. 6, the master 1 includes transmission/reception means 2, control means 3, a database 4, detection means 5, estimation means 6, sensing means 7, and warning means 8.

The transmission/reception means 2 receives power usage states and disposed positions of the respective electric devices 21 to 30 from the respective slaves 11 to 20 and outputs the received power usage states and disposed positions to the control means 3.

The control means 3 receives the power usage states and disposed positions from the transmission/reception means 2 and produces a correspondence table representing a correspondence relation between electric devices, power usage states and disposed positions based on the received power usage states and disposed positions by using the methods described below, and stores it in the database 4.

The database 4 stores the correspondence table received from the control means 3, and in response to an read-out request from the detection means 5, outputs the correspondence table to the detection means 5.

The detection means 5 reads out, from the database 4, the correspondence table representing power usage states and disposed positions of the respective electric devices 21 to 30. Then, the detection means 5 detects operational state of the respective electric devices 21 to 30 based on the power usage states in the read-out correspondence table. More specifically, as shown in FIG. 5, the power usage states include a power change with respect to time, and therefore, the detection means 5 detects that electric device is on operation between time 0:00:01 and time 0:00:09 and produces operational state including [0:00:01 to 0:00:09/ON].

The detection means 5 also detects the positional relation between the electric devices 21 to 30 based on the disposed positions of the respective electric devices 21 to 30 in the correspondence table that has been read out from the database 4. More specifically, the detection means 5 determines the disposed position of one of the electric devices 21 to 30 as the reference, calculates the distance between the reference electric device and the rest of the electric devices, and produces the positional relation between the electric devices 21 to 30, which reflects the calculated distance.

Then, the detection means 5 outputs the operational state and positional relation to the estimation means 6 and the sensing means 7.

The estimation means 6 estimates the number of residents in the house 200 based on the operational state and positional relation received from the detection means 5 by using the methods described below. Then, the estimation means 6 outputs the estimated number to the sensing means 7 and the warning means 8.

The sensing means 7 receives the operational state and positional relation of the electric devices 21 to 30 from the detection means 5, and receives the number of residents in the house 200 from the estimation means 6. Then, the sensing means 7 senses whether there is any intruder in the house 200 based on the operational state and positional relation of the electric devices 21 to 30 and the number of residents by using the methods described below, and if senses an intruder in the house 200, outputs "Intruder Detected" to the warning means 8.

The warning means 8 includes display means and alarm means and receives the number of residents from the estimation means 6, and receives "Intruder Detected" from the sensing means 7. Then, the warning means 8 displays the number of residents or "Intruder Detected" by the display means, or sounds an alarm by the alarm means in response to "Intruder Detected".

FIG. 7 is a conceptual diagram of a correspondence table representing a correspondence relation between electric devices, power usage states and disposed positions. The transmission/reception means 2 of the master 1 receives a power usage state and a disposed position from the slaves 11 to 20 and outputs the received power usage state and disposed position to the control means 3.

The power usage state received from the slave 11 is numbered "11" that is the number of the slave 11, and the disposed position received from the slave 11 includes [11; 210; x, y, z; YYYY/MMMM/DDDD/HHHH/MMMM/SSSS], and therefore, the control means 3 detects the number "11" of the slave 11 from the power usage state and disposed position and determines an electric device (any one of the electric devices 21 to 30) connected to the slave 11 as electric device A. Then, the control means 3 associates, with the number "11" of the slave 11, the electric device A, the power usage state PWcht1_A (which actually is the power usage state shown in FIG. 5), and disposed positions [210; $x_{211}, y_{211}, z_{211}$; T1_A], [210; $x_{211}, y_{211}, z_{211}$; T2_A], . . . with each other. As described above, the disposed position of the respective electric devices 21 to 30 are determined every one second, and the power usage states are measured every ten seconds, and therefore, a plurality of disposed positions [210; $x_{211}, y_{211}, z_{211}$; T1_A], [210; $x_{211}, y_{211}, z_{211}$; T2_A], . . . are associated with the one power usage state PWcht1_A.

Based on the power usage states and disposed positions received from the slaves 12 to 20, the control means 3 associates, in the same manner, electric devices B, C, D, E, F, G, H, I, and J respectively connected to the slaves 12 to 20, power usage states PWcht1_B, PWcht1_C, PWcht1_D, PWcht1_E, PWcht1_F, PWcht1_G, PWcht1_H, PWcht1_I, PWcht1_J, and disposed positions [210; $x_{212}, y_{212}, z_{212}$; T1_B], [210; $x_{212}, y_{212}, z_{212}$; T2_B], . . . ; . . . ; [240; $x_{241}, y_{241}, z_{241}$; T1_J], and [240; $x_{212}, y_{212}, z_{212}$; T2_B] . . . with each other.

Then, the control means 3 produces a correspondence table TBL in which the electric devices A to J, the power usage states PWcht1_A to PWcht1_J, and the disposed position [210; $x_{212}, y_{212}, z_{212}$; T1_A], [210; $x_{212}, y_{212}, z_{212}$; T2_A], . . . ; . . . ; [240; $x_{241}, y_{241}, z_{241}$; T1_J], [240; $x_{212}, y_{212}, z_{212}$; T2_J] . . . are associated with each other, and stores the produced correspondence table TBL in the database 4. Note that each of T1, T2, . . . in the disposed positions is composed of YYYY/MMMM/DDDD/HHHH/MMMM/SSSS.

As described above, the master 1 manages the electric devices 21 to 30 respectively as the electric devices A to J. This is because the slaves 11 to 20 do not detect the electric devices 21 to 30 themselves.

Figure 8:
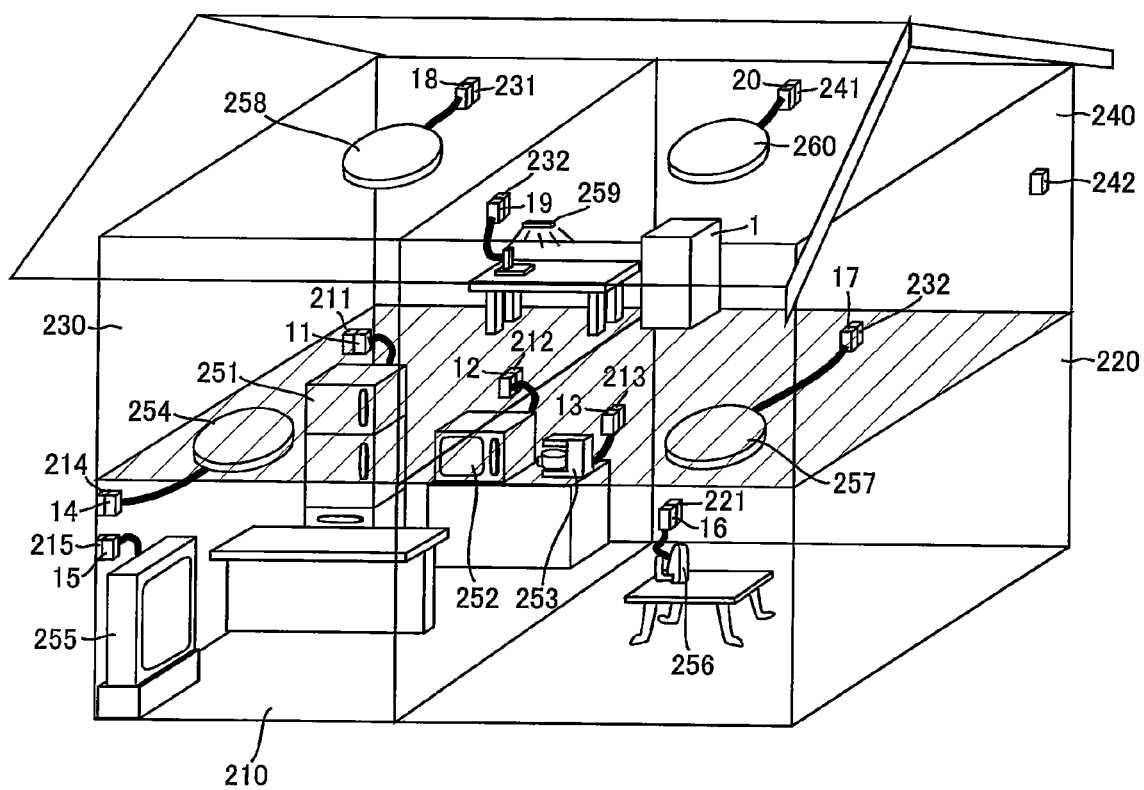
FIG. 8 is a schematic view illustrating an arrangement of the respective electric devices in the house.

FIG. 8 is a schematic view illustrating an arrangement of the respective electric devices in the house 200. With reference to FIG. 8, the slave 11 to 15 are respectively connected to the outlets 211 to 215 disposed in the living room 210, and the slaves 16 and 17 are connected to the outlets 221 and 222 disposed in the Japanese-style room 220. The slaves 18 and 19 are connected to the outlets 231 and 232 disposed in the Western-style room 230, and the slave 20 is connected to the outlet 241 disposed in the Western-style room 240.

The refrigerator 251 is connected to the slave 11, the electric oven 252 is connected to the slave 12, and the coffee maker 253 is connected to the slave 13. The ceiling light 254 is connected to the slave 14, and the TV 255 is connected to the slave 15.

Further, the iron 256 is connected to the slave 16, and the ceiling light 257 is connected to the slave 17. Further, the ceiling light 258 is connected to the slave 18, the desk light 259 is connected to the slave 19, and the ceiling light 260 is connected to the slave 20. Further, the master 1 is disposed in the Western-style room 240, for example.

Note that the outlets 211 to 215, 221, 222, 231, 232, 241, and 242 are supplied with utility power through a power system (not shown) installed in the house 200.

The slave 11 supplies power from the outlet 211 to the refrigerator 251, measures the power usage state of the refrigerator 251, and determines the disposed position of the refrigerator 251 by using the methods described above. Then, the slave 11 transmits the power usage state and disposed position to the master 1 by wire or wirelessly.

The slaves 12 to 20 supplies power from the outlets 212 to 215, 221, 222, 231, 232, and 241 to the electric oven 252, the coffee maker 253, the ceiling light 254, the TV 255, the iron 256, the ceiling light 257, the ceiling light 258, the desk light 259, and the ceiling light 260, respectively; measures the power usage states of the electric oven 252, the coffee maker 253, the ceiling light 254, the TV 255, the iron 256, the ceiling light 257, the ceiling light 258, the desk light 259, and the ceiling light 260; and determines the disposed positions of the electric oven 252, the coffee maker 253, the ceiling light 254, the TV 255, the iron 256, the ceiling light 257, the ceiling light 258, the desk light 259, and the ceiling light 260 by using the methods described above. Then, the respective slaves 12 to 20 transmit the power usage states and disposed positions of the electric oven 252, the coffee maker 253, the ceiling light 254, the TV 255, the iron 256, the ceiling light 257, the ceiling light 258, the desk light 259, and the ceiling light 260 to the master 1 by wire or wirelessly.

The transmission/reception means 2 of the master 1 receives, from the slaves 11 to 20, the power usage states and disposed positions of the refrigerator 251, the electric oven 252, the coffee maker 253, the ceiling light 254, the TV 255, the iron 256, the ceiling light 257, the ceiling light 258, the desk light 259, and the ceiling light 260, respectively and outputs the received power usage states and disposed positions to the control means 3.

Then, the control means 3 of the master 1 produces the above-described correspondence table TBL based on the power usage states and disposed positions received from the transmission/reception means 2 to store in the database 4. Note that the master 1 manages the refrigerator 251, the electric oven 252, the coffee maker 253, the ceiling light 254, the TV 255, the iron 256, the ceiling light 257, the ceiling light 258, the desk light 259, and the ceiling light 260 respectively as the electric devices A to J.

The detection means 5 of the master 1 reads out the correspondence table TBL from the database 4, detects the operational states of the electric devices A to J based on the power usage states in the read-out correspondence table TBL, and detects the positional relation between the electric devices A to J based on the disposed positions in the correspondence table TBL.

In this case, the detection means 5 of the master 1 detects, for example, the operational state [electrical device A/T1 to T5/ON] of the electric device A (=the refrigerator 251), the operational state [electrical device I/T1 to T6/ON] of the electric device I (=the desk light 259), the operational state [electrical device B/T7 to T10/ON] of the electric device B (=the electric oven 252), the operational state [electrical device C/T6 to T9/ON] of the electric device C (the coffee maker 253), the operational state [electrical device E/T11 to T15/ON] of the electric device E (=the TV 255), the operational state [electrical device F/T11 to T15/ON] of the electric device F (=the iron 256), and the operational state [electrical device H/T11 to T15/ON] of the electric device H (=the ceiling light 258).

Based on the disposed positions of the electric device A (=the refrigerator 251) and the electric device I (=the desk light 259) whose operating time overlaps, the detection means 5 of the master 1 also detects that the electric device A (=the refrigerator 251) is disposed in the living room 210 and that the electric device I (=the desk light 259) is disposed in the Western-style room 230, detects a distance L1 between the electric device A (=the refrigerator 251) and the electric device I (=the desk light 259), and then produces the positional relation including [electric device A (=the refrigerator 251): living room 210/electric device I (=the desk light 259): western-style room 230/L1].

Further, the detection means 5 of the master 1 produces, in the same manner, the positional relation [electric device B (=the electric oven 252): living room 210/electric device C (=the coffee maker 253): living room 210/L2] based on the disposed positions of the electric device B (=the electric oven 252) and the electric device C (=the coffee maker 253) whose operating time overlaps, and the positional relation [electrical device E (=the TV 255): living room 210/electric device F (=the iron 256): japanese-style room 220/electric device H (=the ceiling light 258): western-style room 230/L3, L4] based on the disposed positions of the electric device E (=the TV 255), the electric device F (=the iron 256) and the electric device H (=the ceiling light 258) whose operating time overlaps. In this case, distances L1, L3 and L4 are longer than a threshold Lth that is the maximum distance of one person's out stretched arms, and the distance L2 is equal to or shorter than the threshold Lth.

The detection means 5 outputs, to the estimation means 6 and the sensing means 7, the operational states [electric device A/T1 to T5/ON], [electric device I/T1 to T6/ON], [electric device B/T7 to T10/ON], [electric device C/T6 to T9/ON], [electric device E/T11 to T15/ON], [electric device F/T11 to T15/ON], [electric device H/T11 to T15/ON] and the positional relations [electric device A (=the refrigerator 251): living room 210/electric device I (=the desk light 259): western-style room 230/L1], [electric device B (=electric oven 252): living room 210/electric device C (=coffee maker 253): living room 210/L2], [electric device E (=TV 255): living room 210/electric device F(=iron 256): japanese-style room 220/electric device H (=ceiling light 258): western-style room 230/L3, L4].

Figure 9:
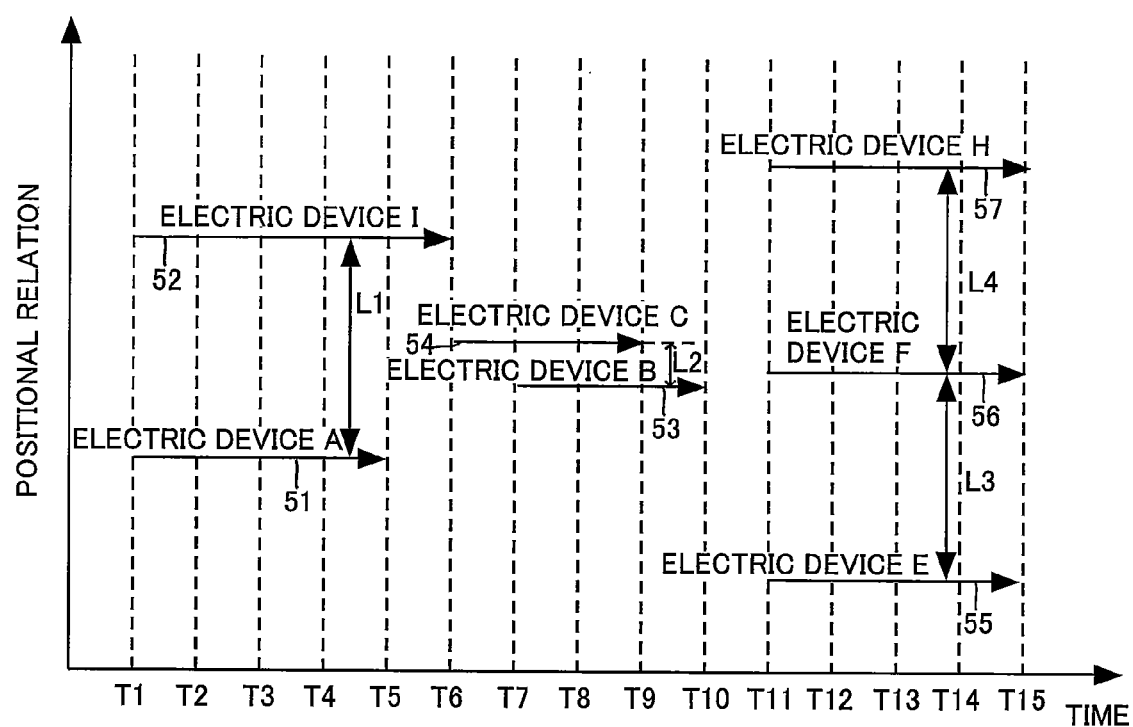
FIG. 9 illustrates operational states of the electric devices.

FIG. 9 illustrates operational states of the electric devices. Upon receiving, from the detection means 5, the operational states [electric device A/T1 to T5/ON], [electric device I/T1 to T6/ON], [electric device B/T7 to T10/ON], [electric device C/T6 to T9/ON], [electric device E/T11 to T15/ON], [electric device F/T11 to T15/ON], [electric device H/T11 to T15/ON] and the positional relations [electric device A (=refrigerator 251): living room 210/electric device I(=desk light 259): western-style room 230/L1], [electric device B (=electric oven 252): living room 210/electric device C (=coffee maker 253): living room 210/L2], [electric device E (=TV 255): living room 210/electric device F (=iron 256): japanese-style room 220/electric device H (=ceiling light 258): western-style room 230/L3, L4], the estimation means 6 produces a relation between the positional relation and time illustrated in FIG. 9.

More specifically, the estimation means 6 produces an arrow 51 representing the operational state of the electric device A (=the refrigerator 251) and an arrow 52 representing the operational state of the electric device I (=the desk light 259) based on the operational states [electric device A/T1 to T5/ON] and [electric device I/T1 to T6/ON] and the positional relation [electric device A (=refrigerator 251): living room 210/electric device I (=desk light 259): western-style room 230/L1]. In this case, the arrow 52 is away from the arrow 51 by the distance L1.

The estimation means 6 also produces an arrow 53 representing the operational state of the electric device B (=the electric oven 252) and an arrow 54 representing the operational state of the electric device C (=the coffee maker 253) based on the operational states [electric device B/T7 to T10/ON] and [electric device C/T6 to T9/ON] and the positional relation [electric device B (=electric oven 252): living room 210/electric device C (=coffee maker 253): living room 210/L2]. In this case, the arrow 54 is away from the arrow 53 by the distance L2.

Further, the estimation means 6 produces an arrow 55 representing the operational state of the electric device E (=the TV 255), an arrow 56 representing the operational state of the electric device F (=the iron 256), and an arrow 57 representing the operational state of the electric device H (=the ceiling light 258) based on the operational states [electric device E/T11 to T15/ON], [electric device F/T11 to T15/ON] and [electric device H/T11 to T15/ON] and the positional relation [electric device E (=the TV 255): living room 210/electric device F (=the iron 256): japanese-style room 220/electric device H (=the ceiling light 258): western-style room 230/L3, L4]. In this case, the arrow 56 is away from the arrow 55 by the distance L3, and the arrow 57 is away from the arrow 56 by the distance L4.

Then, based on the operational states (=the arrows 51 and 52) of the electric devices A and I, the estimation means 6 estimates that two different people turned on the electric devices A and I since the electric device A (=the refrigerator 251) and the electric device I (=the desk light 259) are away from each other by the distance L1 that is longer than the threshold Lth, which is the maximum distance of one resident's out stretched arms, and the electric device A (=the refrigerator 251) and the electric device I (=the desk light 259) were turned on at the same time (=T1).

Based on the operational states (=the arrows 53 and 54) of the electric devices B and C, the estimation means 6 also estimates that a single person turned on the electric devices B and C since the electric device B (=the electric oven 252) and the electric device C (=the coffee maker 253) are away from each other only by the distance L2 that is within the distance of one resident's out stretched arms and the electric devices B and C were turned on at different timings (T6 and T7).

Further, based on the operational states (=the arrows 55 to 57) of the electric devices E, F and H, the estimation means 6 estimates that different three people turned on the electric devices E, F and H since the electric device E (=the TV 255) and the electric device F (=the iron 256) are away from each other by the distance L3 that is longer than the distance of one resident's out stretched arms and the electric device F (=the iron 256) and the electric device H (=the ceiling light 258) are away from each other by the distance L4 that is longer than the distance of one resident's out stretched arms and the electric devices E, F and H were turned on at the same time (=T11).

The estimation means 6 repeatedly carries out the above-described estimation for a week, for example, to estimate the number of residents in the house 200 by determining achievability of that week's operational states of the electric devices. In this case, if the maximum number of electric devices that are away from each other by a distance that is longer than the distance of one resident's out stretched arms and were turned on at the same time is "3", the estimation means 6 estimates that the number of residents in the house 200 is "3 people".

As described above, the estimation means 6 estimates the number of residents in the house 200 by determining achievability of operational states of a plurality of electric devices based on the positional relation between the electric devices and their operational states.

Upon estimating the number of residents in the house 200, the estimation means 6 outputs the estimated number of residents to the sensing means 7 and the warning means 8.

The sensing means 7 receives the operational states and positional relation of electric devices from the detection means 5, and the number of residents from the estimation means 6. Then, the sensing means 7 produces a graph, such as the one illustrated in FIG. 9 illustrating the operational states of the electric devices, in the same manner as that of the estimation means 6, and based on the produced operational states of the electric devices, determines whether the operational state of the electric devices can be achieved by the estimated number of people to detect an intruder in the house 200. More specifically, if it is determined, based on the operational states of the electric devices, that the maximum number of electric devices that are away from each other by a distance which is longer than the distance of one resident's out stretched arms and were turned on at the same time is "4" or larger, and the number of people estimated by the estimation means 6 is "3", the sensing means 7 detects that an intruder is in the house 200.

Then, upon detecting an intruder, the sensing means 7 produces a message "Intruder Detected" to output to the warning means 8.

Upon receiving the estimated number of people from the estimation means 6, the warning means 8 displays the number of people by the display means. Further, upon receiving the message "Intruder Detected" from the sensing means 7, the warning means 8 displays "Intruder Detected" by the display means or sounds an alarm by the alarm means.

Figure 10:
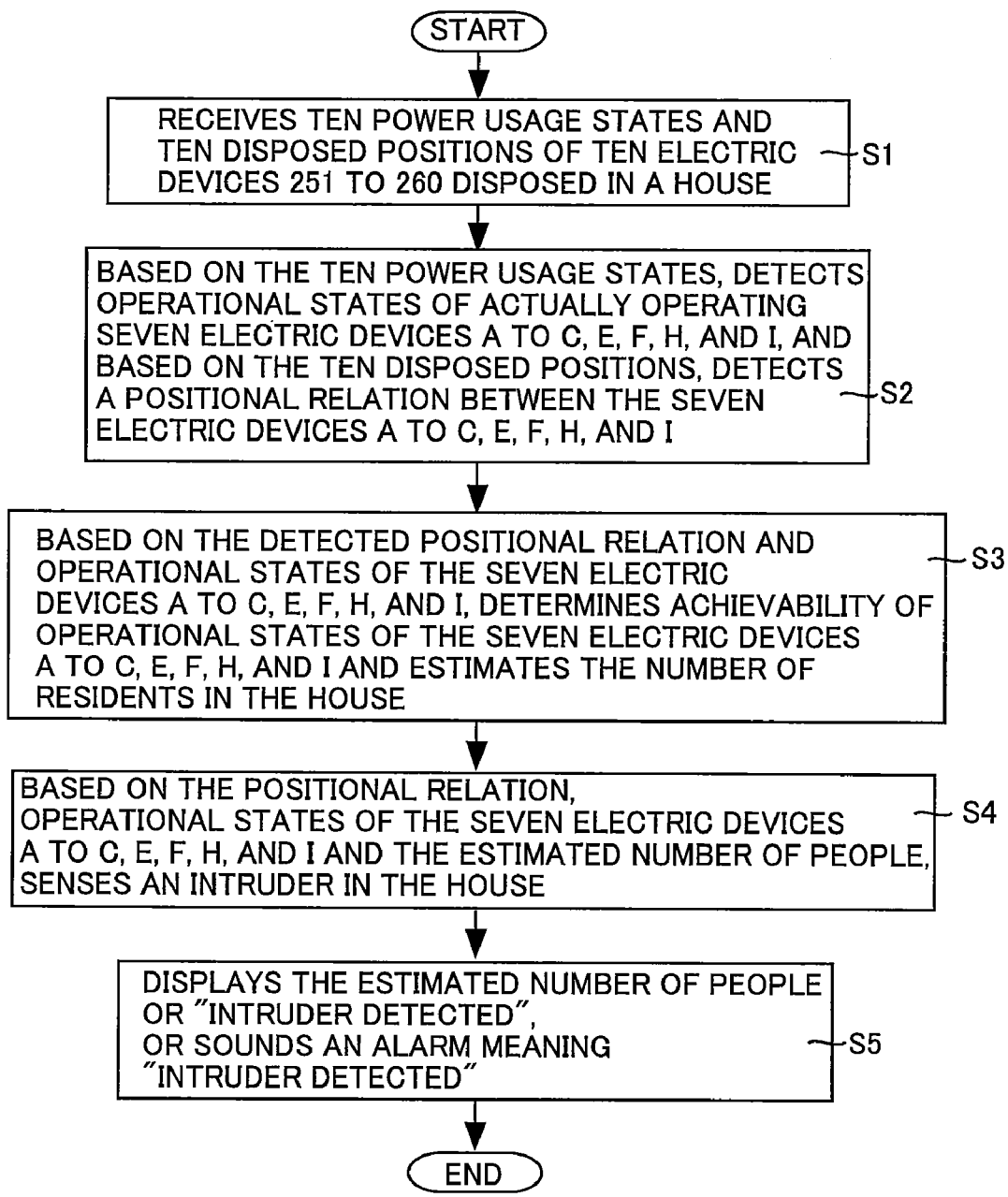
FIG. 10 is a flowchart to explain the operations in the master shown in FIG. 1.

FIG. 10 is a flowchart to explain the operations in the master 1 shown in FIG. 1. With reference to FIG. 10, once a series of operations has started, the transmission/reception means 2 of the master 1 receives ten power usage states and ten disposed positions of ten electric devices (=the refrigerator 251, the electric oven 252, the coffee maker 253, the ceiling light 254, the TV 255, the iron 256, the ceiling light 257, the ceiling light 258, the desk light 259, and the ceiling light 260) disposed in the house (Step S1) and outputs the received ten power usage states and ten disposed positions to the control means 3.

Based on the ten power usage states and ten disposed positions, the control means 3 produces, by the methods described above, a correspondence table TBL to store in the database 4. The detection means 5 reads out the correspondence table TBL from the database 4, and based on the ten power usage states in the read-out correspondence table TBL, detects the operational states of seven electric devices A to C, E, F, H, and I that are actually on operation, and based on the ten disposed positions in the correspondence table TBL, detects the positional relation between the seven electric devices A to C, E, F, H, and I (Step S2). Then, the detection means 5 outputs the operational states and positional relation of the seven electric devices A to C, E, F, H, and I to the estimation means 6 and the sensing means 7.

Based on the operational states and positional relation of the seven electric devices A to C, E, F, H, and I, the estimation means 6 determines, by the methods described above, achievability of the operational states of the seven electric devices A to C, E, F, H, and I and estimates the number of residents in the house (Step S3). Then, the estimation means 6 outputs the estimated number of residents to the sensing means 7 and the warning means 8.

After that, the sensing means 7 senses an intruder in the house based on the operational states and positional relation of the seven electric devices A to C, E, F, H, and I and the estimated number of people (Step 4), and outputs "Intruder Detected" to the warning means 8.

Then, the warning means 8 displays the estimated number of people or "Intruder Detected", or sounds an alarm meaning "Intruder Detected" (Step S5). Then, the series of operations ends.

As described above, according to Embodiment 1, the master 1 detects the operational states and positional relation of a plurality of electric devices disposed in the house, and based on the detected operational states and positional relation of the plurality of electric devices, estimates the number of residents in the house by determining achievability of the operational states of the plurality of electric devices.

Therefore, the invention allows for estimation of the number of residents in the house while protecting their privacy. As a result, the residents of the house can live life without anxiety.

Further, according to Embodiment 1, the master 1 senses an intruder based on the operational states and positional relation of a plurality of electric devices and the estimated number of people, and notifies the residents in the house that an intruder was sensed.

Therefore, the invention allows the residents in the house to live safe without anxiety.

Figure 11:
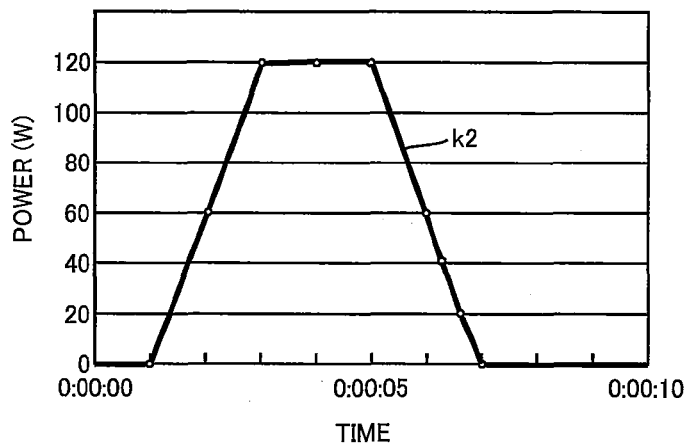
FIG. 11 illustrates a pattern of power usage states.
Figure 12:
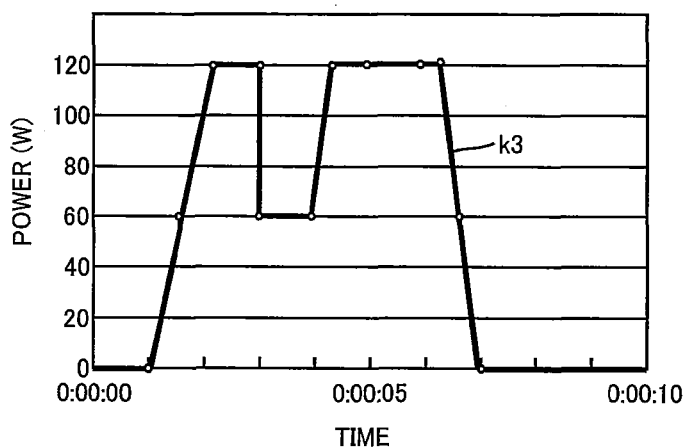
FIG. 12 illustrates a pattern of power usage states.
Figure 13:
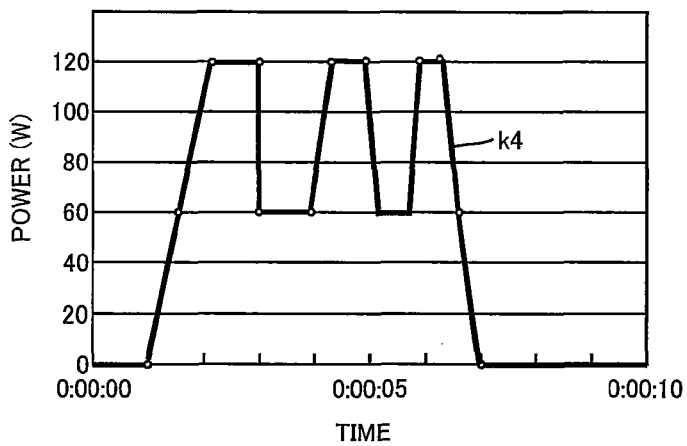
FIG. 13 illustrates a pattern of power usage states.

FIGS. 11 to 13 illustrate some patterns of power usage states. In FIGS. 11 to 13, the vertical axis represents power, and the abscissa axis represents time. Curves k2 to k4 respectively illustrate power usage states of a same electric device used by residents a to c.

The usage state of a hair dryer, for example, is different with respect to the respective residents. Therefore, if the power usage states of an electric device are classified into three patterns represented by curves k2 to k4 based on a plurality of power usage states transmitted by a same slave, the estimation means 6 of the master 1 may estimate that the number of residents in the house is "3".

The sensing means 7 senses an intruder in the house by sensing power usage state patterns whose number is larger than the estimated number of people.

Embodiment 2

Figure 14:
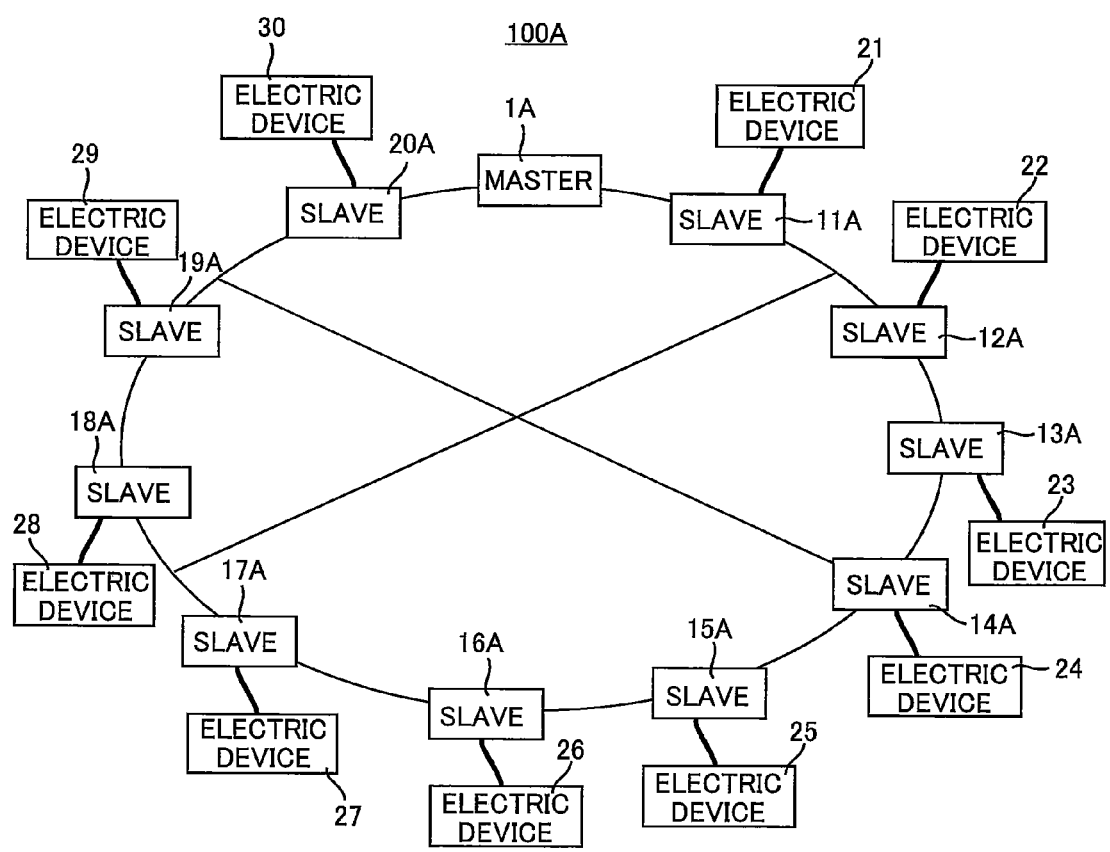
FIG. 14 is a schematic view of the configuration of a home network according to Embodiment 2.

FIG. 14 is a schematic view of the configuration of a home network according to Embodiment 2. With reference to FIG. 14, a home network 100A according to Embodiment 2 is identical with the home network 100 shown in FIG. 1 except that the master 1 of the home network 100 is replaced with a master 1A and that the slaves 11 to 20 are replaced with slaves 11A to 20A.

The master 1A estimates, by the methods described below, the number of residents in the house 200 based on the power usage states and disposed positions of the electric devices 21 to 30 received from the slaves 11A to 20A, senses an intruder in the house 200, and if the total power used by the electric devices 21 to 30 is likely to exceed the allowable power usage in the house 200, controls the slaves 11A to 20A by using the methods described below to limit the power used by the electric devices 21 to 30. In this case, the master 1A controls the slaves 11A to 20A so that the power supplied to the electric devices 21 to 30 is continuously limited. Note that in the present invention, to limit power continuously means to decrease power in steps or continuously.

The slaves 11A to 20A are respectively provided corresponding to the electric devices 21 to 30. Upon receiving, from the master 1A, a control signal for limiting power to be supplied to the electric devices 21 to 30, the slaves 11A to 20A limit power supply to the electric devices 21 to 30 in steps or continuously. For the rest, the slaves 11A to 20A function the same way as the slaves 11 to 20.

Figure 15:
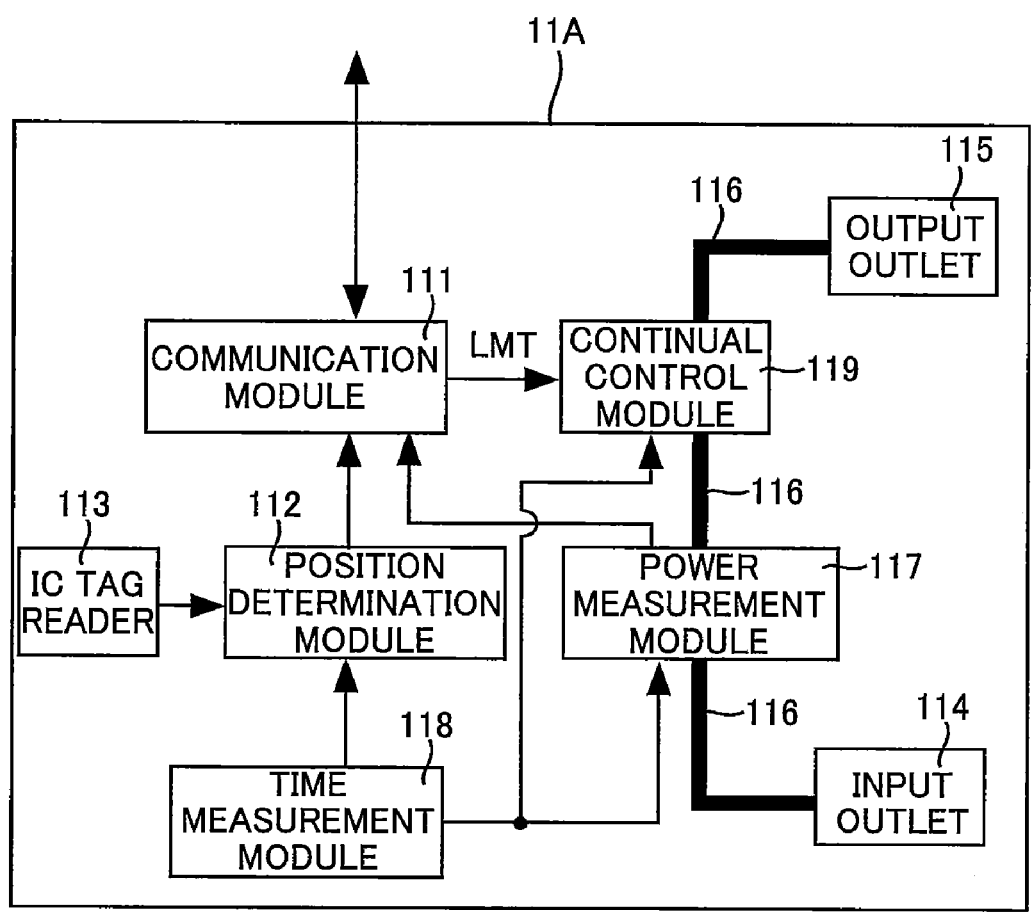
FIG. 15 is a schematic block diagram illustrating the configuration of the slave shown in FIG. 14.

FIG. 15 is a schematic block diagram illustrating the configuration of the slave 11A shown in FIG. 14. With reference to FIG. 15, the slave 11A is identical with the slave 11 shown in FIG. 2 except that a continual control module 119 is added to the slave 11. Note that in the slave 11A, the time measurement module 118 outputs time information on measured time to the continual control module 119.

The continual control module 119 is inserted in the wiring 116. Upon receiving a control signal LMT from the communication module 111, the continual control module 119 limits, in steps or continuously, the power supplied across the wiring 116 from the side of the input outlet 114 to the side of the output outlet 115.

Note that each of the slaves 12A to 20A shown in FIG. 14 has the same configuration as that of the slave 11A shown in FIG. 15.

Figure 16:
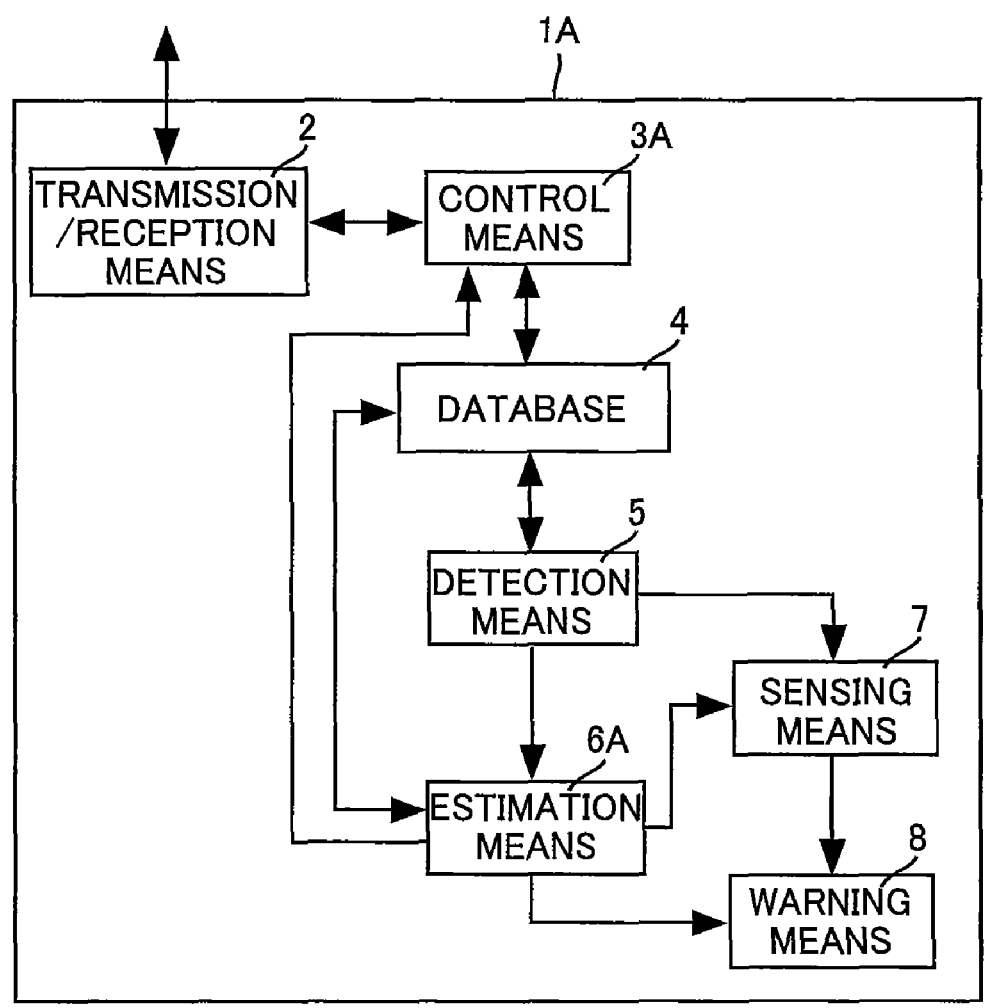
FIG. 16 is a schematic block diagram illustrating the configuration of the master shown in FIG. 14.

FIG. 16 is a schematic block diagram illustrating the configuration of the master 1A shown in FIG. 14. With reference to FIG. 16, the master 1A is identical with the master 1 shown in FIG. 6 except that the control means 3 and the estimation means 6 of the master 1 are respectively replaced with a control means 3A and an estimation means 6A.

The control means 3A reads out a correspondence table TBL from the database 4, and calculates the total power usage of the electric devices 21 to 30 based on the power usage states in the read-out correspondence table TBL, and determines whether the calculated total power usage is likely to exceed the allowable power usage in the house 200. More specifically, the control means 3A sets a threshold PWth smaller than the allowable power usage in the house 200, and if the total power usage is equal to the threshold PWth or larger, determines that the total power usage is likely to exceed the allowable power usage in the house 200.

The control means 3A also receives, from the estimation means 6A, a slave (some of the slaves 11A to 20A) to which an electric device whose operating state changes in steps or continuously is connected.

If determines that the total power usage is likely to exceed the allowable power usage in the house 200, the control means 3A produces a control signal LMT for limiting, in steps or continuously, the power used by an electric device whose operating state changes in steps or continuously and transmits, by wire or wirelessly, the produced control signal LMT to a slave (some of the slaves 11A to 20A) to which the electric device whose operating state changes in steps or continuously is connected.

The estimation means 6A preliminarily holds a correspondence table TYCH between the characteristic quantities and the types of electric devices and a classification table CLAS of electric devices according to their characteristic, and based on the correspondence table TYCH, the classification table CLAS and the operational states of the electric devices received from the detection means 5, estimates, by the methods described below, the types of electric devices (some or all of the electric devices 21 to 30) that are actually operation. Then, based on the estimated types of electric devices, the estimation means 6A estimates, by the methods described below, the functions of the electric devices, and based on the estimated functions of the electric devices, estimates, by the methods described below, the positional relation between the residents and the electric devices. Then, the estimation means 6A estimates, by the methods described below, the number of residents in the house 200 and their action based on the estimated positional relation, the positional relation between the electric devices received from the detection means 5 and the operational states of the electric devices.

Then, based on the estimated types of the electric devices, the estimation means 6A detects, among the electric devices on operation, an electric device whose operating state changes in steps or continuously. After that, the estimation means 6A reads out the correspondence table TBL from the database 4, and with reference to the read-out correspondence table TBL, detects a slave (some of the slaves 11A to 20A) to which the electric device whose operating state changes in steps or continuously is connected, and outputs the detected slave (some of the slaves 11A to 20A) to the control means 3A.

The estimation means 6A also outputs the estimated number of residents to the sensing means 7, and the estimated number of residents and their action to the warning means 8.

Figure 17:
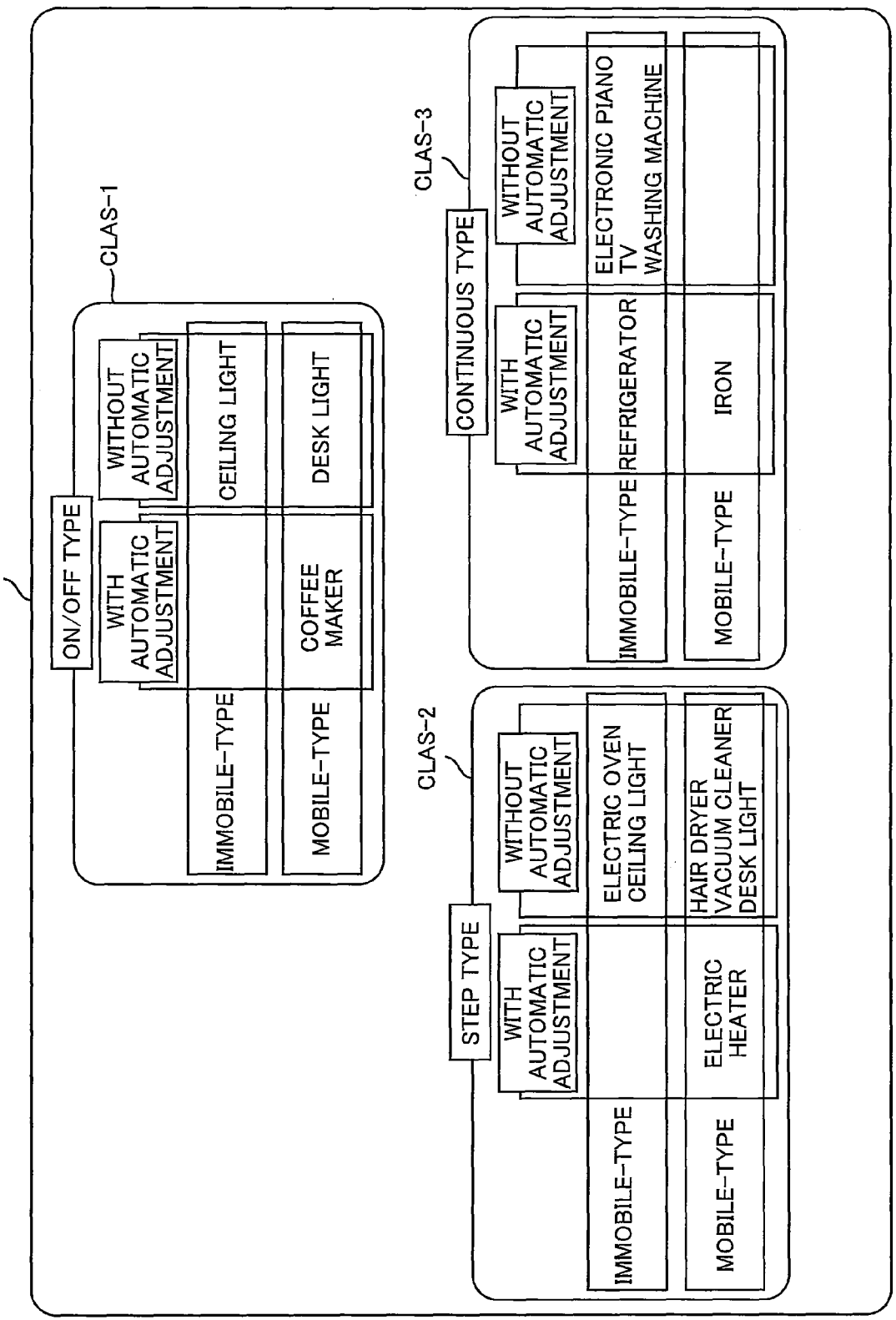
FIG. 17 is a conceptual diagram of a classification table of the types of electric devices classified with respect to their characteristics.

Now, how the estimation means 6A estimates the types of electric devices is explained in detail. FIG. 17 is a conceptual diagram of a classification table CLAS of the types of electric devices classified with respect to their characteristics. With reference to FIG. 17, the classification table CLAS includes sub-classification tables CLAS-1 to CLAS-3.

In the sub-classification table CLAS-1, electric devices having the operating state that changes between On and Off are classified into "Immobile-type", "Mobile-type", "With Automatic Adjustment", and "Without Automatic Adjustment". "With Automatic Adjustment" means that the electric device has a function to automatically adjust its characteristics such as the temperature.

The sub-classification table CLAS-1 includes the coffee maker 253 as an electric device of "Mobile-type" and "With Automatic Adjustment", the ceiling light 254 as an electric device of "Immobile-type" and "Without Automatic Adjustment", and the desk light 259 as an electric device of "Mobile-type" and "Without Automatic Adjustment".

In the sub-classification table CLAS-2, electric devices having the operating state that changes in steps are classified into "Immobile-type", "Mobile-type", "With Automatic Adjustment", and "Without Automatic Adjustment".

The sub-classification table CLAS-2 includes an electric heater as an electric device of "Mobile-type" and "With Automatic Adjustment", the electric oven 252 and the ceiling light 257 as electric devices of "Immobile-type" and "Without Automatic Adjustment", and a hair dryer, a vacuum cleaner and a desk light as electric devices of "Mobile-type" and "Without Automatic Adjustment".

In the sub-classification table CLAS-3, electric devices having the operating state that changes continuously are classified into "Immobile-type", "Mobile-type", "With Automatic Adjustment", and "Without Automatic Adjustment".

The sub-classification table CLAS-3 includes the iron 256 as an electric device of "Mobile-type" and "With Automatic Adjustment", the refrigerator 251 as an electric device of "Immobile-type" and "With Automatic Adjustment", and an electronic piano, the TV 255 and a washing machine as electric devices of "Immobile-type" and "Without Automatic Adjustment".

FIG. 18 is a conceptual diagram of a correspondence table TYCH between the characteristic quantities and types of electric devices. With reference to FIG. 18, the correspondence table TYCH includes the types and characteristic quantities of electric devices. The characteristic quantities are associated with the respective types of electric devices.

The types of electric devices are composed of, for example, a refrigerator, an electric oven, a coffee maker, a TV, a ceiling light, an iron, a desk light, an electronic piano, a washing machine, a hair dryer, and a vacuum cleaner. Each of characteristic quantities CH1 to CH11 is composed of at least one of the average value (the average value of the current area), the effective value (the current RMS value), the peak-to-rms ratio (the current maximum value/the effective value), the peak-to-rms ratio (the average value/the effective value), the phase difference (the phase difference between voltage and current), the power factor (the cosine of the phase difference), the apparent power (current×voltage), the effective power (current×voltage×power factor), and the time constant (the convergence time in case of current change) of current that is supplied to the respective electric devices. The characteristic quantities CH1 to CH11 are respectively associated with the refrigerator, the electric oven, the coffee maker, the TV, the ceiling light, the iron, the desk light, the electronic piano, the washing machine, the hair dryer, and the vacuum cleaner.

The characteristic quantities CH1 to CH11 of the respective electric devices such as the refrigerator and the electric oven are preliminarily measured, and the measured characteristic quantities CH1 to CH11 are respectively associated with the refrigerator, the electric oven, the coffee maker, the TV, the ceiling light, the iron, the desk light, the electronic piano, the washing machine, the hair dryer, and the vacuum cleaner to preliminarily produce the correspondence table TYCH.

Figure 19:
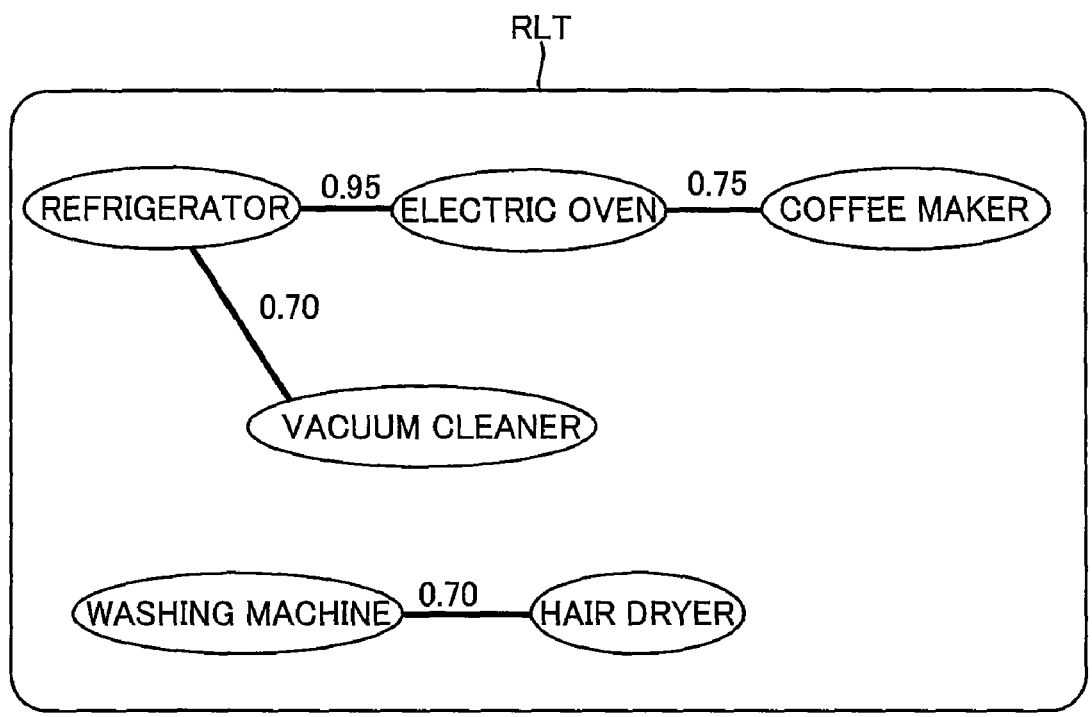
FIG. 19 illustrates an association between electric devices.

FIG. 19 illustrates an association between electric devices. With reference to FIG. 19, an association table RLT illustrates an association between the respective electric devices by a weight w ($0 \leq w \leq 1$). The refrigerator and the electric oven are in general disposed in the kitchen, and therefore associated with each other with a weight of 0.95. The electric oven and the coffee maker are in general disposed in the kitchen, however, the coffee maker may be used on an eating table in a room other than the kitchen, and therefore, the electric oven and the coffee maker are associated with each other with a weight w of 0.75 that is smaller than the weight w of 0.95 associating the refrigerator and the electric oven.

Further, the refrigerator and the vacuum cleaner are associated with each other with a weight w of 0.70 as the vacuum cleaner may be used in any room. Further, the washing machine and the hair dryer are in general disposed in the bathroom, however, the hair dryer may be used somewhere else but the bathroom, and therefore, they are associated with each other with a weight w of 0.70.

The association table RLT is produced preliminarily in consideration of the point of use etc. of the electric devices in the house 200. In this case, the weight w for the mobile-type electric devices is determined considering the fact that their position can be changed.

The estimation means 6A preliminarily holds the above-described classification table CLAS, correspondence table TYCH, and association table RLT. If senses the beginning of use of an electric device based on the operational state of the electric device received from the detection means 5, the estimation means 6A estimates the type of the electric device, which started to be used, with reference to the classification table CLAS, the correspondence table TYCH and the association table RLT.

Note that in the association table RLT, the change of the weight w with respect to time may be illustrated using the time axis. Or, the weight w may be learned automatically.

Figure 20:
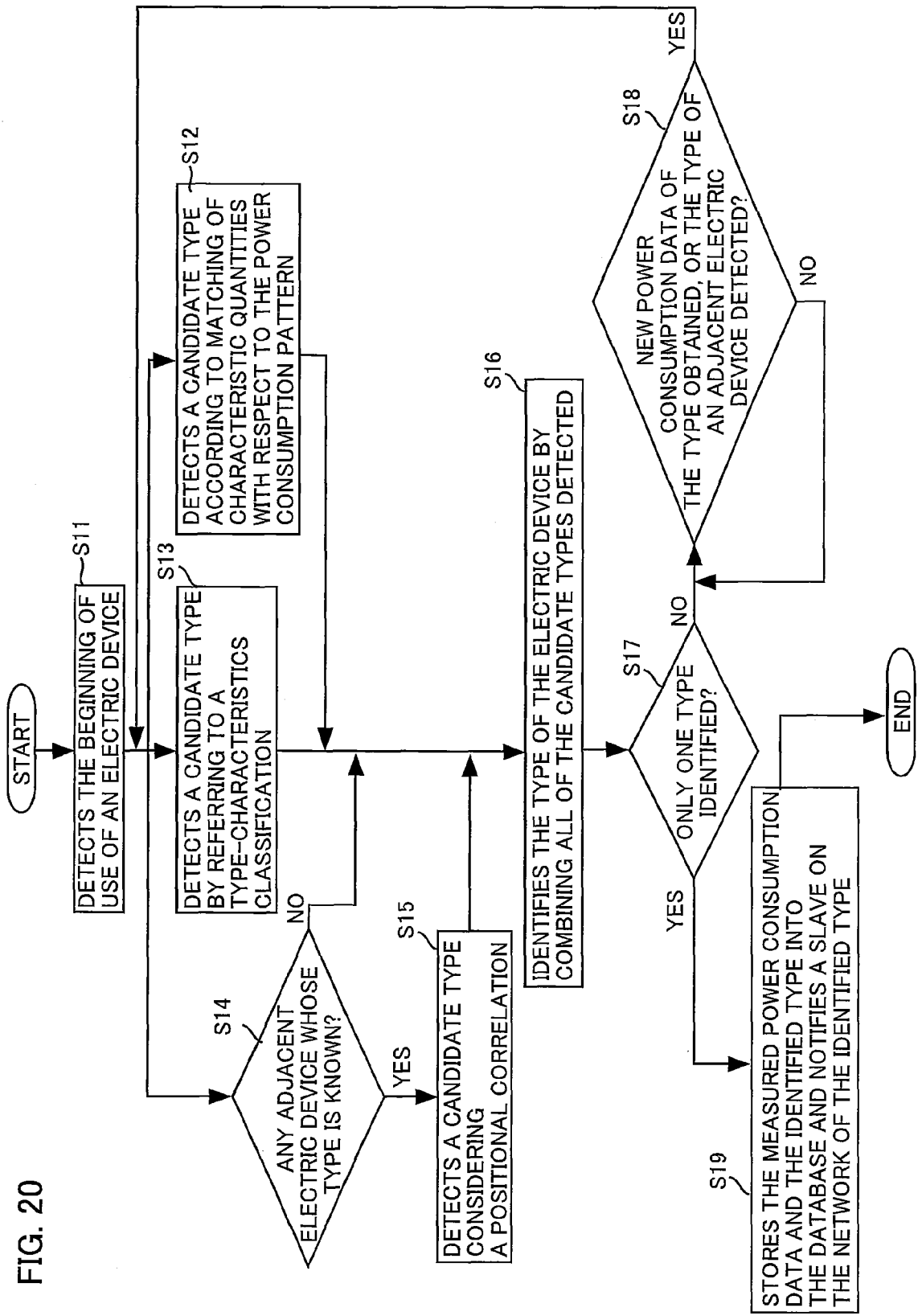
FIG. 20 is a flowchart to explain how to estimate the type of an electric device.

FIG. 20 is a flowchart to explain how to estimate the type of an electric device. With reference to FIG. 20, once a series of operations has started, the estimation means 6A senses the beginning of use of an electric device based on the operational state of the electric device received from the detection means 5 (Step S11).

After that, the estimation means 6A detects a characteristic quantity CH of the electric device starting to operate based on the operational state of the electric device, and detects the type of electric device having a characteristic quantity (any one of the characteristic quantities CH1 to CH11) that matches the detected characteristic quantity CH or the type of electric device having a characteristic quantity (some of the characteristic quantities CH1 to CH11) that is similar to the characteristic quantity CH by referring to the correspondence table TYCH. That is to say, the estimation means 6A detects a candidate type (Step S12).

The estimation means 6A also detects a candidate type based on the operational state of the electric device and with reference to the classification table CLAS (Step S13). For example, if the operational state of the electric device is repeated turned-Ons and -Offs in a period of time and the connected slaves thereof change in the period of time, the estimation means 6A detects the "coffee maker" and "desk light" as the candidate types of the electric device starting to operate in use with reference to the classification table CLAS. In a case where the operational state changes in steps or continuously, the estimation means 6A also detects a candidate type of the electric device in the same manner.

Further, the estimation means 6A determines whether there is any adjacent electric device whose type is known around the electric device starting to operate (Step S14). Here, an adjacent electric device means an electric device that is associated with the electric device starting to operate with a weight w equal to or larger than the threshold wth.

If it is determined in Step S14 that there is no adjacent electric device whose type is known around the electric device starting to operate, the series of operations proceeds to Step S16.

On the other hand, if it is determined in Step S14 that there is an adjacent electric device whose type is known around the electric device starting to operate, the estimation means 6A detects a candidate type of the electric device starting to operate with reference to the association table RLT (Step S15). For example, when there is "refrigerator" as an electric device whose type is known around the electric device starting to operate, the estimation means 6A detects "electric oven" as a candidate type of the electric device starting to operate.

Step S12, Step S13 and Steps S14, and S15 are executed in parallel. Therefore, after Step S12, Step S13 and Steps S14, and S15, the estimation means 6A identifies the type of the electric device starting to operate considering all of the candidate types detected (Step S16). For example, if "refrigerator", "electric oven" and "coffee maker" are detected as candidate types in Step S12, and "electric oven" and "ceiling light" in the sub-classification table CLAS-2 of the classification table CLAS in Step S13 are detected, and "electric oven" is detected as the candidate type in Step S15, the estimation means 16A identifies, in Step S16, the type of the electric device starting to operate as "electric oven".

After that, the estimation means 6A determines whether only one type is identified (Step S17), and if not, further determines whether new power consumption data was obtained or whether the type of any adjacent electric device has obtained (Step S18). Step S18 is repeatedly executed until it is determined that new power consumption data was obtained, and if it is determined in Step S18 that new power consumption data was obtained, the series of operations returns to Steps S12 to S14, and the above-described Steps S12 to S18 are repeatedly executed. Step S18 is executed when one type is not identified in Step S17, and therefore, the series of operations returns to Steps S12 to S14 to narrow down the type.

On the other hand, when it is determined in Step S17 that only one type is identified, the estimation means 6A stores the measured power consumption data (=the operational state) and the identified type into the database 4 and notifies the slave of the identified type through the control means 3A and the transmission/reception means 2 (Step S19). Then, the series of operations ends.

FIG. 21 is a conceptual diagram of another correspondence table representing a correspondence relation between electric devices, their power usage states and disposed positions. With reference to FIG. 21, a correspondence table TBL-1 is identical with the correspondence table TBL shown in FIG. 7 except that the A to J in the column of electric devices is replaced with types of electric devices such as refrigerator and electric oven.

After that the types of the respective electric devices are identified in accordance with the flowchart shown in FIG. 20, the correspondence table TBL-1 is stored into the database 4.

Figure 22:
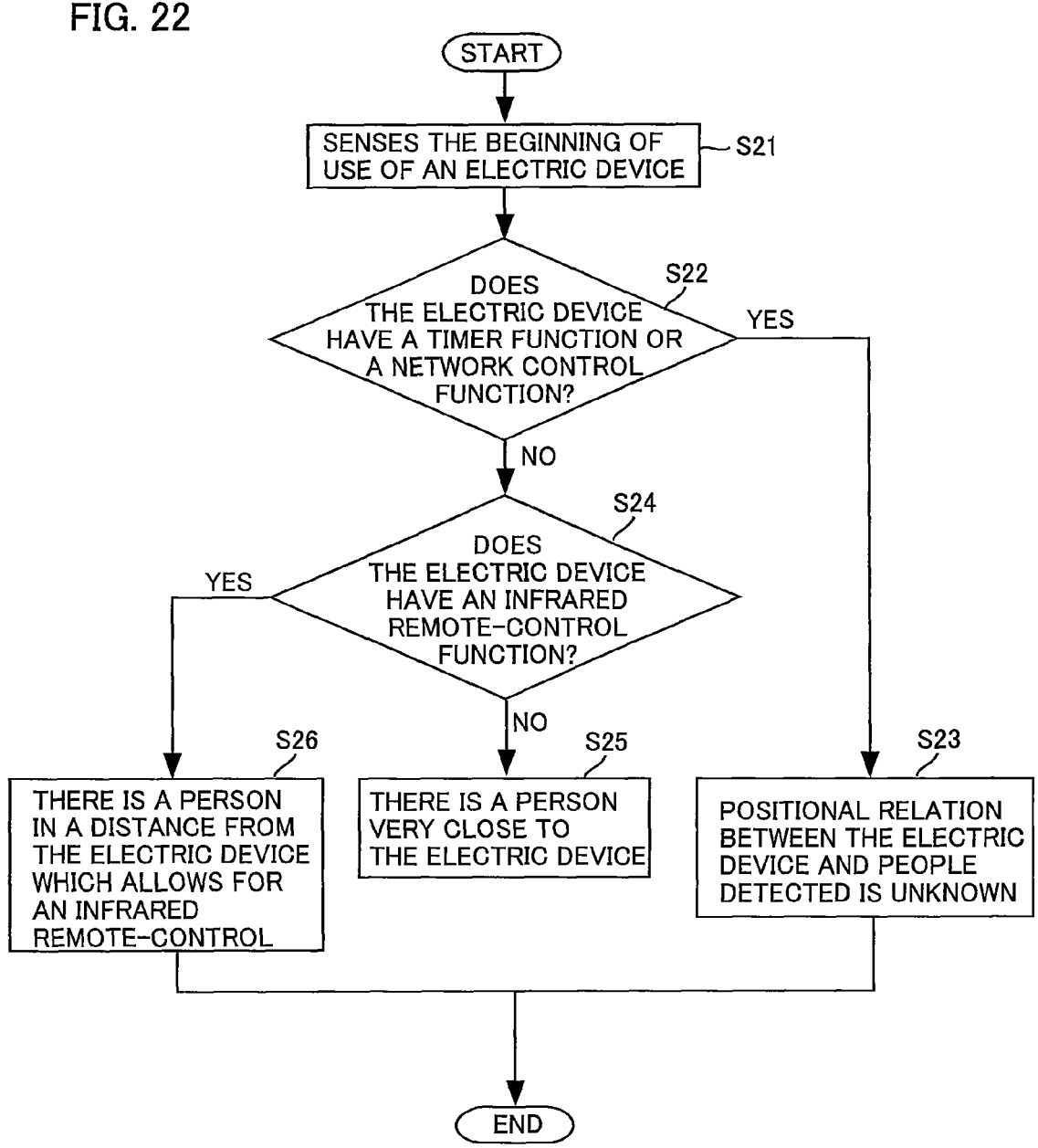
FIG. 22 is a flowchart for estimating the positional relation between the electric devices and the residents.

FIG. 22 is a flowchart for estimating the positional relation between the electric devices and the residents. Once a series of operations has started, the estimation means 6A detects the beginning of use of an electric device based on the operational state of the electric device received from the detection means 5 (Step S21).

Then, since the types of the respective electric devices have been identified in accordance with the flowchart shown in FIG. 20, the estimation means 6A determines whether the electric device starting to operate has a timer function or whether the electric device starting to operate has a network control function based on the identified types of the electric devices (Step S22).

Then, if it is determined in Step S22 that the electric device starting to operate has a timer function or a network control function, the estimation means 6A determines that the positional relation between the electric device starting to operate and the residents is impossible to determine (Step S23). If the electric device starting to operate has a timer function or a network control function, since the electric device can be activated by the timer function or the network control function, it is unknown whether a resident has activated the electric device. Therefore, if it is determined in Step S22 that the electric device starting to operate has a timer function or a network control function, it is consequently determined that the positional relation between the electric device starting to operate and the residents is impossible to determine.

On the other hand, if it is determined in Step S22 that the electric device starting to operate has neither of a timer function nor a network control function, the estimation means 6A further determines whether the electric device starting to operate has a infrared remote-control function based on the identified type of the electric device (Step S24).

If it is determined in Step S24 that the electric device starting to operate has no infrared remote-control function, this means that the electric device was activated by a resident, and therefore, the estimation means 6A detects that there is a resident very close to the electric device starting to operate (Step S25).

On the other hand, if it is determined in Step S24 that the electric device starting to operate has an infrared remote-control function, the estimation means 6A detects that a resident is within a distance which allows for infrared remote-control, from the electric device starting to operate (Step S26).

Then, after any of Step S23, Step S25 and Step S26, the series of operations ends.

Note that the estimation means 6A determines the functions of the respective electric devices by executing Step S22 and Step S24.

Upon sensing the beginning of use of an electric device based on the operational state of the electric device received from the detection means 5, the estimation means 6A identifies the types of the respective electric devices in accordance with the above-described flowchart shown in FIG. 20, and after that, estimates the functions of the electric devices in accordance with the flowchart shown in FIG. 22, and based on the estimated functions, estimates the positional relation between the respective electric devices and the residents.

Upon estimating the types and functions of the respective electric devices and the positional relation between the respective electric devices and the residents, the estimation means 6A determines the number of residents and their action by adding the estimated types and functions of the electric devices and the positional relation between the electric devices and the residents to the operational states of the respective electric devices and their positional relation.

Figure 23:
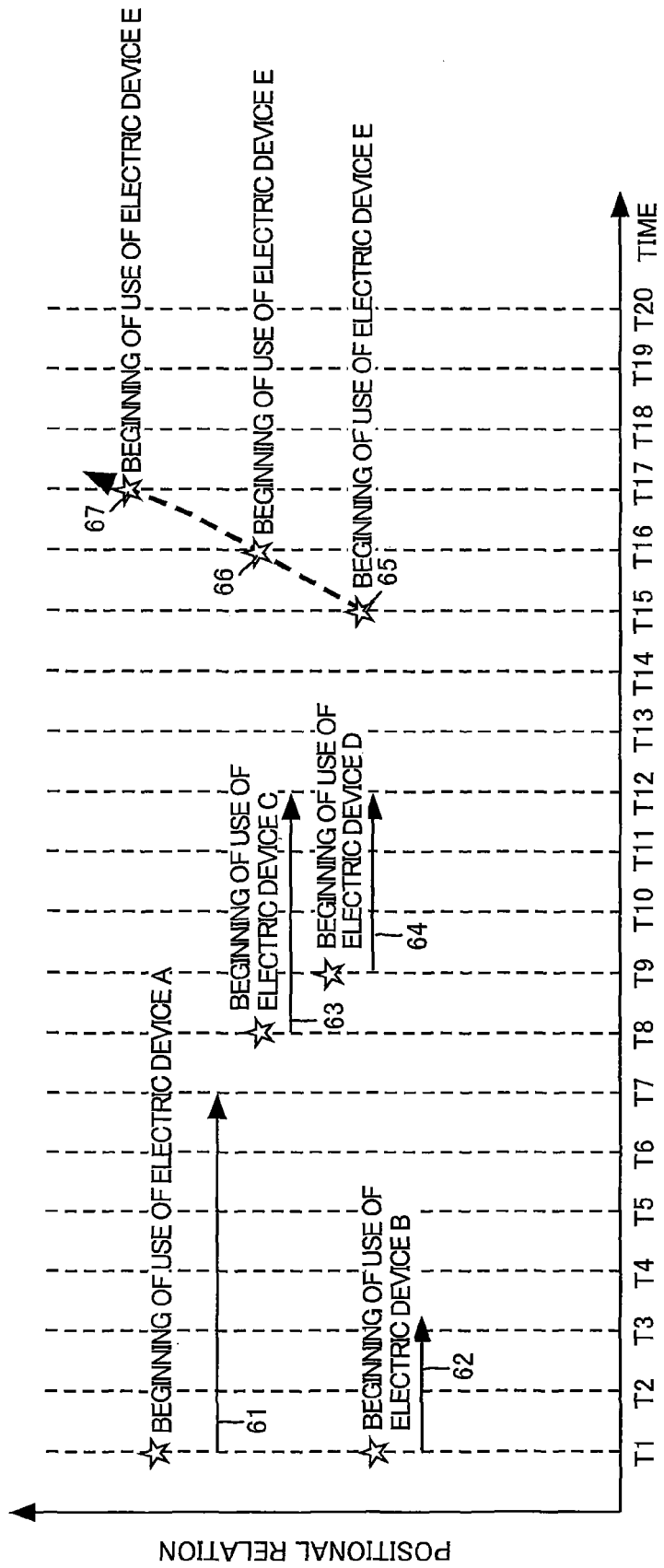
FIG. 23 illustrates another operational states of electric devices.

FIG. 23 illustrates another operational states of electric devices. The estimation means 6A produces the operational state of electric devices shown in FIG. 23 in the same manner as that of the operational state shown in FIG. 9. Arrows 61 to 64 respectively represent the operational state of the electric devices A to D. Star symbols 65 to 67 represent time at which the electric device E starts to operate.

If it is determined based on arrows 61 and 62 that the distance between the electric device A and the electric device B exceeds the threshold Lth that is the maximum distance of one person's out stretched arms, it is unlikely that a single person is involved with the beginning of use of the electric device A and the electric device B, and therefore, the estimation means 6A estimates that there are two or more residents in the house 200.

Since it is determined based on arrows 63 and 64 that the distance between the electric device C and the electric device D is shorter than the threshold Lth, and therefore, the estimation means 6A estimates that the positions of the electric device C and the electric device D are close. Then, since the electric device C and the electric device D also have similar characteristics based on the types estimated above and the association (=weighting with a weight w) between the electric device C and the electric device D is relatively strong, the estimation means 6A estimates that it is likely that one single person activated the electric device C and the electric device D.

Further, the estimation means 6A estimates that the electric device E is a mobile-type based on star symbols 65 to 67. Then, since the estimation means 6A has estimated that there is a person very close to the electric device E in accordance with the flowchart shown in FIG. 22, the estimation means 6A estimates that a resident is moving along the broken line. That is to say, the estimation means 6A estimates an action of people.

As described above, in Embodiment 2, the master 1A detects the operational states of the respective electric devices based on the power usage states thereof received from the slaves 11A to 20A, estimates the types of the respective electric devices based on the detected operational states thereof, estimates the functions of the respective electric devices based on the estimated types, and estimates the positional relation between the respective electric devices and the residents based on the estimated functions. Then, the master 1A estimates the number of residents and their action based on the operational states, disposed positions and types of the respective electric devices and the positional relation between the respective electric devices and the residents.

Therefore, the invention allows for estimation of the number of residents and their action while protecting their privacy. As a result, the residents can live life without anxiety.

The control means 3A reads out the correspondence table TBL-1 stored in the database 4 and calculates the total power usage of the electric devices on operation in the house 200. The control means 3A also receives, from the estimation means 6A, a slave (some of the slaves 11A to 20A) to which an electric device whose operating state changes in steps or continuously is connected.

If determines that the calculated total power usage is likely to exceed the allowable power usage in the house 200, the control means 3A produces a control signal LMT for limiting, in steps or continuously, the power used by the electric device whose operating state changes in steps or continuously, and transmits, by wire or wirelessly, the produced control signal LMT to the slave (some of the slaves 11A to 20A) to which the electric device whose operating state changes in steps or continuously is connected.

Assuming that the slave 11A has received the control signal LMT, the continual control module 119 of the slave 11A receives the control signal LMT from the communication module 111, and based on the received control signal LMT, limits, in steps or continuously, the power flows across the wiring 116 from the sided of the input outlet 114 to the side of the output outlet 115. In this manner, the power quantity supplied to the electric device 21 connected to the slave 11A decreases in steps or continuously. Accordingly, the total power usage becomes less than the allowable power usage.

Therefore, the invention allows the residents in the house 200 to live safe without anxiety.

Figure 24:
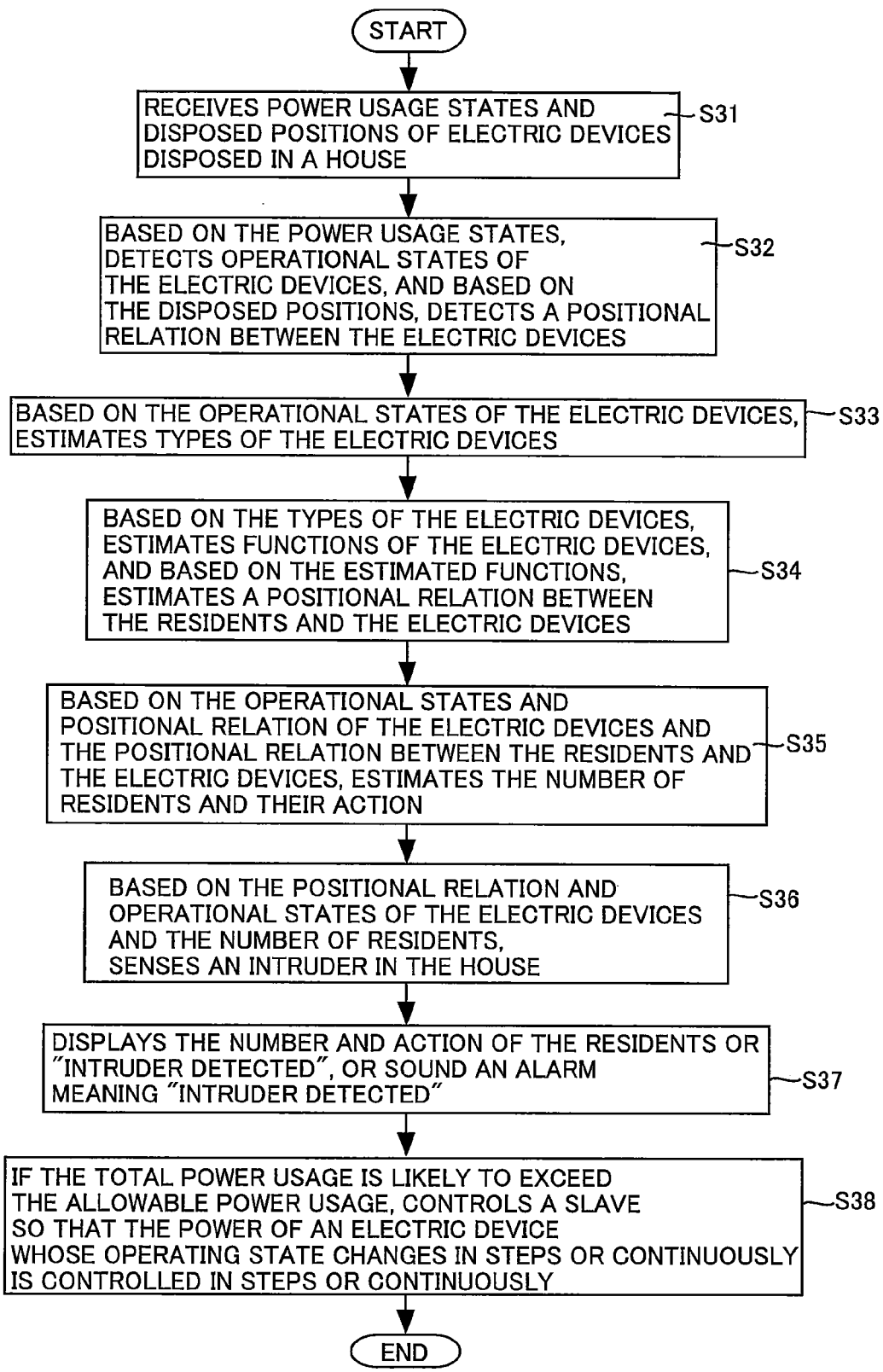
FIG. 24 is a flowchart to explain the operations of the master shown in FIG. 14.

FIG. 24 is a flowchart to explain the operations of the master 1A shown in FIG. 14. With reference to FIG. 24, once a series of operations has started, the transmission/reception means 2 of the master 1A receives the power usage states and disposed positions of electric devices disposed in the house (Step S31) and outputs the received power usage states and disposed positions to the control means 3A.

Based on the power usage states and the disposed positions, the control means 3A produces, by the methods described above, a correspondence table TBL to store into the database 4. The detection means 5 reads out the correspondence table TBL from the database 4, and based on the power usage states in the read-out correspondence table TBL, detects the operational state of an actually operating electric device, and based on the disposed positions in the correspondence table TBL, detects the positional relation between the electric devices on operation (Step S32). Then, the detection means 5 outputs the detected operational states and positional relation to the estimation means 6A and the sensing means 7.

After that, based on the operational states of the electric devices received from the detection means 5, the estimation means 6A estimates the types of the electric devices in accordance with the flowchart shown in FIG. 20 (Step S33). Then, based on the estimated types of the electric devices, the estimation means 6A estimates the functions of the electric devices in accordance with the flowchart shown in FIG. 20, and estimates the positional relation between the residents and the electric devices based on the estimated functions of the electric devices (Step S34).

Then, based on the operational states, the positional relation and the types of the electric devices and the positional relation between the master and the electric devices, the estimation means 6A estimates the number of residents and their action by using the methods described above (Step S35).

Then, the estimation means 6A outputs the estimated number and action of residents to the sensing means 7 and the warning means 8.

After that, based on the operational states and the positional relation of the electric devices and the estimated number of people, the sensing means 7 senses an intruder in the house (Step 36), and outputs "Intruder Detected" to the warning means 8.

Then, the warning means 8 displays the estimated number of people and their action or "Intruder Detected", or sounds an alarm meaning "Intruder Detected" (Step S37).

After that, if the total power usage is likely to exceed the allowable power usage, the control means 3A transmits a control signal LMT to a slave to which an electric device whose operating state changes in steps or continuously is connected, and controls the slave so that the power of the electric device whose operating state changes in steps or continuously is limited in steps or continuously (Step S38). Then, the series of operations ends.

As described above, according to Embodiment 2, the master 1A estimates the number of residents in the house and their action based on the operational states, the positional relation, and the types of a plurality of electric devices disposed in the house and the positional relation between the residents and the electric devices.

Therefore, the invention allows for estimation of the number of residents in the house and their action while protecting their privacy. As a result, the residents in the house can live life without anxiety.

In addition, according to Embodiment 2, if the total power usage is likely to exceed the allowable power usage, the master 1A limits, in steps or continuously, the power used by an electric device so that the total power usage becomes less than the allowable power usage.

Therefore, the invention allows the residents in the house to live safe without anxiety.

Embodiment 3

Figure 25:
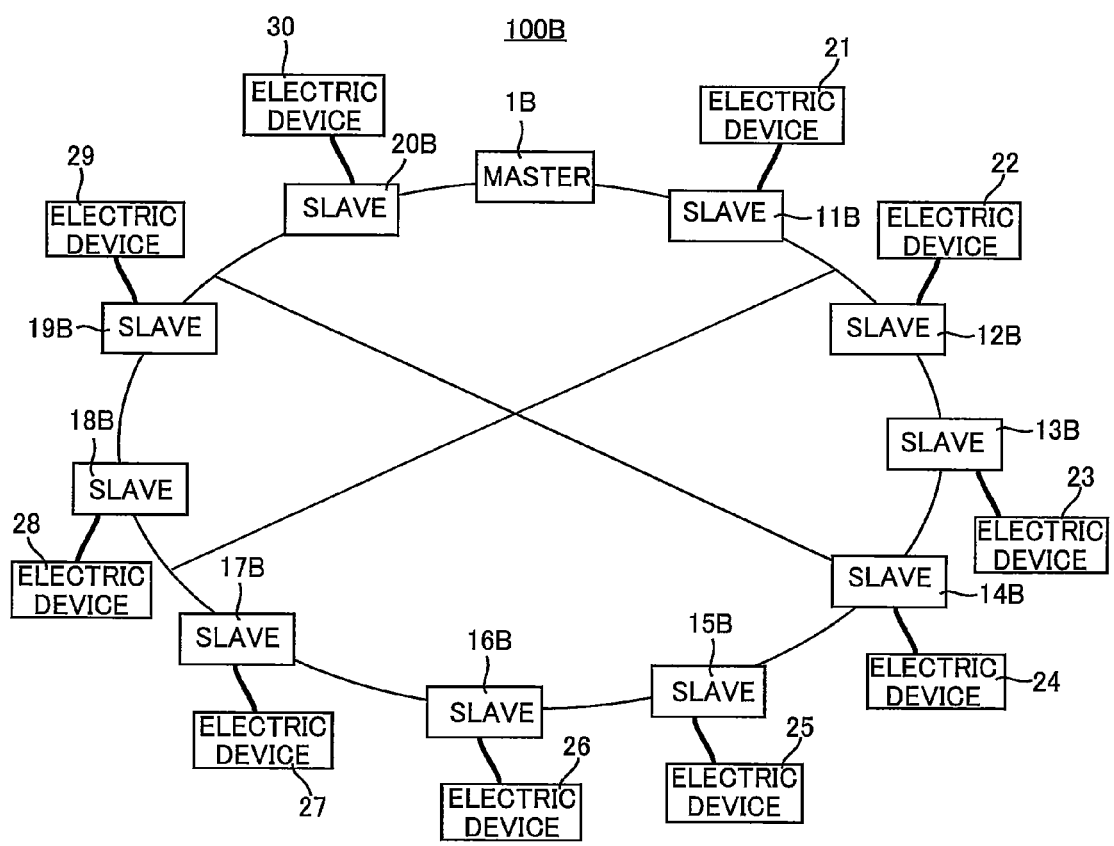
FIG. 25 is a schematic view illustrating the configuration of a home network according to Embodiment 3.

FIG. 25 is a schematic view illustrating the configuration of a home network according to Embodiment 3. With reference to FIG. 25, a home network 100B according to Embodiment 3 is identical with the home network 100 shown in FIG. 1 except that the master 1 of the home network 100 is replaced with a master 1B, and the slaves 11 to 20 with slaves 11B to 20B.

Based on the power usage states and the disposed positions of the electric devices 21 to 30 received from the slaves 11B to 20B, the master 1B estimates the number of residents in the house 200 by using the methods described above, and senses unusualness of a resident in the house 200 by using the methods described below.

Upon sensing unusualness of a resident in the house 200, the master 1B transmits a control signal FLH for blinking an electric device composed of a light to a slave (some of the slaves 11B to 20B) provided corresponding to the electric device composed of the light. In this case, the light includes the desk light 259 in addition to the ceiling lights 254, 257, 258, and 260 shown in FIG. 8.

For the rest, the master 1B functions the same way as the master 1.

The slaves 11B to 20B are respectively provided corresponding to the electric devices 21 to 30. Among the slaves 11B to 20B, a slave provided corresponding to an electric device composed of the light blinks the electric device composed of the light upon reception of the control signal FLH from the master 1B.

For the rest, the slaves 11B to 20B function the same way as the slaves 11 to 20.

Figure 26:
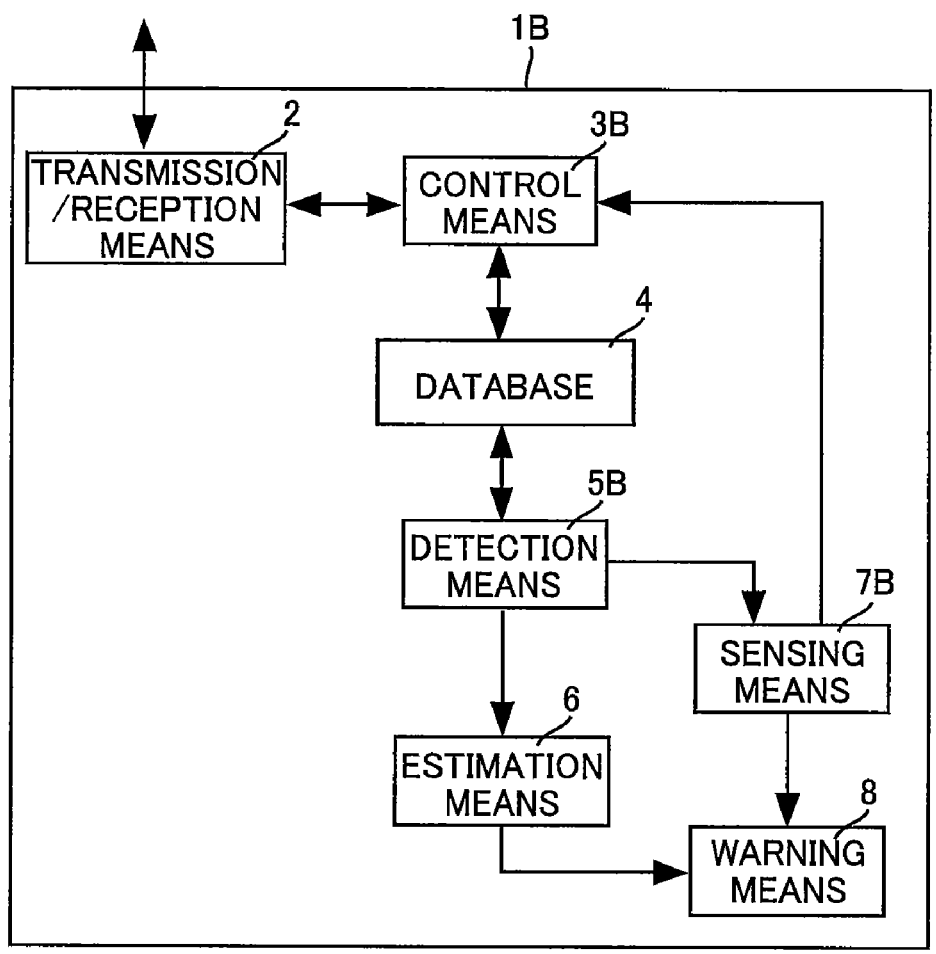
FIG. 26 is a schematic block diagram illustrating the configuration of the master shown in FIG. 25.

FIG. 26 is a schematic block diagram illustrating the configuration of the master 1B shown in FIG. 25. With reference to FIG. 26, the master 1B is identical with the master 1 shown in FIG. 6 except that the control means 3, the detection means 5 and the sensing means 7 of master 1 are respectively replaced with control means 3B, detection means 5B and sensing means 7B.

Note that in the master 1B, the database 4 stores a correspondence table between electric devices, power usage states and disposed positions of a time period between the present and the past (for example, one month ago). The estimation means 6 outputs the estimated number of residents to only the warning means 8.

Based on the power usage states in the correspondence table read-out from the database, the detection means 5B detects the operational states of the respective electric devises 21 to 30 in a given period of time between the present and the past (for example, one week ago) and the operational states of the respective electric devises 21 to 30 at present. Then, based on the operational states of the respective electric devises 21 to 30 in the given period of time between the present and the past, the detection means 5B detects an operational state that represents a substantially fixed use pattern, and determines the detected operational state as the operational state of usual use. After that, the detection means 5B outputs the operational state of usual use and the operational states of the respective electric devises 21 to 30 at present to the sensing means 7B.

For the rest, the detection means 5B functions the same way as the detection means 5.

The sensing means 7B receives, from the detection means 5B, the operational state of usual use and the operational states of the respective electric devises 21 to 30 at present. Then, based on the operational state of usual use and the operational states at present, the sensing means 7B senses unusualness of a resident in the house.

More specifically, based on the operational state of usual use and the operational states at present, the sensing means 7B senses unusualness of a resident in the house by sensing an electric device that is in operation for a longer period of time at present than the operating time of usual use (=a reference operating time).

Upon sensing unusualness of a resident in the house, the sensing means 7B produces a signal EMG for indicating that unusualness of a resident in the house was sensed ant outputs the produced unusualness sensing signal EMG to the control means 3B and the warning means 8.

Upon receiving the unusualness sensing signal EMG from the sensing means 7B, the control means 3B produces a control signal FLH for blinking an electric device (some of the electric devices 21 to 30) composed of a light disposed in the house, and controls the transmission/reception means 2 so that the produced control signal FLH is transmitted to a slave (some of the slaves 11B to 20B) provided corresponding to the electric device composed of the light.

For the rest, the control means 3B functions the same way as the control means 3.

Note that the transmission/reception means 2 transmits, in accordance with a control by the control means 3B, the control signal FLH to the slaves 14B, 17B, 18B, 19B, and 20B (slaves that are disposed instead of the slaves 14, 17, 18, 19, and 20 shown in FIG. 8) provided corresponding to an electric device composed of the light.

The warning means 8 displays unusualness of a resident in the house based on the unusualness sensing signal EMG from the sensing means 7B.

Figure 27:
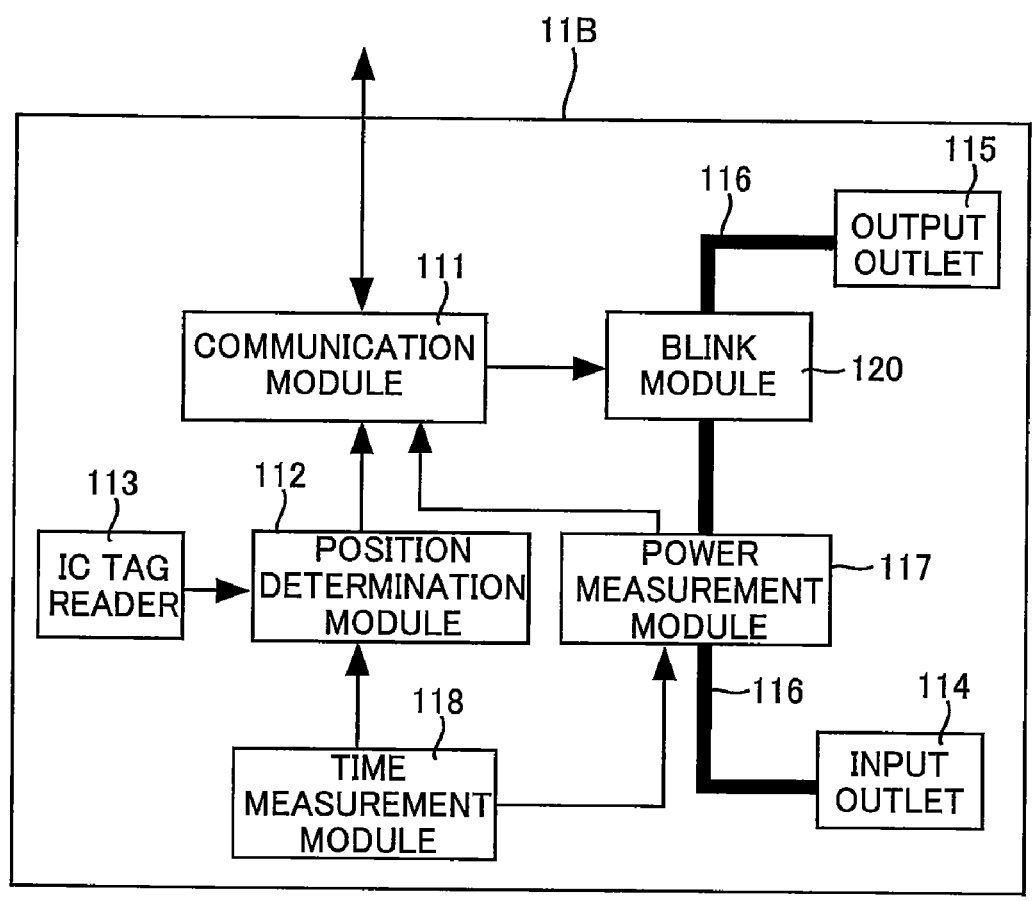
FIG. 27 is a schematic block diagram illustrating the configuration of the slave shown in FIG. 25.

FIG. 27 is a schematic block diagram illustrating the configuration of the slave 11B shown in FIG. 25. With reference to FIG. 27, the slave 11B is identical with the slave 11 shown in FIG. 2 except that a blink module 120 is added to the slave 11.

The blink module 120 is disposed in the wiring 116. Upon receiving the control signal FLH from the communication module 111, the blink module 120 intermittently supplies the power across the wiring 116 from the side of the input outlet 114 to the side of the output outlet 115.

Note that each of the slaves 12B to 20B shown in FIG. 25 have the same configuration as that of the slave 11B shown in FIG. 27.

Figure 28:
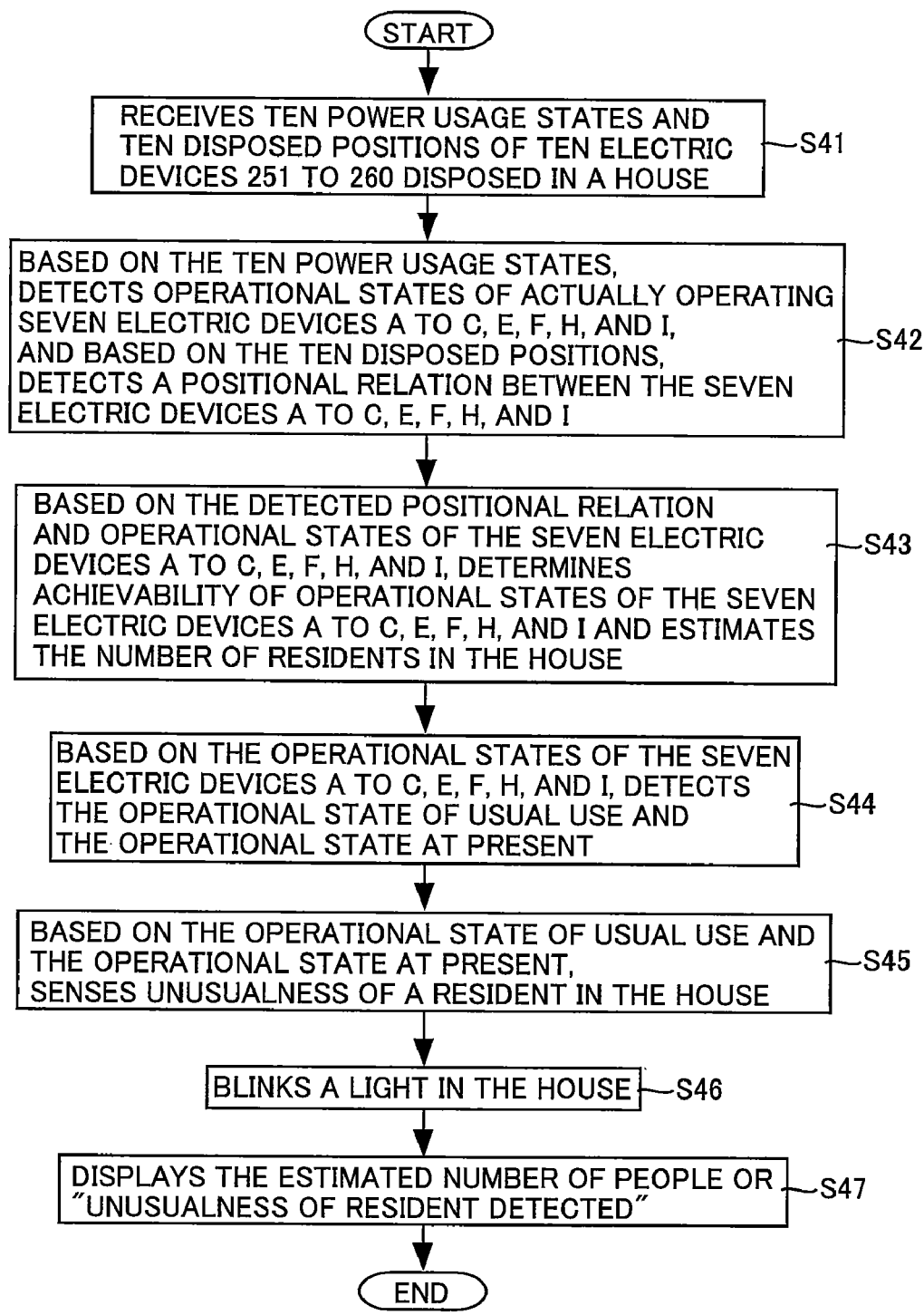
FIG. 28 is a flowchart to explain the operations of the home network shown in FIG. 25.

FIG. 28 is a flowchart to explain the operations of the home network 100B shown in FIG. 25.

With reference to FIG. 28, once a series of operations has started, the master 1B estimates the number of residents in the house 200 in accordance with the same operations as those in Step S1 to Step S3 shown in FIG. 10 (Step S41 to Step S43).

After that, based on the operational states of the seven electric devices A to C, E, F, H, and I, the detection means 5B of the master 1B detects, by the methods described above, the operational states of usual use and the operational states at present of the seven electric devices A to C, E, F, H, and I (Step S44). Then, the detection means 5B of the master 1B outputs the detected operational states of usual use and the operational states at present to the sensing means 7B.

The sensing means 7B of the master 1B receives, from the detection means 5B, the operational states of usual use and the operational states at present, and based on the received operational states of usual use and operational states at present, senses, by the methods described above, unusualness of a resident in the house 200 (Step S45).

Then, the sensing means 7B of the master 1B produces an unusualness sensing signal EMG to output to the control means 3B and the warning means 8.

Upon receiving the unusualness sensing signal EMG from the sensing means 7B, the control means 3B of the master 1B produces a control signal FLH and controls the transmission/reception means 2 so that the produced control signal FLH is transmitted to the slaves 14B, 17B, 18B, 19B, and 20B (slaves that are disposed instead of the slaves 14, 17, 18, 19 and 20 shown in FIG. 8) provided corresponding to an electric device composed of a light.

Then, in accordance with a control by the control means 3B, the transmission/reception means 2 of the master 1B transmits the control signal FLH to the slaves 14B, 17B, 18B, 19B, and 20B provided corresponding to the electric device composed of a light.

The communication module 111 of the slaves 14B, 17B, 18B, 19B and 20B receives the control signal FLH from the master 1B and outputs the received control signal FLH to the blink module 120.

Then, in response to the control signal FLH from the communication module 111, the blink module 120 of the slaves 14B, 17B, 18B, 19B, and 20B intermittently supplies the power across the wiring 116 from the side of the input outlet 114 to the side of the output outlet 115. Then, the ceiling lights 254, 257, 258, and 260 and the desk light 259 (refer to FIG. 8) respectively disposed in the living room 210, the Japanese-style room 220 and the Western-style rooms 230 and 240 blink (Step S46).

After that, the warning means 8 displays the estimate number of residents or "unusualness of resident detected" (Step S47). In this manner, the series of operations ends.

As described above, in Embodiment 3, unusualness of a resident in the house 200 is sensed based on the operational states of the respective electric devices 21 to 30, and the ceiling lights 254, 257, 258, and 260 and the desk light 259 are blinked.

Therefore, another resident in the house 200 can immediately know that a resident is in unusual state and help the resident. As a result, the residents in the house 200 can live life without anxiety.

Note that in Embodiment 3, upon sensing unusualness of a resident in the house 200, the master 1B may transmits, over a wireless communication, a "message for notifying that unusualness of a resident was detected" to a cell-phone of a family member, of the resident in the house 200, who is out of the house or stays away, in addition to transmission of a control signal FLH to a slave provided corresponding to the electric device composed of a light.

In this case, an address of the cell-phone of a family member, of a resident in the house 200, who is out of the house or stays away has been registered preliminarily, and upon receiving the unusualness sensing signal EMG from the sensing means 7B, the control means 3B of the master 1B controls the transmission/reception means 2 so that a control signal FLH is transmitted to the slave provided corresponding to the electric device composed of a light, produces electronic mail including the address of the cell-phone of the family member, of a resident in the house 200, who is out of the house or stays away and a message indicating that unusualness of a resident was detected, and controls the transmission/reception means 2 so that the produced electronic mail is transmitted.

In this manner, a family member, of a resident in the house 200, who is out of the house or stays away can also find out unusualness of a resident.

It is described in the above that the sensing means 7B senses unusualness of a resident when the operating time at present is longer than the operating time of usual use, however, the invention is not limited to that: The sensing means 7B may be arranged so as to sense unusualness of a resident when the operating time at present is shorter than the operating time of usual use, and in general, the sensing means 7B senses unusualness of a resident when the operating time at present is different from the operating time of usual use.

That is because if the operating time at present is shorter than the operating time of usual use, a resident may have become ill while using an electric device and turned off the electric device, and therefore, unusualness of the resident could be sensed by sensing that the operating time at present is shorter than that of usual use.

Further, it is described in the above that upon sensing unusualness of a resident, the master 1B produces a control signal FLH for blinking all of the lights (the ceiling lights 254, 257, 258, and 260, and the desk light 259) in the house to output to the slaves 14B, 17B, 18B, 19B, and 20B provided corresponding to a light (the ceiling lights 254, 257, 258, and 260, and the desk light 259), however, the invention is not limited to that: The master 1B may, upon sensing unusualness of a resident, produce a control signal FLH for blinking some lights (the ceiling lights 254, 257, 258, and 260, and the desk light 259) in the house 200 and output to some of the slaves 14B, 17B, 18B, 19B, and 20B provided corresponding to some lights (the ceiling lights 254, 257, 258, and 260, and the desk light 259).

For example, in order to blink the ceiling lights 254 and 257 and the desk light 259 among the ceiling lights 254, 257, 258, and 260, and the desk light 259, the master 1B outputs' a control signal FLH to the slaves 14B, 17B and 19B. Then, in response to the control signal FLH, the slaves 14B, 17B and 19B respectively blink the ceiling lights 254 and 257 and the desk light 259.

Therefore, in the present invention, the master 1B produces in general a control signal FLH for blinking at least some lights (the ceiling lights 254, 257, 258, and 260, and the desk light 259) in the house 200 and outputs to at least some of the slaves 14B, 17B, 18B, 19B, and 20B provided corresponding to a light (the ceiling lights 254, 257, 258, and 260, and the desk light 259). Then, in response to the control signal FLH, at least some of the slaves 14B, 17B, 18B, 19B, and 20B blink a corresponding light (the ceiling lights 254, 257, 258, and 260 and/or the desk light 259).

Note that the master 1B may transmits a "message indicating that unusualness of a resident was detected" to any terminal, not only to a cell-phone, of a family member of a resident in the house 200 who is out of the house or stays away as long as the terminal is capable of receiving electronic mail.

Further, in Embodiment 3, the transmission/reception means 2 and the control means 3B of the master 1B constitute transmission means.

The rest is the same as Embodiment 1.

Embodiment 4

Figure 29:
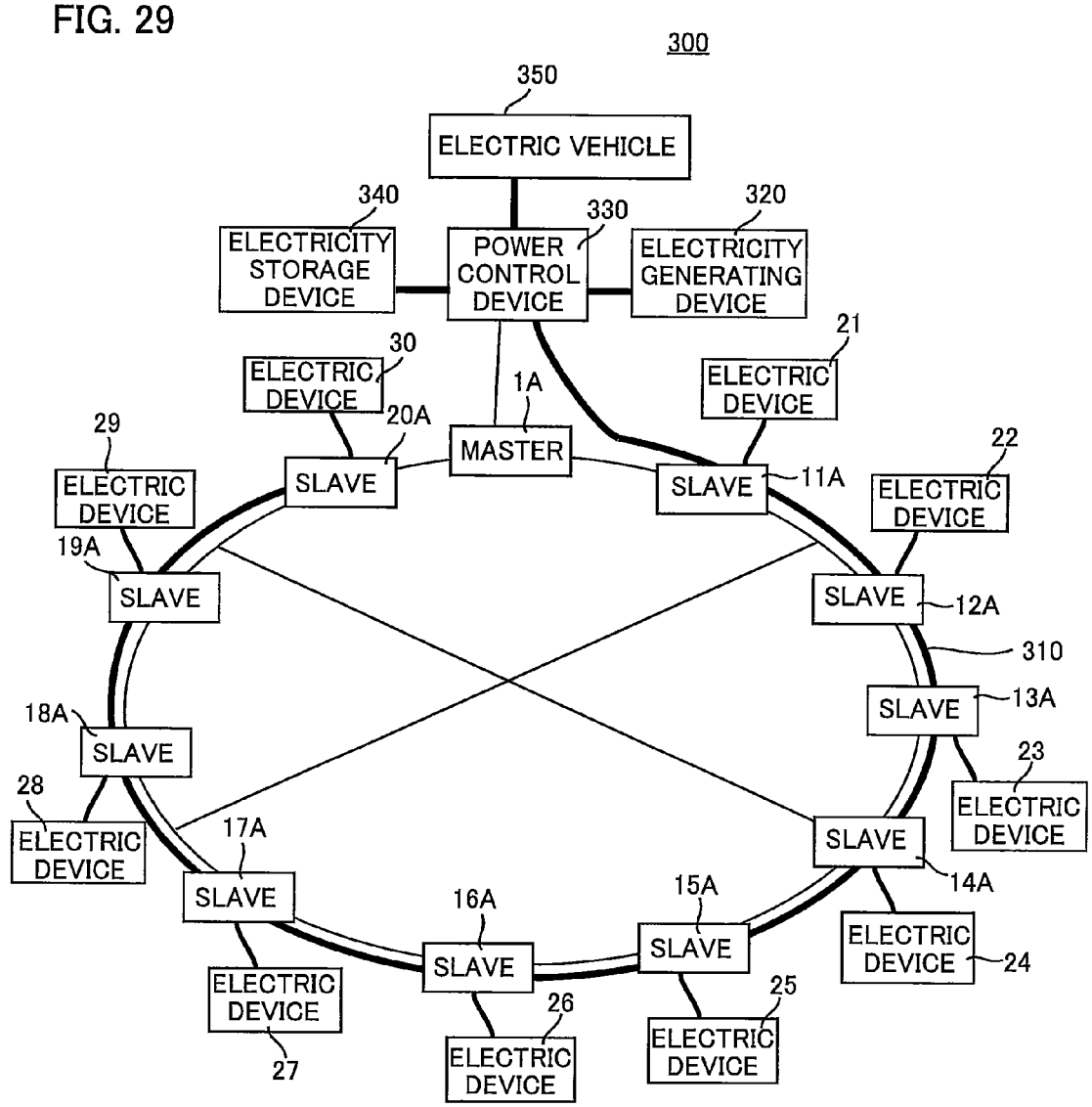
FIG. 29 is a schematic view of the configuration of a home network according to Embodiment 4.

FIG. 29 is a schematic view of the configuration of a home network according to Embodiment 4. With reference to FIG. 29, a home network 300 according to Embodiment 4 is identical with the home network 100A shown in FIG. 14 except that an electricity generating device 320, a power control device 330, a electricity storage device 340, and an electric vehicle 350 are added to the home network 100A.

The slaves 11A to 20A are connected to a power system 310 in the house 200. The power control device 330 is electrically connected to the electricity generating device 320, the electricity storage device 340, the electric vehicle 350, and the power system 310. The power control device 330 is capable of communicating with the master 1A by wire or wirelessly.

The electricity generating device 320 is composed of a solar cell or a fuel battery, generates electricity, and supplies the generated electricity to the power control device 330.

The power control device 330 receives, from the master 1A, the types of the electric devices 21 to 30 respectively connected to the slaves 11A to 20A.

Upon receiving the generated power from the electricity generating device 320, the power control device 330 supplies the received generated power to the power system 310. Then, if the total of the power supplied from a power company to the power system 310 and the power receives from the electricity generating device 320 exceeds the power consumption of the electric devices 21 to 30, the power control device 330 stores the surplus power in the electricity storage device 340.

Further, in case of power outage, the power control device 330 detects an electric device (for example, a refrigerator) that is vital to sustain the lives of the residents in the house 200 based on the types of the electric devices 21 to 30 and supplies, through the power system 310, the power stored in the electricity storage device 340 to a slave to which the detected electric device is connected.

Further, the power control device 330 supplies the power stored in the electricity storage device 340 to the electric vehicle 350.

As described above, the home network 300 according to Embodiment 3 estimates the number of residents in the house 200 and their action and generates electric energy that is clean and environment-friendly to supply to the power system 310 in the house 200. In addition, the home network 300 controls the balance of power consumption in the house 200, stores surplus power in the electricity storage device 340, and supplies the power stored in the electricity storage device 340 to the electric vehicle 350. In case of power outage, the home network 300 also maintains operations of an electric device that is vital to sustain the lives of the residents.

Therefore, the invention allows the residents to live a safe and eco-friendly life without anxiety.

Figure 30:
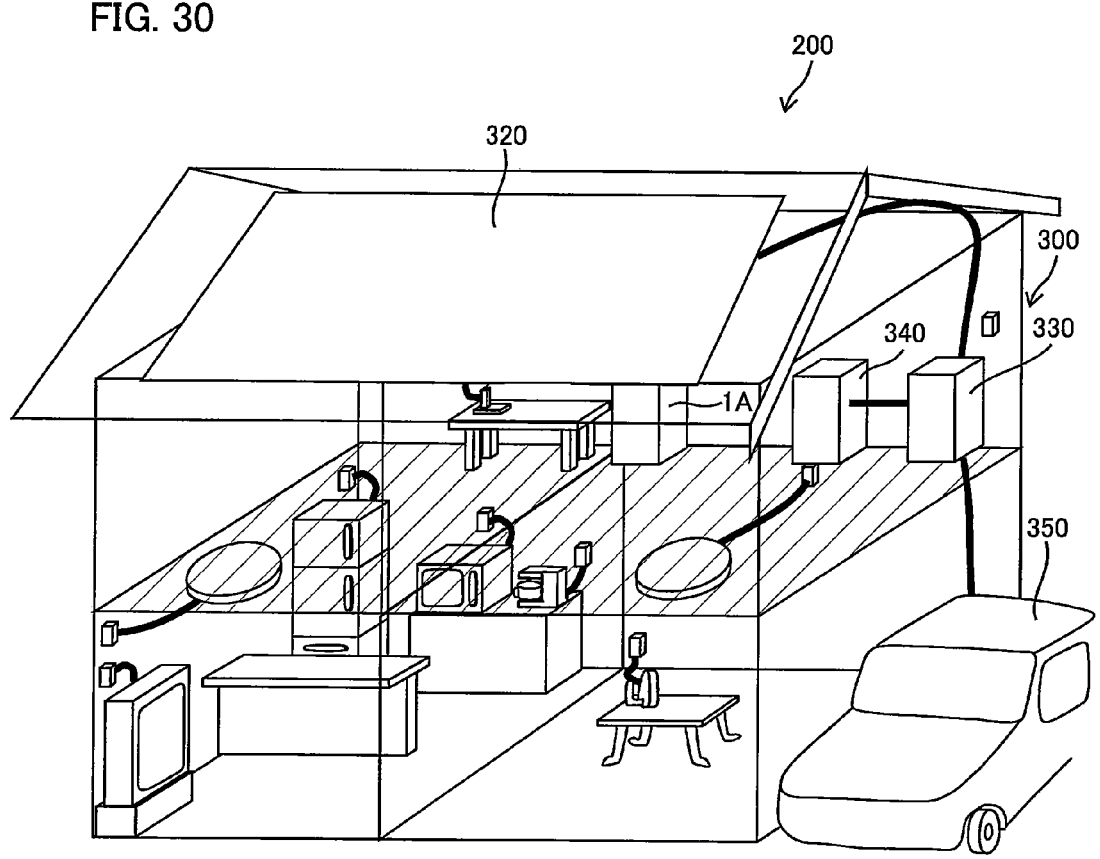
FIG. 30 is a schematic view of the home network shown in FIG. 29 applied to the house.

FIG. 30 is a schematic view of the home network 300 shown in FIG. 29 applied to the house 200. With reference to FIG. 30, the electricity generating device 320 is composed of a solar cell and is disposed on the roof of the house 200. The power control device 330 is disposed in the Western-style room 240 as well as the master 1A.

The application of the home network 300 allows the residents in the house 200 to live a comfortable eco-friendly life.

Figure 31:
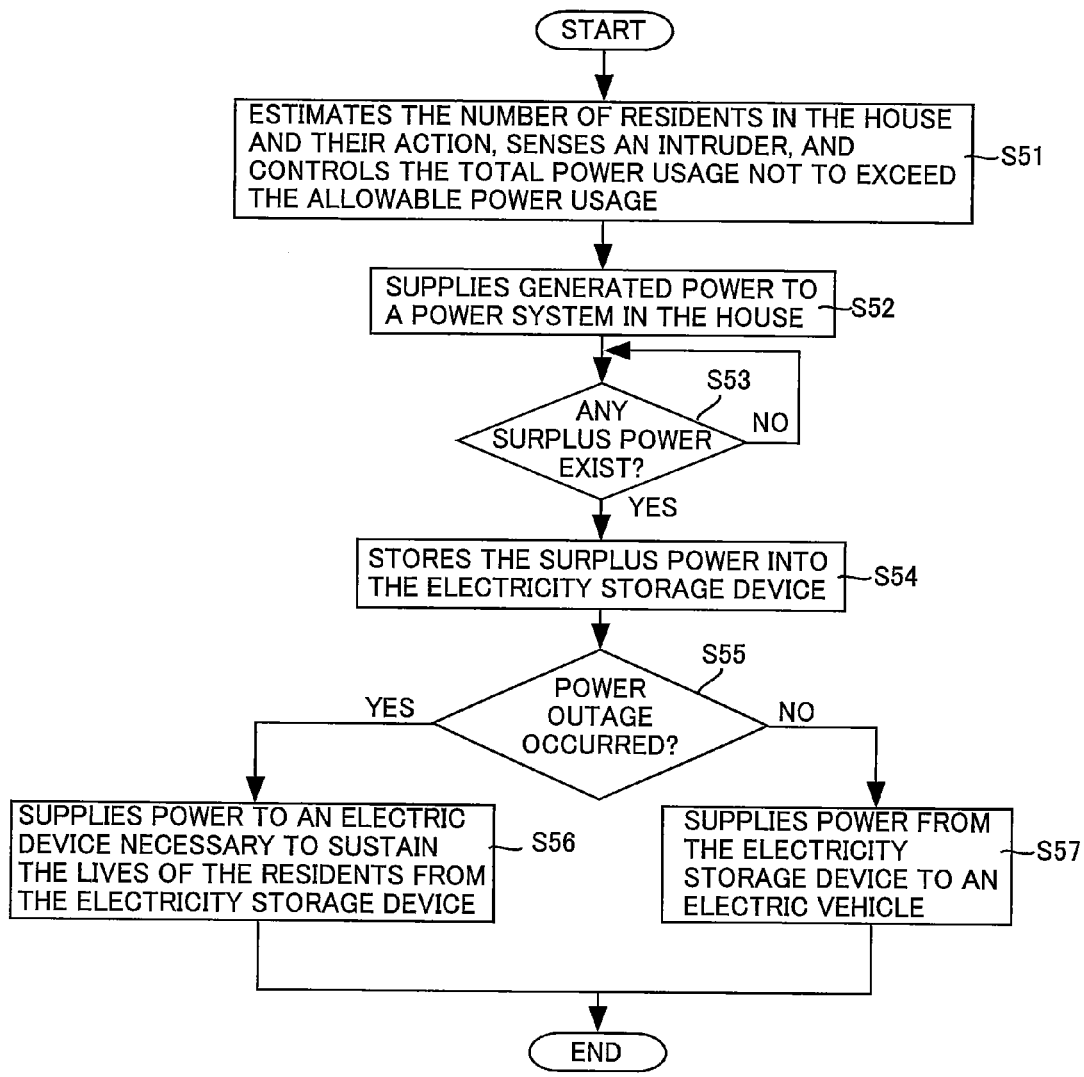
FIG. 31 is a flowchart to explain the operations of the home network shown in FIG. 29.

FIG. 31 is a flowchart to explain the operations of the home network 300 shown in FIG. 29. Once a series of operations has started, the master 1A of the home network 300 estimates the number of residents in the house and their action in accordance with the flowchart shown in FIG. 24, senses an intruder, and controls the total power usage so that it does not exceed the allowable power usage (Step S51).

The electricity generating device 320 generates electricity, and the power control device 330 supplies the power generated by the electricity generating device 320 to the power system 310 in the house (Step S52).

After that, the power control device 330 determines whether there is any surplus power by determining whether the sum of the power from the power company and the generated power is larger than the power consumption of the electric devices 21 to 30 in the house 200 (Step S53). Then, if it is determined that there is surplus power, the power control device 330 stores the surplus power into the electricity storage device 340 (Step S54).

Subsequently, the power control device 330 determines whether there is any power outage (Step S55), and if there is, supplies power from the electricity storage device 340 to an electric device vital to suspend the lives of the residents (Step S56).

On the other hand, if there is no power outage, the power control device 330 supplies power from the electricity storage device 340 to the electric vehicle 350 (Step S57). Then, the series of operations ends.

Note that the home network 300 may comprise a hybrid vehicle instead of the electric vehicle 350, and in general, the home network 300 only have to comprise a vehicle that runs on electric energy.

The electricity generating device 320, the electricity storage device 340 and the electric vehicle 350 are described separately in the above, however, the invention is not limited to that: The electricity generating device 320 and/or the electricity storage device 340 may be mounted to the electric vehicle 350.

Figure 32:
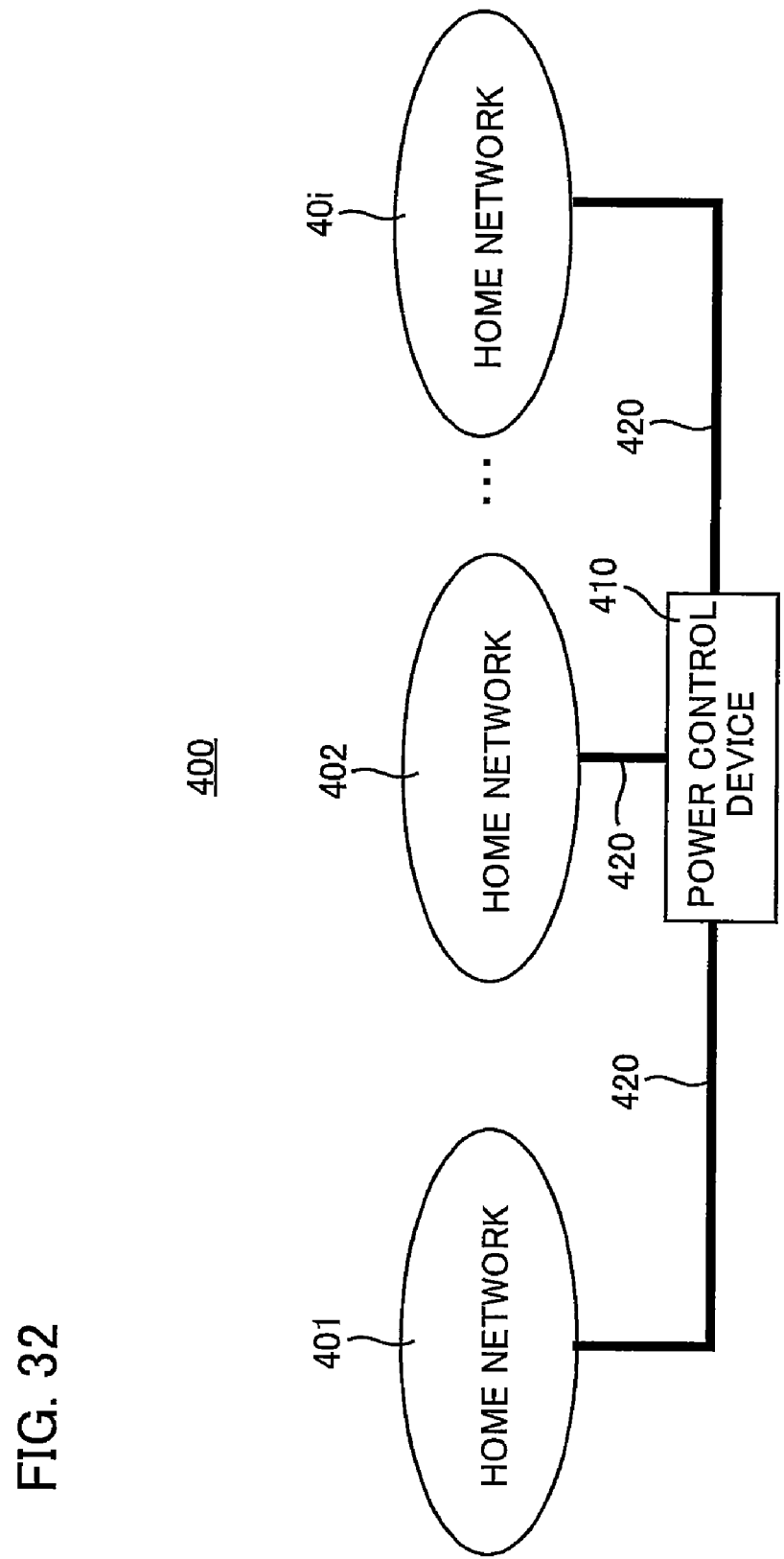
FIG. 32 is a conceptual diagram of an area network using the home network shown in FIG. 29.

FIG. 32 is a conceptual diagram of an area network using the home network 300 shown in FIG. 29. With reference to FIG. 32, an area network 400 comprises home networks 401 to 40i (i is an integer equal to or larger than 2) and a power control device 410.

Each of the home networks 401 to 40i is composed of the home network 300 shown in FIG. 29. The power control device 410 is connected to the power control device 330 of the home networks 401 to 40i with a wiring 420.

The power control device 410 controls the power exchange between the home networks 401 to 40i. If there is surplus power in a house where the home network 401 is disposed and there is a power shortage in another house where the home network 40i is disposed, the power control device 410 requires the power control device 330 of the home network 401 to transmit the power stored in the electricity storage device 340 to the power control device 410 through the wiring 420.

In response to the request from the power control device 410, the power control device 330 of the home network 401 transmits the power stored in the electricity storage device 340 to the power control device 410 through the wiring 420. The power control device 410 supplies the power transmitted from the home network 401 to the power control device 330 of the home network 40i.

The power control device 330 of the home network 40i supplies the power from the power control device 410 to the power system 310 in the house. In this manner, it is possible to supply surplus power generated in the home network 401 to the home network 40i suffering from a power shortage. That is to say, the power balance in the area is adjusted. As a result, the residents in the area can live a safe and eco-friendly life without anxiety.

Figure 33:
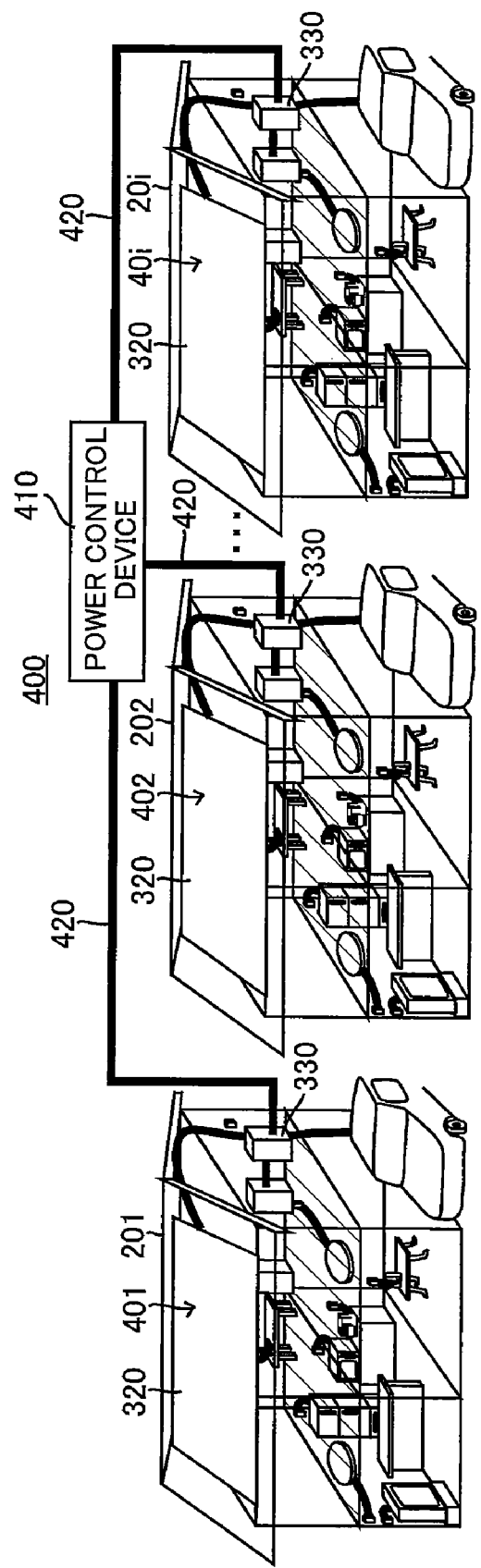
FIG. 33 illustrates an application example of the area network shown in FIG. 32.

FIG. 33 illustrates an application example of the area network 400 shown in FIG. 32. With reference to FIG. 33, the home networks 401 to 40i are disposed in houses 201 to 20i, respectively. Then, the power control device 410 is connected to the power control device 330 of the home networks 401 to 40i with the wiring 420.

The power control device 410 controls the power exchange between the home networks 401 to 40i and adjusts the power balance in the area constituted by the houses 201 to 20i. In this manner, the residents in the area can live a safe and eco-friendly life without anxiety.

Embodiment 5

Figure 34:
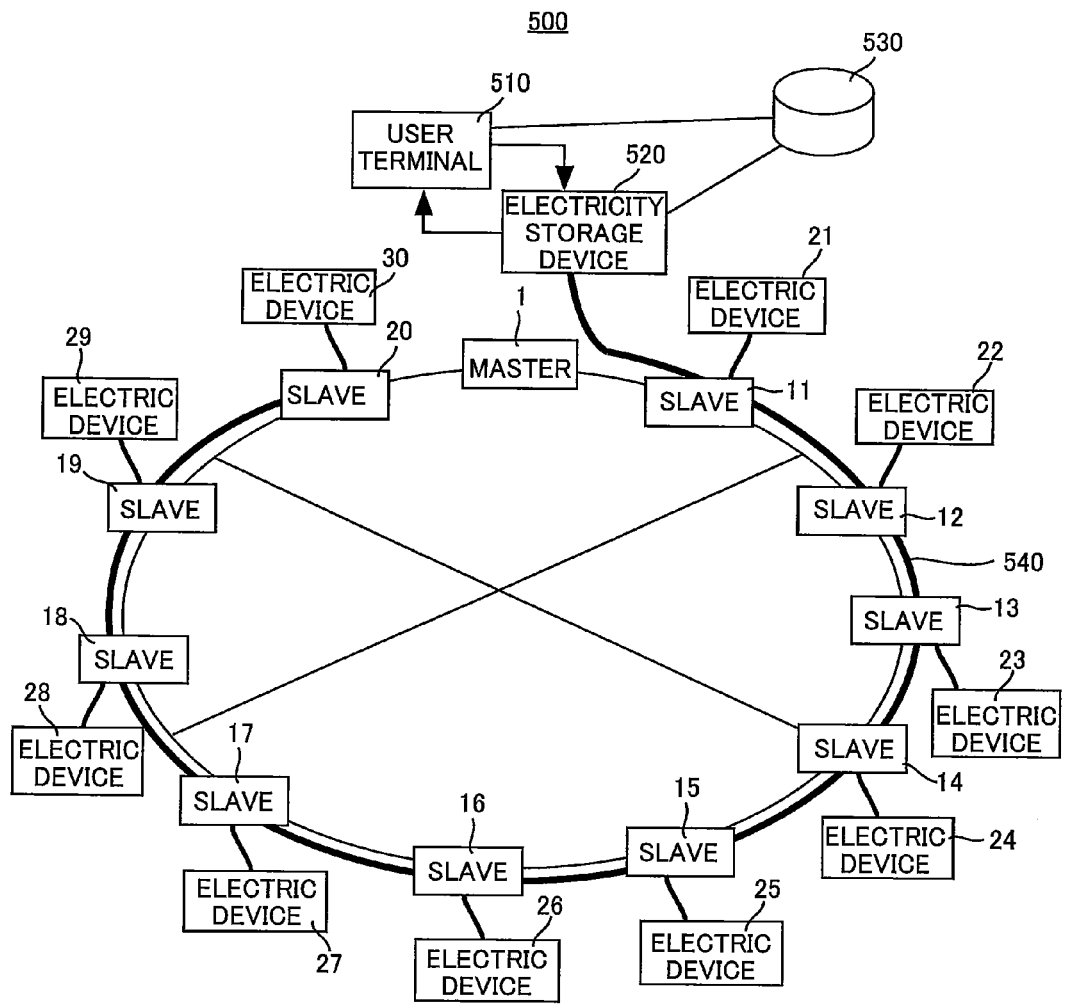
FIG. 34 is a schematic view illustrating the configuration of a home network according to Embodiment 5.

FIG. 34 is a schematic view illustrating the configuration of a home network according to Embodiment 5. With reference to FIG. 34, a home network 500 according to Embodiment 5 is identical with the home network 100 shown in FIG. 1 except that a user terminal 510, an electricity storage device 520, a database 530, and a power system 540 are added to the home network 100.

The user terminal 510 is connected to the database 530 over a network. The user terminal 510 receives, in advance, power outage information over the network. The power outage information includes a beginning time of the power outage and a duration time thereof.

Upon receiving the power outage information, the user terminal 510 transmits the received power outage information to the electricity storage device 520.

The user terminal 510 also receives, from the electricity storage device 520, information on an electric device (some of the electric devices 21 to 30) connected to the electricity storage device 520 and, based on the received information on the electric device, displays the supply state of the power to the electric device connected to the electricity storage device 520.

Further, upon being notified by the electricity storage device 520 that the running state of the electricity storage device 520 has changed, the user terminal 510 displays the fact that the running state of the electricity storage device 520 has changed.

Further, if the electricity storage device 520 is carrying out a prioritized control of the power supply based on the residual power in the electricity storage device 520, the user terminal 510 displays so.

The electricity storage device 520 is connected to the database 530 through the network and stores the power generated by an electricity generating device (not shown). The electricity storage device 520 also outputs information on an electric device that is connected to the electricity storage device 520 itself to the user terminal 510.

Further, the electricity storage device 520 receives the power outage information from the user terminal 510 and a correspondence table between the power usage states and the types of respective electric devices from database 530. The electricity storage device 520 obtains an order of priority with respect to the use of the respective electric devices 21 to 30, and when the time at which a power outage is begun approaches, calculates the remaining power. After that, the electricity storage device 520 determines whether the power supply to an electric device of a low priority should be maintained based on the order of priority with respect to the use of the respective electric devices 21 to 30, the remaining power and the power usage state of the electric device connected to the electricity storage device 520 itself.

Then, if it is determined that the power supply to the electric device of a low priority is to be maintained, the electricity storage device 520 supplies the power to all of the electric devices connected to the electricity storage device 520 itself after the beginning of the power outage.

If it is determined that the power supply to the electric device of a low priority should not be maintained, the electricity storage device 520 maintains the power supply (supplies 100 percent of the power) to an electric device with a high priority and limits (for example, to 90 percent of the power) the power supply to the electric device with a low priority after the beginning of the power outage.

When the electricity storage device 520 is controlling the power supply to the electric devices with an order of priority, the electricity storage device 520 outputs, to the user terminal 510, a message indicating that the control is being carried out in accordance with an order of priority.

Further, when the electric devices connected to the electricity storage device 520 has changed during the time period of a power outage, the electricity storage device 520 re-calculates the power consumption of the electric devices connected to itself and the power stored based on the power usage states received from the database 530, and based on the re-calculated power consumption and power, controls the power in case of power outage by the methods described above.

The database 530 stores the power usage states of the respective types of electric devices and the types of respective electric devices, by associating them with each other.

The power system 540 is connected to the electricity storage device 520 and an electric device, among the electric devices 21 to 30, which needs to be operated during the time period of a power outage. In this case, the power system 540 connects the electric device that needs to be operated during the time period of a power outage and the electricity storage device 520 with separate wirings.

Figure 35:
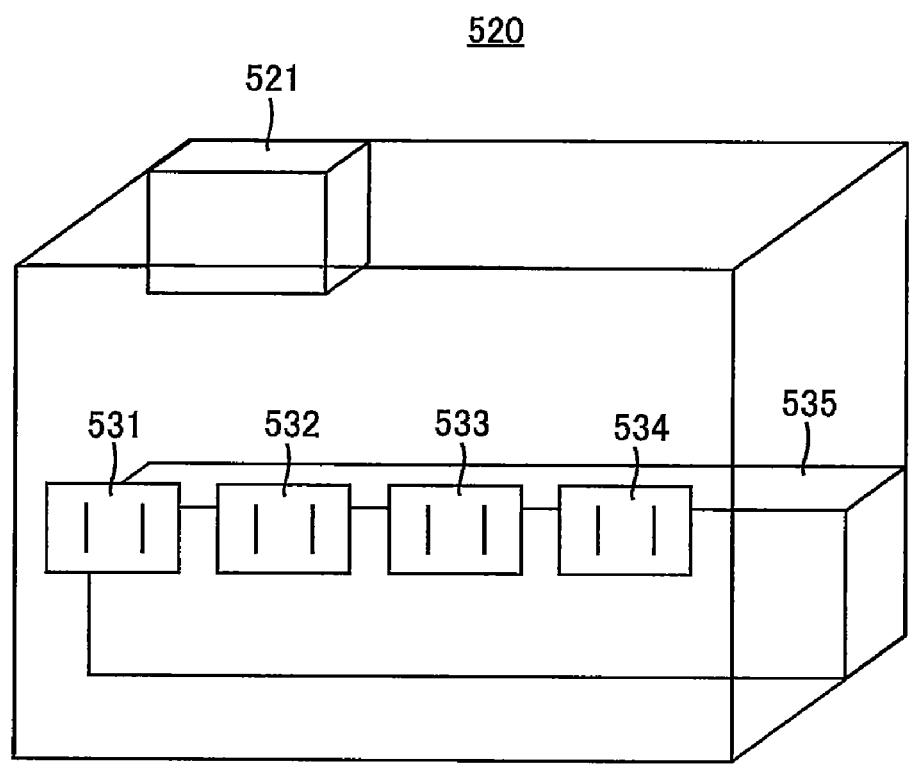
FIG. 35 is a perspective view illustrating the configuration of the electricity storage device shown in FIG. 34.

FIG. 35 is a perspective view illustrating the configuration of the electricity storage device 520 shown in FIG. 34. With reference to FIG. 35, the electricity storage device 520 includes a power control device 521, outlets 531 to 534, and an electricity storage unit 535.

The power control device 521 receives power outage information from the user terminal 510 and a correspondence table PST between the power usage states of the respective types of electric devices and the types of electric devices from the database 530. The power control device 521 also monitors the power supply from the electricity storage unit 535 to the respective outlets 531 to 534 and obtains the power usage states of electric devices respectively connected to the outlets 531 to 534 by measuring time change in the power supplied through the outlets 531 to 534.

Then, the power control device 521 compares the measured power usage states of the electric devices and the power usage states of the respective types of electric devices received from the database 530 and detects a power usage state that matches the measured power usage states from the power usage states of the respective types of electric devices. Then, the power control device 521 detects a type corresponding to the detected power usage state with reference to the correspondence table PST.

The power control device 521 carries out this process with respect to the respective outlets 531 to 535. The power control device 521 holds an order of priority with respect to the use of the respective electric devices 21 to 30 and produces information on an electric device=[outlet/type of electric device/level of priority/control method] by associating the outlets, types of electric devices, the order of priority with respect to the use of electric devices, and control method of electric devices with each other, and transmits the produced information on an electric device=[outlet/type of electric device/level of priority/control method] to the user terminal 510. Note that the method of controlling an electric devices depends on whether the power supply to the electric device is limited, and if not limited, the method includes 100 percent, and if limited, includes the limited power.

When the time at which the power outage is begun approaches, the power control device 521 calculates the remaining power stored in the electricity storage unit 535. After that, the power control device 521 determines whether the power supply to an electric device with a low priority should be maintained based on an order of priority with respect to the use of the respective electric devices 21 to 30, the remaining power and the power usage states of electric devices connected to the respective outlets 531 to 535.

Then, if it is determined that the power supply to the electric device with a low priority is to be maintained, the power control device 521 supplies the power to all of the electric devices connected to the outlets 531 to 535 after the beginning of the power outage.

If it is determined that the power supply to the electric device with a low priority should not be maintained, the power control device 521 maintains the power supply (supplies 100 percent of the power) to an electric device with a high priority and limits (for example, to 90 percent of the power) the power supply to the electric device with a low priority after the beginning of the power outage.

When the power control device 521 is controlling the power supply to electric devices with an order of priority, the power control device 521 outputs, to the user terminal 510, a message indicating that the control is being carried out with an order of priority.

Further, when an electric device connected to the electricity storage device 520 is changed during the time period of a power outage, the power control device 521 re-calculates the power consumption of the electric devices connected to the outlets 531 to 534 and the remaining power in the electricity storage unit 535 based on the power usage states received from the database 530, and based on the re-calculated power consumption and power, controls the power in case of power outage by the methods described above.

Note that whether an electric device has a high priority or a low priority with respect to the use is determined using the third priority, for example, as a reference value and determining whether the electric device's priority is higher than the reference value.

FIG. 36 illustrates information displayed by the user terminal 510 if there is no power outage. FIG. 37 illustrates information displayed by the user terminal 510 in case of power outage.

The user terminal 510 receives information on an electric device=[outlet/type of electric device/level of priority/control method] from the power control device 521 of the electricity storage device 520, and based on the received information on an electric device=[outlet/type of electric device/level of priority/control method], displays the information on an electric device shown in FIG. 36 as information on an electric device in case of no power outage.

In this case, there is no power outage, and therefore, 100 percent of the power is supplied to the respective electric devices (a hair dryer, a lamp, a heater, and a TV) regardless of the level of priority of the electric devices.

The user terminal 510 receives information on an electric device=[outlet/type of electric device/level of priority/control method] from the power control device 521 of the electricity storage device 520, and based on the received information on an electric device=[outlet/type of electric device/level of priority/control method], displays the information on an electric device shown in FIG. 37 as information on an electric device in case of power outage.

In this case, 100 percent of the power is supplied to the lamp and the heater with a priority higher than the reference value, and 90 percent and 80 percent of the power to the TV and the hair dryer with a priority lower than the reference value.

In case of power outage, the lamp is necessary to provide a light in the house 200 and therefore has the highest priority, and the heater is necessary to avoid the cold and therefore has the second priority. The TV is necessary to obtain information etc. with respect to the power restoration, however, it is not an essential electric device in case of power outage and therefore has the third priority that is equal to or lower than the reference value. Further, use of the hair dryer is not necessary in case of power outage and therefore the hair dryer has the fourth priority that is lower than the reference value.

The power stored in the electricity storage unit 535 is less than the total power consumption of all of the electric devices, that is to say, the hair dryer, the lamp, the heater, and the TV, and therefore, the power supplied to the hair dryer and the TV is limited according to the order of priority of the hair dryer, the lamp, the heater, and the TV.

In this manner, it is possible to keep using an electric device that is necessary in case of power outage, and the residents in the house 200 can live life without anxiety even in case of power outage.

Figure 38:
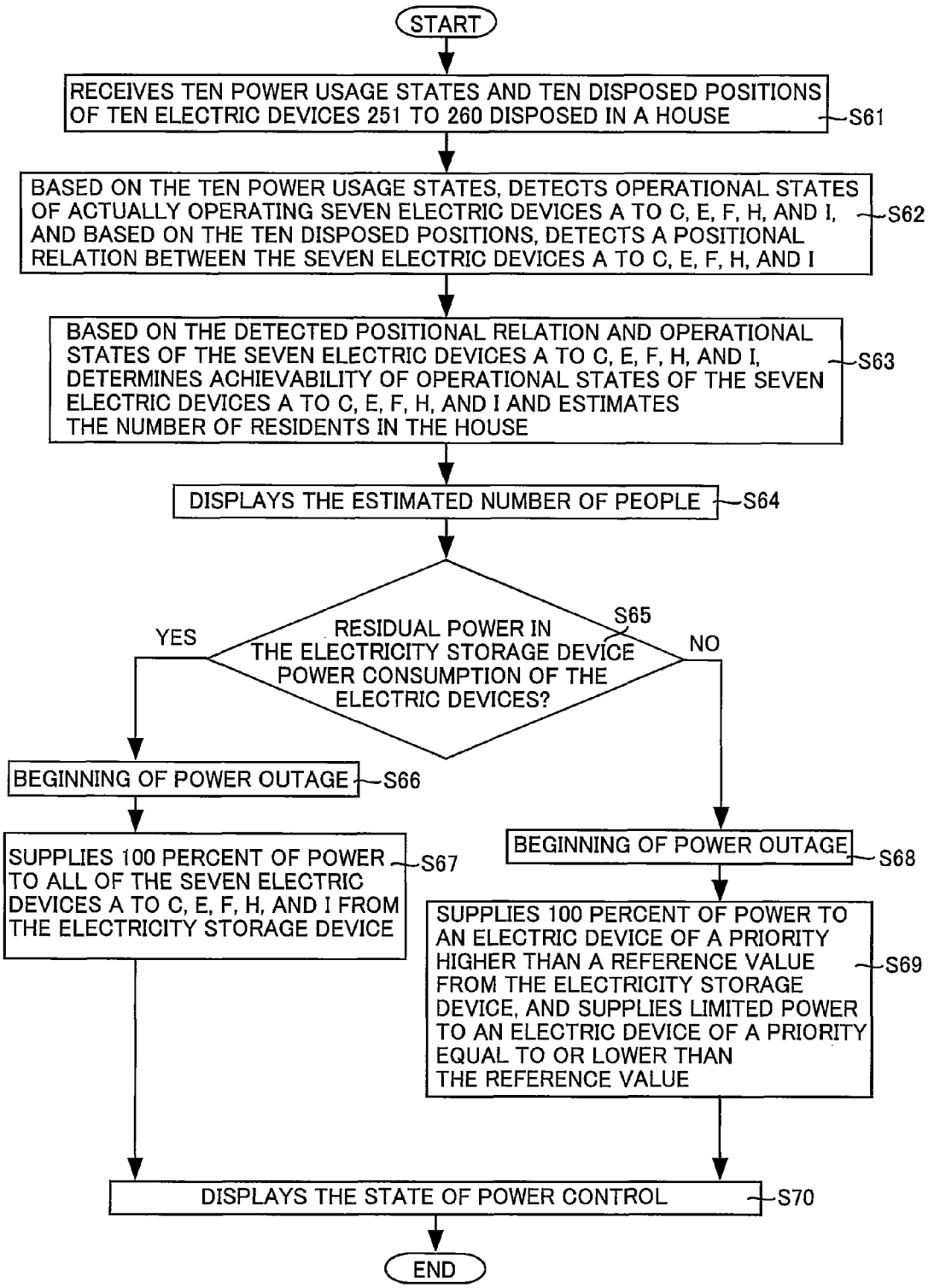
FIG. 38 is a flowchart to explain the operations of the home network shown in FIG. 34.

FIG. 38 is a flowchart to explain the operations of the home network 500 shown in FIG. 34.

With reference to FIG. 38, once a series of operations has started, the master 1 estimates the number of residents in the house 200 in accordance with the operations of Step S1 to Step S3 shown in FIG. 10 (Step S61 to Step S63). Then, the master 1 displays the estimated number (Step S64).

After that, the power control device 521 of the electricity storage device 520 receives the power outage information from the user terminal 510, and if the time at which the power outage is begun in the received power outage information approaches, calculates the power remaining in the electricity storage unit 535 and the power consumption of an electric device connected to the outlets 531 to 534.

Then, the power control device 521 of the electricity storage device 520 determines whether the power remaining in the electricity storage unit 535 is equal to or larger than the power consumption of the electric device connected to the outlets 531 to 534 (Step S65).

If it is determined in Step S65 that the power remaining in the electricity storage unit 535 is equal to or larger than the power consumption of the electric device and then the power outage begins (Step S66), the power control device 521 of the electricity storage device 520 supplies 100 percent of the power to all of the seven electric devices A to C, E, F, H, and I from the electricity storage unit 535 (Step S67).

On the other hand, if it is determined in Step S65 that the power remaining in the electricity storage unit 535 is less than the power consumption of the electric device and then the power outage begins (Step S68), the power control device 521 of the electricity storage device 520 supplies 100 percent of the power to the electric device with a level of priority higher than the reference value from the electricity storage unit 535, and limited power to the electric device with a level of priority that is equal to or lower than the reference value (Step S69).

Then, after Step S67 or Step S69, based on the information on the electric devices received from the electricity storage device 520, the user terminal 510 displays power control information (Step S70). In this manner, the series of operations ends.

As described above, by obtaining power outage information preliminarily, it is possible to supply power, with no limitation, to an electric device (an electric device with a higher priority than the reference value) necessary to use in case of power outage, even if the power stored in the electricity storage device 520 is less than the power consumption of the electric devices.

Therefore, the invention allows the residents to secure use of electric devices necessary in case of power outage and therefore live without anxiety.

The rest is the same as Embodiment 1.

Figure 39:
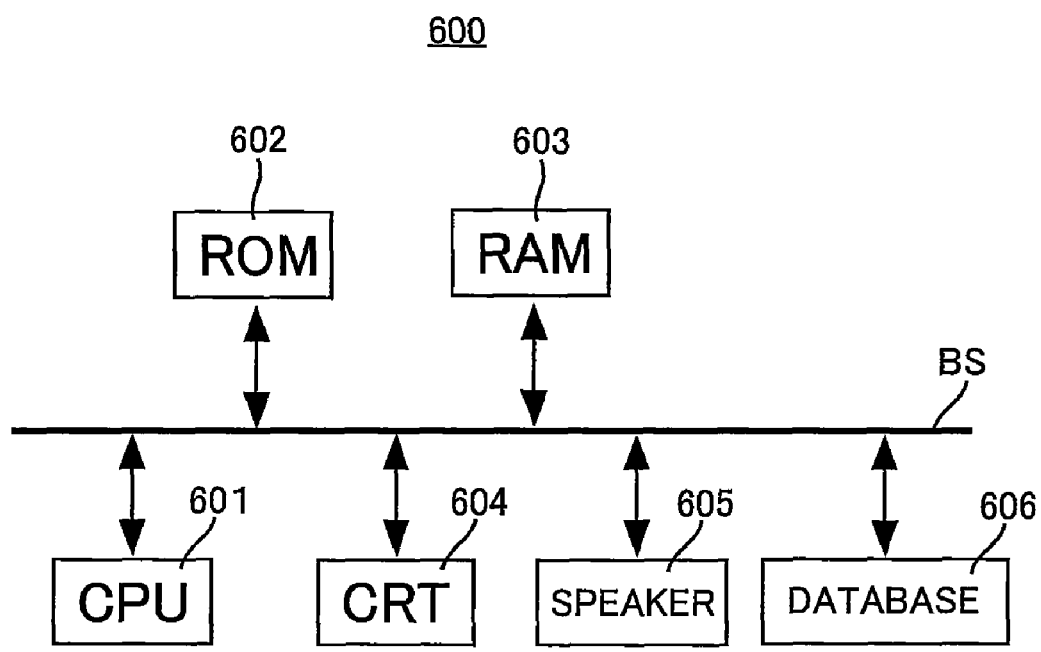
FIG. 39 is a schematic view of the configuration of a computer.

Note that in the present invention, a computer carries out estimation of the number of residents and their action, sensing of unusualness of a resident, and power control in a house and an area. FIG. 39 is a schematic view of the configuration of a computer. With reference to FIG. 39, the computer 600 comprises a CPU (Central Processing Unit) 601, a ROM (Read Only Memory) 602, a RAM (Random Access Memory) 603, a CRT 604, a speaker 605, a database 606, and a bus BS.

The CPU 601, the ROM 602, the RAM 603, the CRT 604, the speaker 605, and the database 606 are connected to each other with the bus BS.

The ROM 602 stores a program including the flowchart shown in FIG. 10, a program including the flowcharts shown in FIGS. 20, 22 and 24, a program including the flowchart shown in FIG. 28, a program including the flowchart shown in FIG. 31, a program including the flowchart shown in FIG. 38, a classification table CLAS, a correspondence table TYCH, and an association table RLT. The RAM 603 functions as a work memory.

The CPU 601 reads out and executes the respective programs stored in the ROM 602, estimates the number of residents and their action, senses unusualness of a resident, senses an intruder, and adjusts the power balance in the house. The CPU 601 stores the estimated number of residents and their action in the database 606 and displays on the CRT 604, and if senses an intruder, displays "intruder detected" on the CRT 604 or sounds an alarm using the speaker 605. If senses unusualness of a resident, the CPU 601 blinks a light in the house 200 and displays "unusualness of a resident detected" on the CRT 604.

As described above, the ROM 602 stores a program that is read-out and executed by the CPU 601, and therefore, constitutes a recording medium that is computer (CPU) readable.

Figure 40:
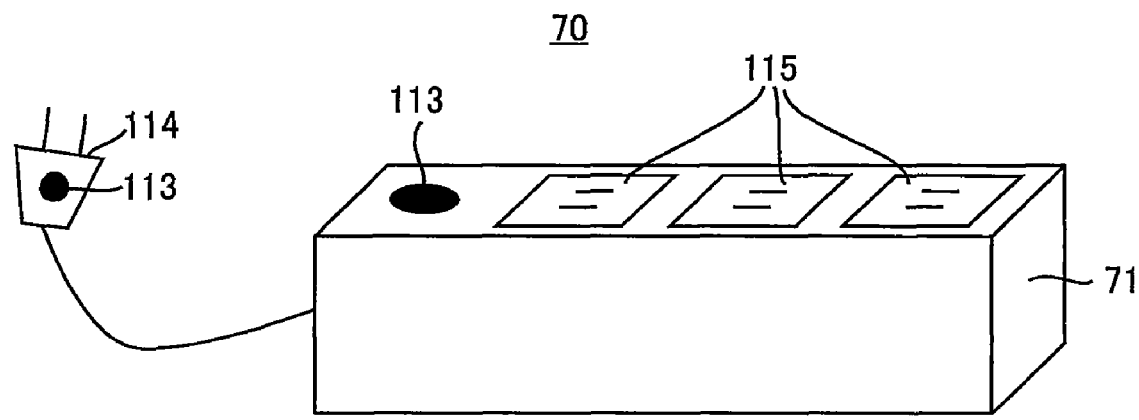
FIG. 40 illustrates another configuration of the slave.
Figure 41:
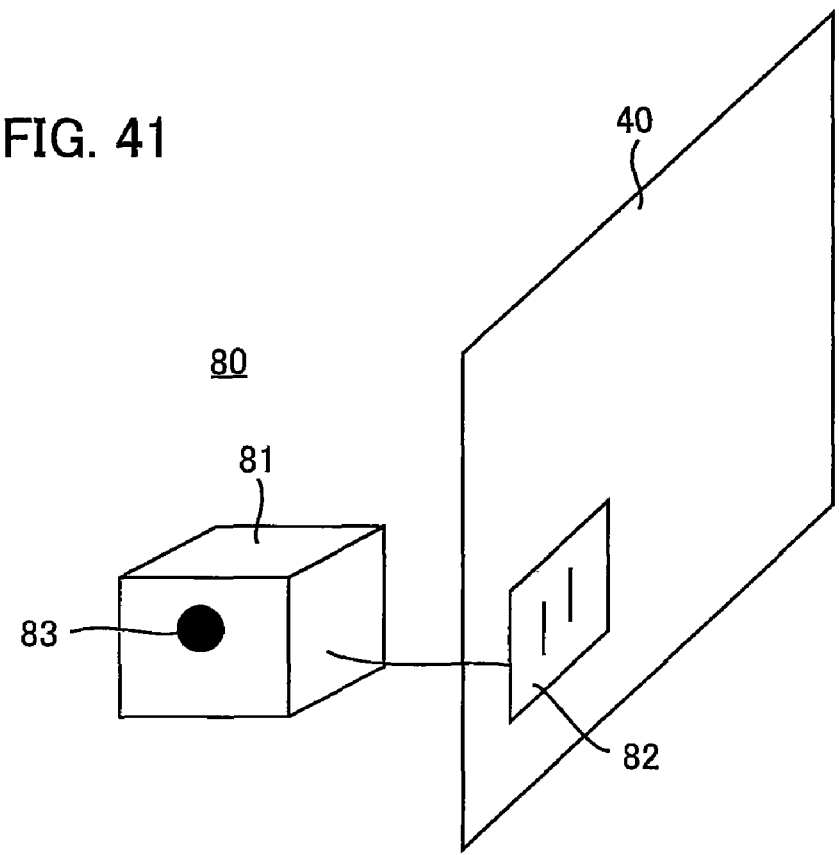
FIG. 41 illustrates another configuration of the slave.

FIGS. 40 and 41 illustrate other configurations of the slave. It is described in the above that the configuration of the slaves 11 to 20, 11A to 20A, and 11B to 20B is as illustrated in FIG. 3, however, with the invention, the slaves 11 to 20, 11A to 20A, and 11B to 20B may include slaves 70 and 80 shown in FIGS. 40 and 41. With reference to FIG. 40, the slave 70 includes an IC tag reader unit 113, one input outlet 114, and three output outlets 115. The IC tag reader unit 113 is disposed in either of a main body unit 71 or the input outlet 114 of the slave 70.

With reference to FIG. 41, the slave 80 comprises a main body unit 81 and an output outlet 82. The output outlet 82 is connected to the main body unit 81 with a lead wire. The main body unit 81 is disposed inside the wall 40, and the output outlet 82 is disposed in the wall 40.

The main body unit 81 also has a position memory unit 83, and the position memory unit 83 stores information on the position where the slave 80 is disposed and is connected to the position determination module 112. The main body unit 81 receives power from a power system in the house 200. Note that in the slave 80, the position memory unit 83 and the position determination module 112 may be unified.

As described above, the slaves 11 to 20, 11A to 20A, and 11B to 20B may be of a wide variety of configurations and in general, the slaves 11 to 20, 11A to 20A, and 11B to 20B only have to make their disposed position understood.

Note that it is described in the above that the position of an outlet (=the position of the electric devices 21 to 30) is detected by the IC tag reader 113, however, the invention is not limited to that: The masters 1, 1A and 1B of the home networks 100, 100A, 100B, 300, 401 to 40*i*, and 500 only have to know, in some way, the position of an outlet (=the position of the electric devices 21 to 30) disposed in the house.

Further, in the present invention, the slaves 11 to 20, or the slaves 11A to 20A, or the slaves 11B to 20B constitute n (n is 2 or a larger integer) modules, and the electric devices 20 to 30 constitute n electric devices.

Further, among the electric devices 20 to 30, actually operating ones constitute m (m is an integer that satisfies $2 \leq m \leq n$) electric devices.

Further, among the electric devices 20 to 30, ones having the operating state that changes in steps or continuously constitute j (j is an integer that satisfies $j \leq m$) electric devices.

Further, among the electric devices 20 to 30, ones necessary to sustain the lives of the residents constitute k (k is an integer that satisfies $k \leq n$) electric devices.

Further, the transmission/reception means 2 and the control means 3B constitute transmission means.

The embodiments as have been described here are mere examples and should not be interpreted as restrictive. The scope of the present invention is determined by each of the claims, not by the written description of the embodiments, and embraces modifications within the meaning of, and equivalent to, the languages in the claims.

INDUSTRIAL APPLICABILITY

The invention is applied to a home network where the number of residents in the house is estimated while protecting their privacy. The invention is also applied to a home network where actions of the residents in the house is estimated while protecting their privacy. Further, the invention is applied to a home network where the residents in the house can live safe without anxiety. Further, the invention is applied to an area network where the residents in the area can live a safe and eco-friendly life without anxiety. Further, the invention is applied to a program for a computer to execute an operation in a home network. Further, the invention is applied to a computer-readable recording medium that stores a program for a computer to execute an operation in a home network.

The invention claimed is:

1. A home network comprising:
n (n is 2 or a larger integer) electric devices disposed in a house;
n modules being provided corresponding to the n electric devices, each supplying power to corresponding electric devices from an outlet and detecting power usage states and disposed positions of the corresponding electric devices;
detection unit detecting operational states of actually operating m (m is an integer that satisfies $2 \leq m \leq n$) electric devices based on n power usage states transmitted from the n modules and detecting a positional relation between the m electric devices based on the n disposed positions transmitted from the n modules; and
estimation unit estimating a number of residents in the house by determining achievability of operational states of the m electric devices based on the detected positional relation and operational states of the m electric devices.

2. The home network according to claim 1 further comprising:
   sensing unit sensing an intruder in the house by determining achievability of operational states of the m electric devices with respect to the estimated number of people based on the estimated number of people and the detected positional relation and operational states of the m electric devices; and
   warning unit warning the residents of sensing of an intruder if the sensing unit senses the intruder.

3. The home network according to claim 1 further comprising:
   sensing unit sensing unusualness of the resident if it is detected, based on the detected operational states of the m electric devices, that at least one operating time of the m electric devices is different from a reference operating time; and
   control unit outputting, upon sensing of unusualness of the resident, a control signal for blinking among the n electric devices at least some electric devices composed of a light to at least some of modules provided corresponding to the electric devices composed of the light,
   wherein at least some of the modules provided corresponding to the electric devices composed of the light blink at least some of the electric devices composed of the light in response to the control signal.

4. The home network according to claim 3 further comprising:
   transmission unit transmitting, upon sensing of unusualness of the resident, an unusualness message indicating that unusualness of the resident was detected to a terminal of a family member of the resident.

5. The home network according to claim 1 wherein
   the estimation unit estimates types of the respective m electric devices based on a classification table of the n electric devices with respect to characteristics of the n electric devices and m operational states of the m electric devices, estimates functions of the respective m electric devices based on the estimated m types, estimates a positional relation between the residents and the m electric devices based on the estimated m functions, and estimates the number of residents in the house and their action by adding the estimated positional relation to a positional relation and operational states of the m electric devices.

6. The home network according to claim 5 further comprising:
   control unit calculating the total power usage in the house based on n power usage states transmitted from the n modules, and upon the calculated total power usage becomes to be equal to or larger than a threshold, producing a control signal for controlling power used by among the m electric devices j (j is a positive integer that satisfies j≦m) electric devices whose operating state changes in steps or continuously so that the total power usage is smaller than the threshold to output to j modules provided corresponding to the j electric devices,
   wherein in response to receiving of the control signal, each of the j modules limits, in steps or continuously, power supplied to a corresponding electric device.

7. The home network according to claim 1 further comprising:
   an electricity generating device disposed in the house;
   an electricity storage device storing power; and
   a power control device controlling the power balance in the house,
   wherein when the sum of power generated by the electricity generating device and power from a power company exceeds the total power usage of the n electric devices, the power control device stores the surplus power into the electricity storage device.

8. The home network according to claim 7,
   wherein in case of power outage, the power control device controls k modules (k is a positive integer that satisfies k≦n) provided corresponding to k electric devices necessary to sustain the lives of the residents so that power stored in the electricity storage device is supplied to the k electric devices, and
   wherein in response to a control by the power control device, each of the k modules supplies power to a corresponding electric device from the outlet.

9. The home network according to claim 7 wherein the power control device supplies power stored in the electricity storage device to a vehicle that runs on electric energy.

10. The home network according to claim 1 further comprising:
    an electricity storage device storing power; and
    a power control device preliminarily holding power outage information and controlling the power balance in the house,
    wherein upon sensing the beginning time of a power outage based on the power outage information, the power control device supplies among the m electric devices an electric device with a usage priority higher than a reference value with power to maintain operation thereof from the electricity storage device, determines necessity of power supply to an electric device with a usage priority equal to or lower than the reference value from the electricity storage device based on power stored in the electricity storage device and the power usage states, and in response to the determination result, limits or maintains power supply to the electric device with a usage priority equal to or lower than the reference value from the electricity storage device.

11. The home network according to claim 10 wherein if the number of the m electric devices increases or decreases during the power outage, the power control device re-calculates power stored in the electricity storage device and the power consumption of electric devices connected to the electricity storage device, and using the re-calculated power and power consumption, controls power supply from the electricity storage device to the electric device with the usage priority higher than a reference value and the electric device with the usage priority equal to or lower than the reference value.

12. An area network comprising:
    a plurality of home networks disposed in a plurality of houses; and
    a power control device carrying out power exchange between the plurality of home networks,
    wherein each of the plurality of home networks includes:
    n (n is 2 or a larger integer) electric devices disposed in a house;
    n modules being provided corresponding to the n electric devices, each supplying power to a corresponding electric device from an outlet, and detecting power usage states and disposed positions of the corresponding electric devices;
    detection unit detecting operational states of actually operating m (m is an integer that satisfies 2≦m≦n) electric devices based on n power usage states transmitted from the n modules and detecting a positional relation between the m electric devices based on n disposed positions transmitted from the n modules;

estimation unit estimating a number of residents in the house by determining achievability of operational states of the m electric devices based on the detected positional relation and operational states of the m electric devices;

an electricity generating device disposed in the house;

an electricity storage device storing power; and a power control device controlling the power balance in the house, wherein if the sum of power generated by the electricity generating device and power from a power company exceeds the total power usage of the n electric devices, the power control device stores the surplus power into the electricity storage device, and wherein the power control device supplies power stored in the electricity storage device of a house having surplus power to the electricity storage device of another house suffering from a power shortage.

13. A method executing on a computer comprising:

a first step of receiving n (n is 2 or a larger integer) power usage states and n disposed positions of n electric devices disposed in a house;

a second step of detecting operational states of actually operating m (m is an integer that satisfies $2 \leq m \leq n$) electric devices based on the received n power usage states and detects a positional relation between the m electric devices based on the received n disposed positions; and a third step of estimating the number of residents in the house by determining achievability of operational states of the m electric devices based on the detected positional relation and operational states of the m electric devices.

14. The method according to claim 13 further comprising:

a fourth step of sensing an intruder in the house by determining achievability of operational states of the m electric devices with respect to the estimated number of people based on the estimated number of people and the detected positional relation and operational states of the m electric devices; and a fifth step of, if an intruder is sensed by said sensing, warning the resident of sensing of the intruder.

15. The method according to claim 13 wherein the third step includes:

a first sub-step of estimating types of the respective m electric devices based on a classification table of the n electric devices with respect to characteristics of the n electric devices and m power usage states of the m electric devices;

a second sub-step of estimating functions of the respective m electric devices based on the estimated m types;

a third sub-step of estimating a positional relation between the residents and the m electric devices based on the estimated m functions; and a fourth step of estimating the number of residents in the house and their action by adding the estimated positional relation to a positional relation and operational states of the m electric devices.

16. The method according to claim 13 further comprising:

a sixth step of calculating the total power usage in the house based on n power usage states transmitted from n modules provided corresponding to the n electric devices; and a seventh step of, if the calculated total power usage is equal to or larger than a threshold, controlling power used by among the m electric devices j (j is a positive integer that satisfies $j \leq m$) electric devices whose operating state changes in steps or continuously so that the total power usage is smaller than the threshold.

17. The method according to claim 13 further comprising a sixth step of, if the sum of power generated by an electricity generating device disposed in the house and power from a power company exceeds the total power usage of the n electric devices, a power control device storing the surplus power into an electricity storage device.

* * * * *